(12) United States Patent  
Daniels et al.

(10) Patent No.: US 6,980,903 B2  
(45) Date of Patent: Dec. 27, 2005

(54) EXHAUST GAS CONTROL USING A SPARK PLUG IONIZATION SIGNAL

(75) Inventors: Chao F. Daniels, Ypsilanti, MI (US); Guoming G. Zhu, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/458,691

(22) Filed: Jun. 11, 2003

(65) Prior Publication Data

US 2004/0088102 A1     May 6, 2004

Related U.S. Application Data

(60) Provisional application No. 60/423,163, filed on Nov. 1, 2002, provisional application No. 60/467,660, filed on May 2, 2003.

(51) Int. Cl.$^7$ ................................................. B60T 7/12
(52) U.S. Cl. .................... 701/108; 123/406.21; 73/116; 73/118.1; 701/102; 701/111
(58) Field of Search ........... 701/102–111; 123/406.44, 123/406.48, 406.59, 406.19, 406.21, 406.23; 73/118.1, 116, 117.2, 117.3

(56) References Cited

U.S. PATENT DOCUMENTS

| | | | |
|---|---|---|---|
| 4,186,701 A | 2/1980 | Suzuki et al. ................ 123/119 |
| 4,315,492 A | 2/1982 | Gardner ....................... 123/571 |
| 4,515,132 A | 5/1985 | Anderson et al. ............ 123/494 |
| 4,556,030 A | 12/1985 | Aono ........................... 123/425 |
| 4,622,638 A | 11/1986 | Anderson et al. ...... 364/431.08 |
| 4,624,229 A * | 11/1986 | Matekunas ............. 123/406.41 |
| 4,809,660 A * | 3/1989 | Marsh et al. .................. 477/52 |
| 4,843,556 A | 6/1989 | Wakeman et al. ..... 364/431.08 |
| 4,899,282 A | 2/1990 | Holmes .................. 364/431.08 |
| 5,639,961 A * | 6/1997 | Lautenschutz ............. 73/118.1 |
| 5,669,347 A * | 9/1997 | Cullen et al. ................ 123/306 |
| 5,765,532 A * | 6/1998 | Loye ........................... 123/435 |
| 5,861,551 A | 1/1999 | Morita et al. ................. 73/116 |
| 5,964,811 A | 10/1999 | Ishii et al. ..................... 701/29 |
| 5,983,862 A | 11/1999 | Nishiyama et al. .... 123/406.26 |
| 5,992,386 A | 11/1999 | Nytomt et al. ......... 123/406.37 |

(Continued)

FOREIGN PATENT DOCUMENTS

| | | | | |
|---|---|---|---|---|
| JP | 04325752 | * 11/1992 | ............ 123/568.29 |
| WO | WO 98/37322 | 8/1998 | |

*Primary Examiner*—Tony M. Argenbright  
*Assistant Examiner*—Johnny H. Hoang  
(74) *Attorney, Agent, or Firm*—Dickinson Wright PLLC

(57) ABSTRACT

This feature of the present invention comprises a method and apparatus to reduce NOx emissions in an internal combustion engine. This feature of the present invention uses a closed loop control of the exhaust gas re-circulation to provide the engine with the either EGR MBT timing or a knock limited timing to yield the minimum NOx emission with maximum fuel economy benefits associated with exhaust gas re-circulation. When the exhaust gas re-circulation rate is not knock limited, the engine sets its exhaust gas re-circulation rate to an optimal rate at which the engine runs at the exhaust gas re-circulation minimum best time for best torque spark timing limit. When the exhaust gas re-circulation rate is knock limited, the engine sets its exhaust gas re-circulation rate to a knock limited rate at which the engine runs at a retarded MBT spark timing limit. The engine uses calibratable MBT timing criteria to determine the retarded MBT spark timing limit.

18 Claims, 56 Drawing Sheets

U.S. PATENT DOCUMENTS

| | | | |
|---|---|---|---|
| 6,029,627 A | 2/2000 | VanDyne | 123/435 |
| 6,032,650 A | 3/2000 | Rask | 123/435 |
| 6,076,502 A | 6/2000 | Katashiba et al. | 123/435 |
| 6,085,132 A | 7/2000 | Ishii et al. | 701/29 |
| 6,125,801 A * | 10/2000 | Mendler | 123/48 R |
| 6,145,494 A | 11/2000 | Klopp | 123/525 |
| 6,151,545 A | 11/2000 | Jollerichs et al. | 701/74 |
| 6,182,645 B1 * | 2/2001 | Tsuchiya | 123/568.23 |
| 6,213,092 B1 | 4/2001 | Hohner et al. | 123/406.38 |
| 6,289,881 B1 | 9/2001 | Klopp | 123/525 |
| 6,349,592 B1 * | 2/2002 | Hirasawa et al. | 73/118.1 |
| 6,367,462 B1 | 4/2002 | McKay et al. | 123/568.21 |
| 6,560,526 B1 * | 5/2003 | Matekunas et al. | 701/104 |
| 2002/0007816 A1 | 1/2002 | Loye et al. | 123/295 |
| 2002/0038647 A1 | 4/2002 | Tashiro et al. | 123/350 |
| 2002/0107633 A1 * | 8/2002 | Iwasaki et al | 701/114 |

* cited by examiner

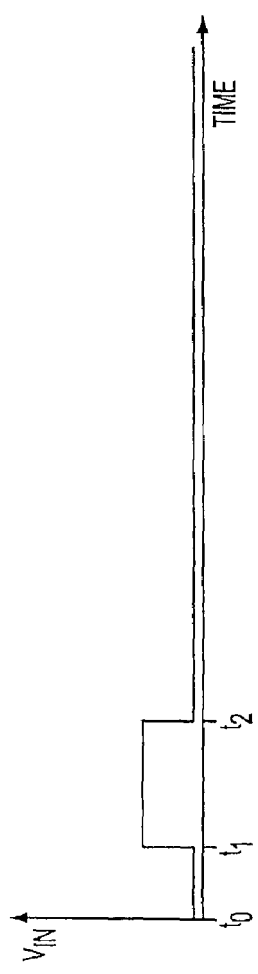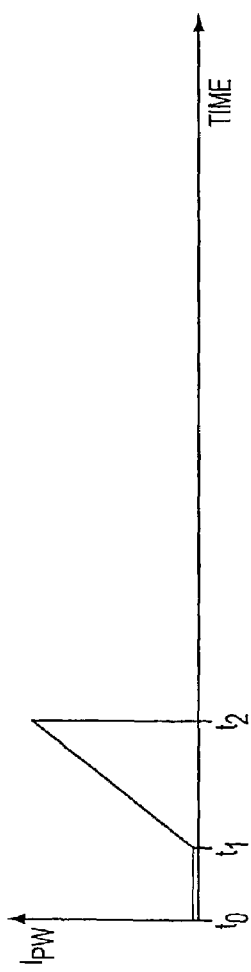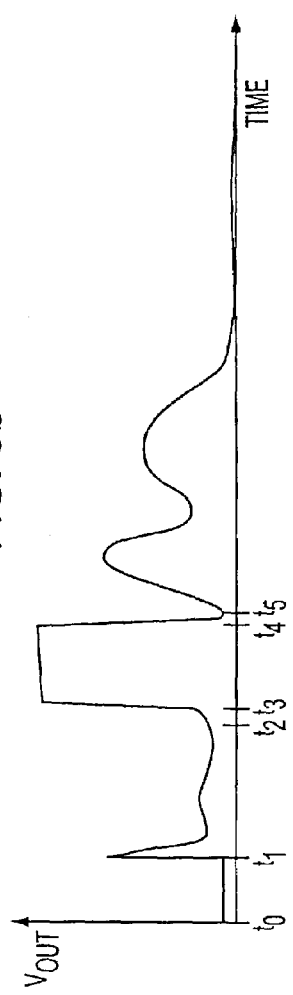

US 6,980,903 B2

EXHAUST GAS CONTROL USING A SPARK PLUG IONIZATION SIGNAL

CROSS-REFERENCE TO RELATED APPLICATIONS

This application claims benefit of U.S. Provisional Application Ser. Nos. 60/423,163, filed Nov. 1, 2002, and 60/467,660, filed May 2, 2003, the entire disclosure of these applications being considered part of the disclosure of this application and hereby incorporated by reference.

BACKGROUND OF THE INVENTION

1. Technical Field

This invention is related to the field of internal combustion engine systems and control. More particularly, it is related to an exhaust gas re-circulation control used to reduce NOx emissions in an internal combustion engine.

2. Discussion

The prior art includes a variety of conventional methods for detecting and using ionization current in a combustion chamber of an internal combustion engine. However, each of the various conventional systems suffers from a great variety of deficiencies. For example, prior art ionization current detection circuits are generally too slow and generate a current signal with low signal-to-noise ratio.

Exhaust gas re-circulation is an effective way to reduce NOx emissions in an internal combustion engine. The exhaust gas recirculation widely used in the prior art is calibrated using engine mapping points. That is, the desired exhaust gas re-circulation rates used in controlling an engine are mapped to various engine operating conditions such as load and speed. Due to engine to engine variation, engine aging, and engine operational environmental variation, open-loop calibration of a desired exhaust gas re-circulation rate is very conservative.

SUMMARY OF THE INVENTION

In view of the above, the described features of the present invention generally relate to one or more improved systems, methods and/or apparatuses for detecting and/or using an inonization current in the combustion chamber of an internal combustion engine.

In one embodiment, the invention comprises a method of controlling exhaust gas re-circulation, including using MBT criterion to control exhaust gas re-circulation.

In another embodiment, the step of using a calibratable MBT timing criterion to control exhaust gas re-circulation further comprises the steps of running an engine at an exhaust gas re-circulation minimum best time for best torque spark timing when the engine is not knock limited, and running an engine at an offset from the exhaust gas re-circulation minimum best time for best torque spark timing when the engine is knock limited.

In a further embodiment, the step of running an engine at an offset from the exhaust gas re-circulation minimum best time for best torque spark timing when the engine is knock limited comprises setting the exhaust gas re-circulation rate to a knock limited exhaust gas re-ion circulation rate.

In another embodiment, the step of running an engine at an exhaust gas re-ion circulation minimum best time for best torque spark timing when said engine is not knock limited comprises setting the exhaust gas re-circulation rate to an optimal exhaust gas re-ion circulation rate.

In a further embodiment, the invention comprises an exhaust gas re-circulation controller including a closed loop, whereby exhaust gas re-circulation is controlled by said closed loop.

In another embodiment, the closed loop comprises a first table comprising a map of exhaust gas re-circulation rates at specific operating conditions, a gain and error generator having an input operably connected to an output of the first table, a proportional and integral PI controller having an input operably connected to an output of the gain and error generator, a second table comprising a map of maximum exhaust gas re-circulation rates and stability criterion, and a summer having a first input operably connected to an output of the proportional and integral controller, a second input operably connected to an output of the second table, and an output operably connected to an input of the second table.

In a further embodiment, the closed loop further comprises a saturation manager, having an output operably connected to an input of the proportional and integral controller, a rate adaptor operably connected between the output of the summer and the input of the second table, and an exhaust gas re-circulation valve metering controller having an input operably connected to the saturation manager.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 9a is a graph of the control signal $V_{IN}$ from the PCM to the IGBT versus time.

FIG. 9b is a graph of the current flow $I_{PW}$ through the primary winding of the ignition coil versus time;

FIG. 9c illustrates an output voltage signal Vout resulting from a normal combustion event.

DETAILED DESCRIPTION OF THE PREFERRED EMBODIMENT

Figure 1:
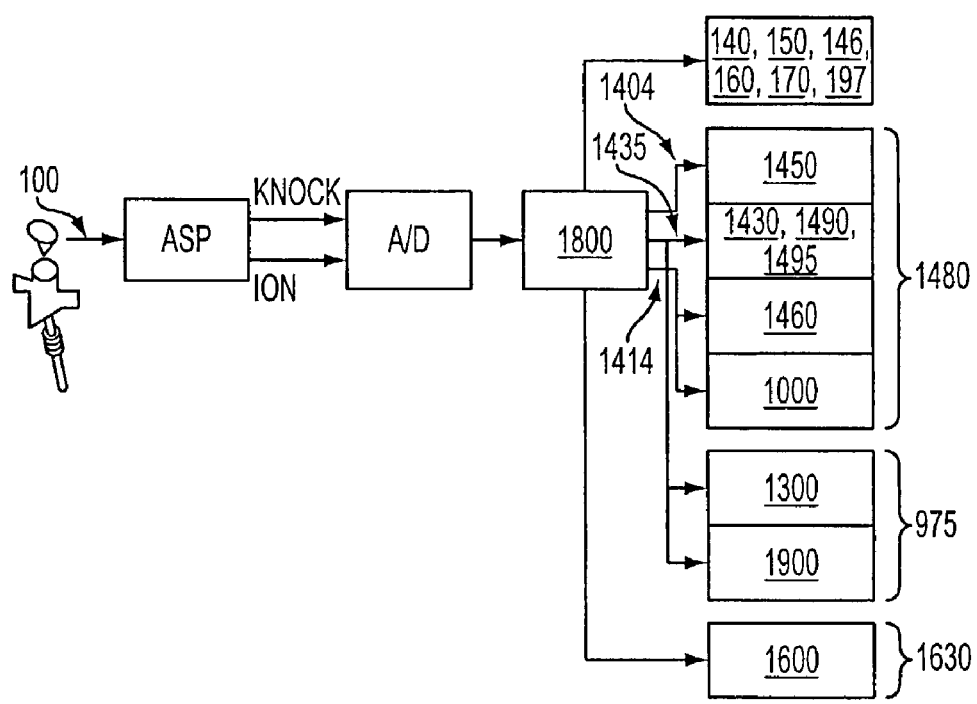
FIG. 1 illustrates an ionization feedback and control system.

The present invention detects an ionization signal in an engine combustion chamber from an ionization detection circuit. The system and associated subsystems described herein use the detected ionization signal to monitor ignition parameters, diagnose and improve engine performance, detect cylinder ID, control air-to-fuel ratio, control spark retard timing, control minimum timing for best torque timing, and control exhaust gas recirculation, in addition to other features disclosed in the following embodiments. For clarity, it is noted that many of the details concerning the method and apparatus for using the ionization signal and closed loop control of the exhaust gas re-circulation to provide the engine with either the minimum timing for best torque timing or knock limited timing to yield the maximum fuel economy benefits associated with exhaust gas re-circulation according to the present invention are described in Section I of this detailed description.

This detailed description includes a number of inventive features generally related to the detection and/or use of an ionization current. The features may be used alone or in combination with other described features. While one or more of the features are the subject of the pending claims, other features not encompassed by the appended claims may be covered by the claims in one or more separate applications filed on even date by or on behalf of the assignee of the present application.

For clarity, each of the features is described in separate sections of this detailed description. Section A discloses the use of an ionization signal from an ionization detection circuit to monitor ignition parameters, such as primary charge timing (or time), primary charge duration, ignition or spark timing, and ignition or spark duration for future "smart" ignition system control.

Section B discloses a circuit for measuring ionization current in a combustion chamber of an internal combustion engine in this circuit, the ignition current and the ionization current flow in the same direction through the secondary winding of the ignition coil and the circuit detects an ionization signal by applying a bias voltage between a spark plug gap. Notwithstanding the described preferred circuit, those skilled in the art will appreciate that many of the features of the invention may be implemented through other ionization detection circuits or methodologies without departing from the scope of the appended claims.

Section C discloses an ignition diagnostics and a feedback control system based upon detected ionization current in an individual cylinder. The system is divided into two subsystems, the ignition diagnostics subsystem and the ignition feedback control subsystem, both of which function to improve fuel economy and reduce emission engine calibrations.

Section D discloses the use of an ionization signal to optimize the air to fuel ratio of a combustion mixture when an engine is operated at wide open throttle. The ionization signal is used to detect the air to fuel ratio that yields the highest torque at wide open throttle. At the same time, a closed loop controller is used to regulate the air to fuel ratio when the engine is operated at the wide open throttle.

Section E discloses using a closed loop spark timing controller to control the spark retard timing during an engine cold start to retard the engine spark timing as much as possible without engine misfire and with minimum partial burn. The increased exhaust temperature heats up the catalyst quickly which, as a result, reduces hydrocarbon emissions.

Section F discloses a method to determine engine minimum spark timing for best torque timing at current operational conditions using a spark plug ionization signal. It is a multi-criteria minimum timing for best torque timing estimation method which utilizes a combination of the maximum flame acceleration location, the 50% burn location, and the second peak location to determine engine minimum timing for best torque timing.

Section G discloses a subsystem comprising a closed loop controller which uses estimated minimum timing for best torque timing criteria generated from either (or both) an ionization signal and an in-cylinder pressure signal and ignition diagnostics (knock, partial-burn, and misfire) to control engine ignition timing. Three different embodiments of the closed loop minimum timing for best torque timing control architecture are disclosed. They are differentiated by whether the minimum timing for best torque timing is controlled cylinder-by-cylinder or globally. The first embodiment controls the engine minimum timing for best torque spark timing of each cylinder individually. That is, the minimum timing for best torque, knock, and misfire information of a given cylinder is used to control that cylinder's minimum timing for best torque timing. The second embodiment uses an averaged approach. The third embodiment uses a mixed approach.

Section H uses the linear relationship between air to fuel ratio versus minimum timing for best torque criteria to balance the air to fuel ratio for individual cylinders. In a preferred embodiment, a closed loop controller is used to adjust (or trim) the fuel of individual cylinders such that all cylinders have the same minimum timing for best torque timing criterion.

Section I uses the ionization signal and closed loop control of the exhaust gas recirculation to provide the engine with either the minimum timing for best torque timing or knock limited timing to yield the maximum fuel economy benefits associated with exhaust gas re-circulation.

Section J uses the maximum acceleration rate of the net pressure increase resulting from the combustion in a cylinder to control spark timing.

Section A: Ignition Diagnosis Using Ionization Signal

This feature utilizes the ionization signal from an ionization detection circuit to monitor ignition parameters, such as primary charge timing (or time), primary charge duration, ignition or spark timing, and ignition or spark duration for future "smart" ignition system control. In addition, the ionization signal is also used to detect spark plug carbon fouling, insulator overheating, pre-ignition, as well as a failed ionization circuit or ignition coil.

The performance of an engine is heavily dependent upon the performance of its ignition system, especially at low load and high EGR (exhaust gas recirculation) conditions. Understanding how the ignition system behaves at various engine conditions is very beneficial to "smart" control of the ignition system. Typically, the primary coil of an ignition system is charged close to a desired amount of energy as a function of engine operational conditions such as the local mixture A/F (air to fuel) ratio, pressure, temperature, and EGR concentration. The actual charged energy of the primary coil and discharged energy of the secondary coil are unknown. This leads to an ignition system that is not robust to parts-to-parts variation, engine aging, engine operational environmental charges, etc. To improve the ignition system robustness, a "smart" ignition system that can change its charged energy to match the discharged energy is desirable. Therefore, the secondary discharge information is very important. Since the breakdown voltage and spark duration at the discharge moment can be different from cycle to cycle, it is desirable to monitor some of these parameters.

This invention uses the spark plug ionization signal to monitor the primary charge time (or primary charge timing 146) and primary charge duration, and also the secondary discharge time and duration to lay the foundation for "smart" control of the ignition system 110. In addition, this invention also includes using the ionization signal to detect spark plug malfunction, such as carbon fouling or insulator overheating 197, pre-ignition 190, and a failed ionization circuit or/and ignition coil.

This feature of the invention is generally directed to a subsystem of an ignition diagnostics and feedback control system using ionization current feedback. The relationship of this subsystem to the diagnostics and control system is shown in FIG. 1 in the top box "Ignition system diagnostics", 140, 150, 146, 160, 170, and 197, which comprises the following ignition parameters: ignition duration 170, charge duration 150, warning signal 197, primary charge time 146, ignition timing 160, and pre-charge 140. The four blocks of the ignition diagnostics and feedback control system using ionization current feedback that are directed to spark timing 1480 are the CL knock (advance) limit control 1450, the closed-loop MBT spark control 1430, 1490 and 1495, CL misfire & partial burn (retard) limit control 1460 and the CL cold start retard limit control 1000. There are two blocks directed to the fuel trim vector 975, the individual cylinder A/F ratio control 1300 and the WOT A/F ratio optimization 1900. There is one block directed to the desired EGR rate 1630, the EGR rate optimization 1600. The three other blocks shown in FIG. 1 are an analog signal processing block ASP, an A/D conversion block A/D and a parameter estimation block 1800. The parameter estimation block is shown outputting knock 1404, MBT 1435 and misfire 1414 signals. The input to the analog signal processing block ASP is an ionization current 100.

Figure 2:
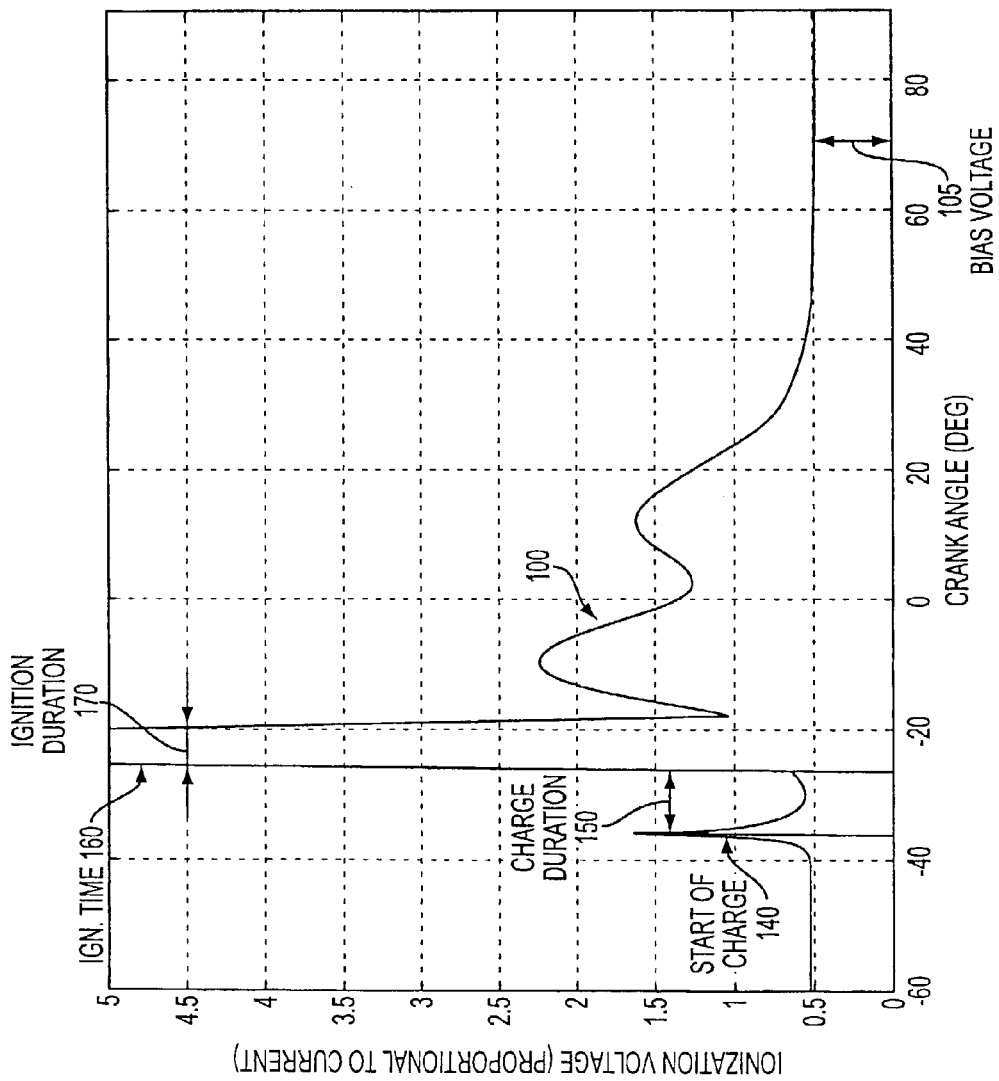
FIG. 2 is a graph of an ionization signal.
Figure 3:
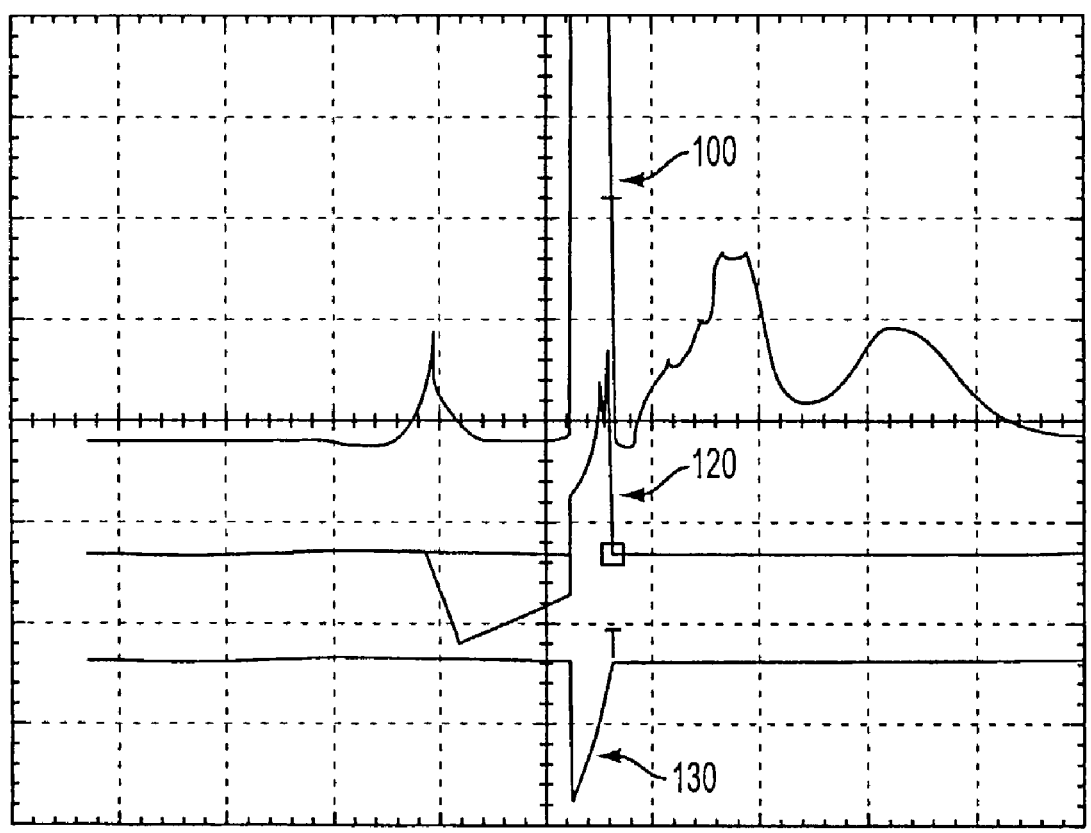
FIG. 3 is a graph that compares the secondary signals and the ionization signals.

A typical ionization signal 100 versus crank angle is shown in FIG. 2. Note that the signal shown is a voltage that is proportional to the detected ionization current. Comparing the secondary voltage 120 and current waveforms 130 (FIG. 3), it is clear that the initial rise of the ion signal before the sharp change at the ignition time is the pre-charge (or start of charge) of the primary coil 140. See FIG. 2. After the primary coil charge is completed, the signal goes down and rises almost vertically (i.e., a step rise) versus crank angle. The breakdown has occurred at the step's rising edge. Spark timing can be detected based on this point. That is, the ignition or spark time occurs when the ionization signal has a step rise. This is the ignition or spark time 160. The time difference between the first rise and the stepped rise is the primary charge duration 150. When the arc between the spark gap dies out, the signal declines rapidly and the secondary current 130 due to the spark reaches zero (see FIG. 3). The duration between the sharp stepped rising and the subsequent declining represents the ignition duration 170. Therefore, based on the ionization signal, the primary charge time 146, the primary charge duration 150, the ignition timing 160, and the ignition duration 170 can be detected. These parameters can be monitored for every cylinder of the engine for each engine cycle.

Figure 4:
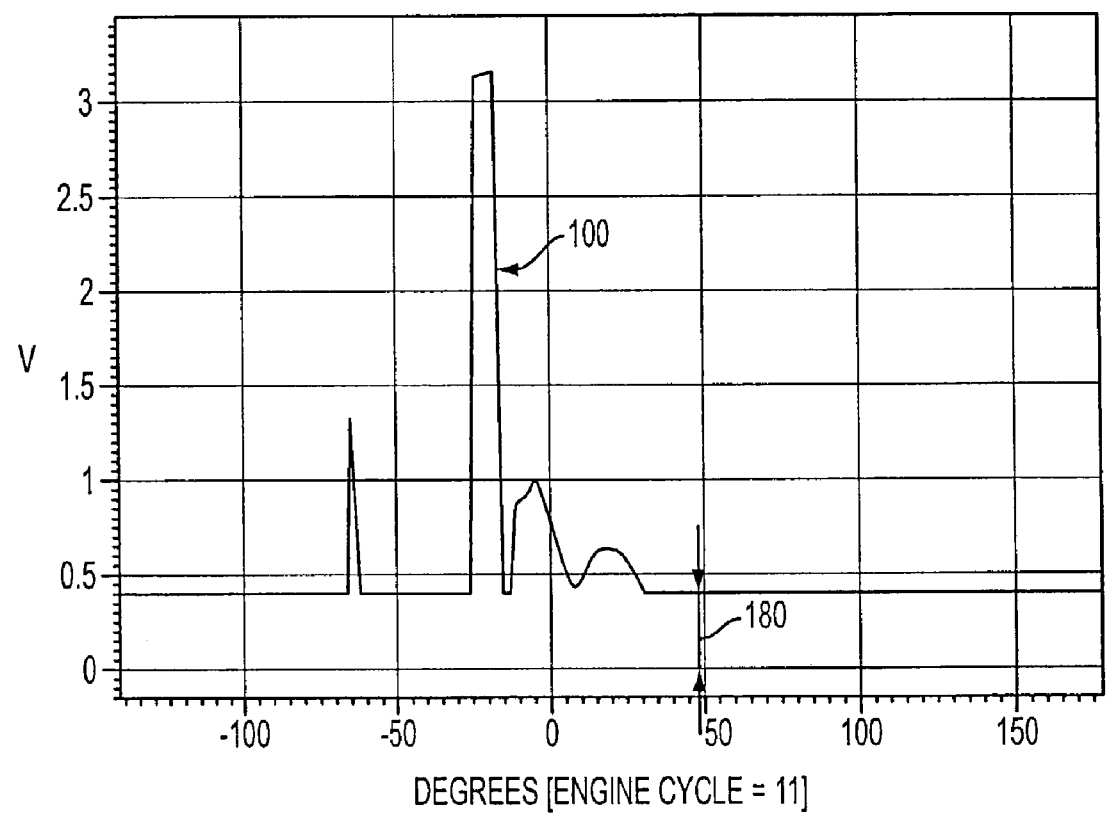
FIG. 4 is a graph of an ionization signal when the plug is fouled and the insulator is overheated.
Figure 6:
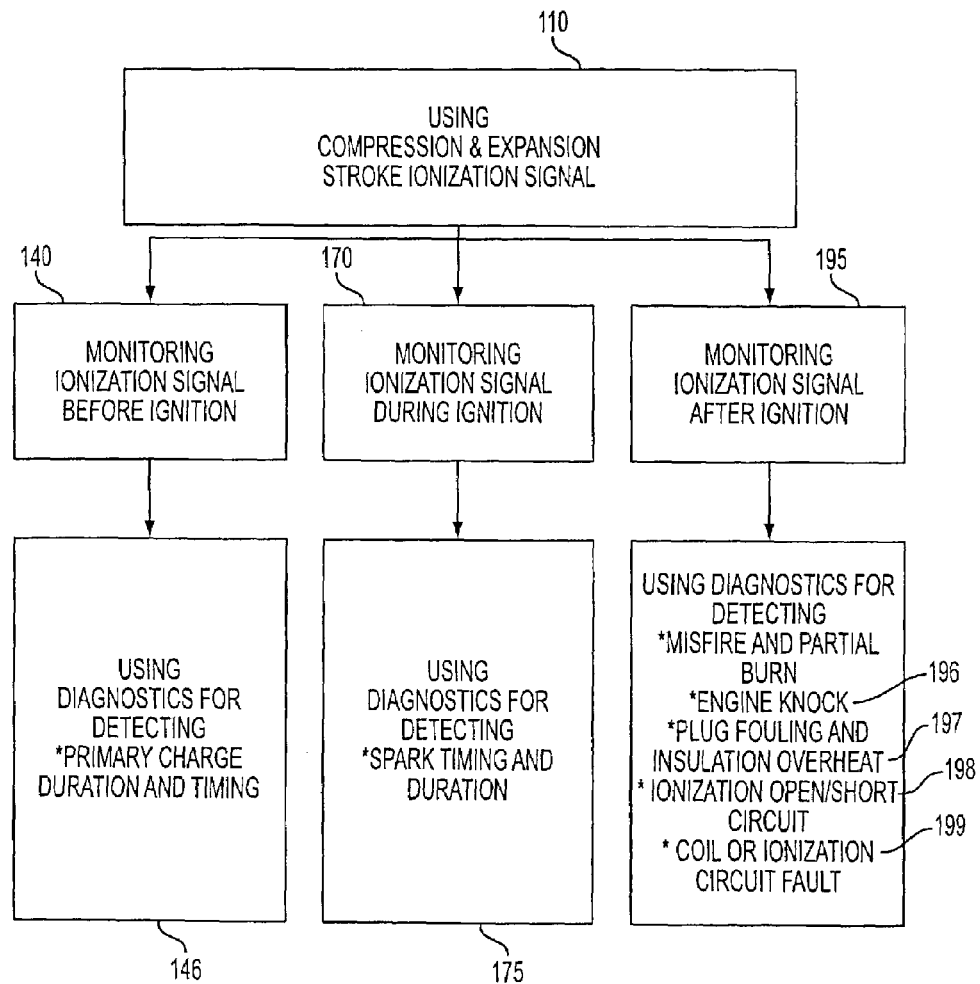
FIG. 6 is a diagnostics flowchart of the steps taken in the present embodiment of a method of monitoring ignition efficiency.

When a spark plug is fouled, or the spark plug insulator is overheated, or the plug itself is temporarily contaminated by fuel spray, the insulator of the spark plug serves as a conductor. At these conditions, the ionization signal baseline is no longer equal to the bias voltage 105. Depending on how badly the plug is fouled and how overheated the insulator is, the ionization baseline will be elevated 180 (FIG. 4) from the bias voltage 105. Meanwhile, part of the ignition energy will leak through the fouled plug or the insulator during the primary charge period. Eventually the remaining energy is not enough to jump the spark gap and a misfire will occur (196) (FIG. 6). For some cases, the baseline can be so high that it reaches the limit of the ionization signal and the signal becomes of little use. Once the baseline is elevated to (or beyond) a certain threshold (e.g., an elevation of approximately 20% or 1 volt above the initial baseline), a warning signal indicating plug fouling or overheating will be sent out 197 (FIG. 6).

Figure 5:
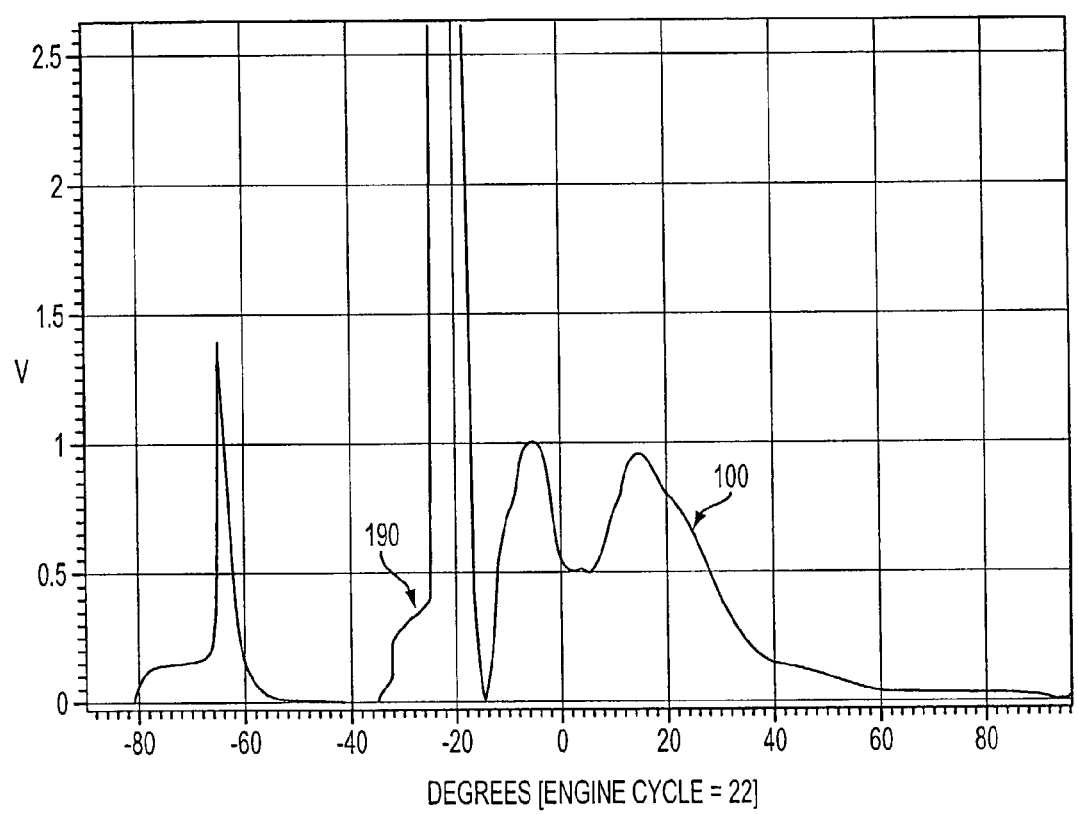
FIG. 5 illustrates the effect of pre-ignition on an ionization signal.

When pre-ignition occurs in the cylinder, the ionization signal 100 will detect ions before the ignition happens (190), see FIG. 5 which shows pre-ionization due to pre-ignition. One pre-ignition cycle could lead to an even earlier pre-ignition during the next cycle and damage the engine. It is desirable to control the engine to a cooler operating condition once the pre-ignition is detected.

Figure 7:
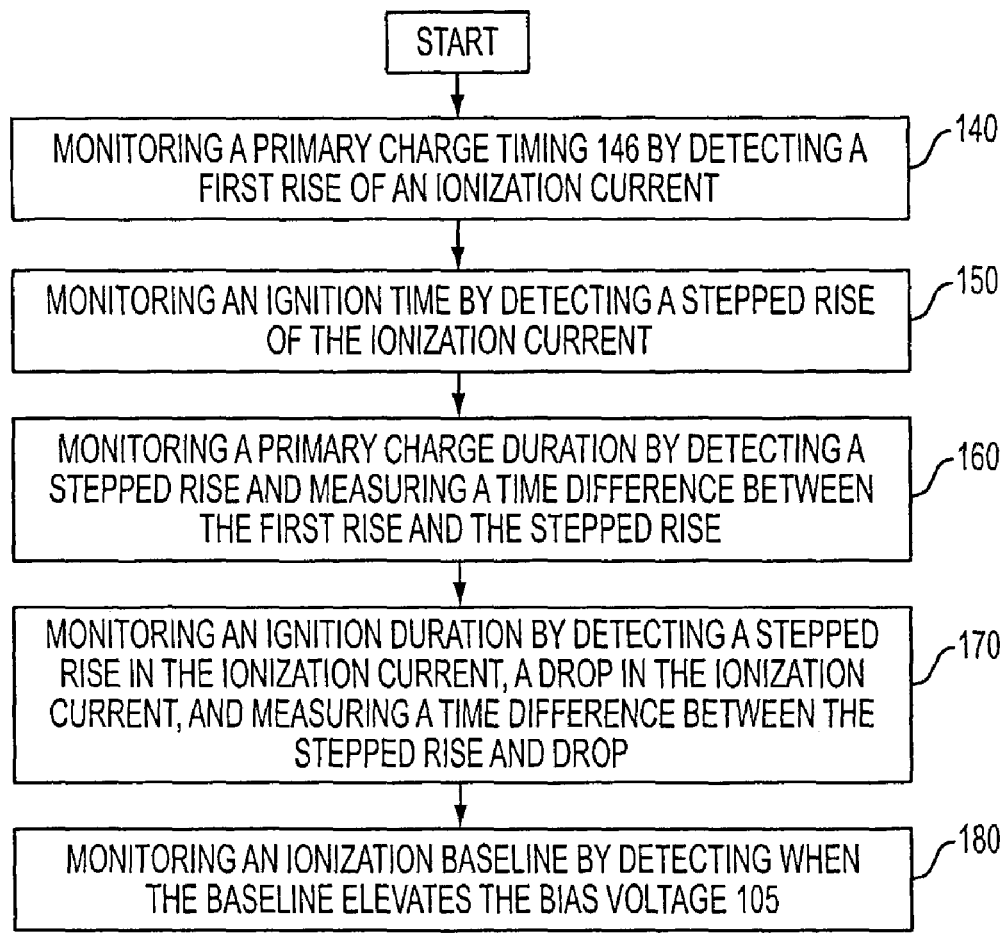
FIG. 7 is a flowchart of the steps taken in the present embodiment to diagnose the ignition using the ionization signal.

In order to detect an open or a shorted ionization circuit, the bias voltage (105) is sampled far away from the ignition and combustion events (e.g., 180 degree after the top dead center). If the sampled bias voltage is below a given threshold (such as 0.5 volt), an open ionization circuit or a short to ground fault can be detected 198 (FIG. 6); if the bias voltage is greater than a threshold (e.g., 4.5 volts), an ionization circuit that is shorted to the battery shall be declared 199 (FIG. 6). The open or short circuit information can then be used to diagnose the condition of the ignition system (see FIGS. 6 and 7).

Section B: Circuit for Measuring Ionization Current

Figure 8:
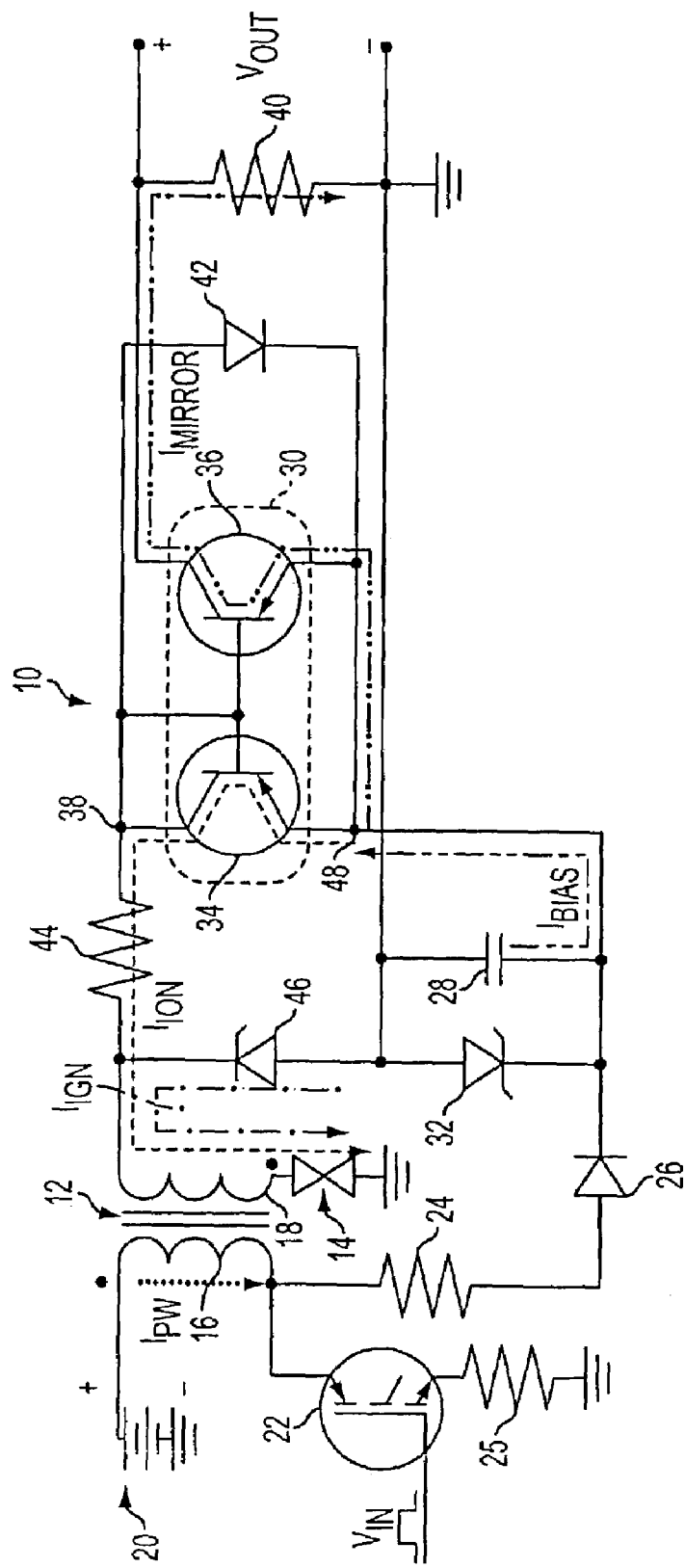
FIG. 8 is an electrical schematic of a circuit for measuring ionization current in a combustion chamber of an internal combustion engine.

FIG. 8 is a basic electrical schematic of a circuit 10 for measuring ionization current in a combustion chamber of an internal combustion engine. The components and configuration of the circuit 10 are described first, followed by a description of the circuit operation.

First, with regard to the components and configuration of this feature, the circuit 10 includes an ignition coil 12 and an ignition or a spark plug 14 disposed in a combustion chamber of an internal combustion engine. The ignition coil 12 includes a primary winding 16 and a secondary winding 18. The ignition plug 14 is connected in electrical series between a first end of the secondary winding 18 and ground potential. The electrical connections to a second end of the secondary winding 18 are described further below. A first end of the primary winding 16 is electrically connected to a positive electrode of a battery 20. A second end of the primary winding 16 is electrically connected to the collector terminal of an insulated gate bipolar transistor (IGBT) or other type of transistor or switch 22 and a first end of a first resistor 24. The base terminal of the IGBT 22 receives a control signal, labeled $V_{IN}$ in FIG. 8, from a powertrain control module (PCM) not shown. Control signal $V_{IN}$ gates IGBT 22 on and off. A second resistor 25 is electrically connected in series between the emitter terminal of the IGBT 22 and ground. A second end of the first resistor 24 is electrically connected to the anode of a first diode 26.

The circuit 10 further includes a capacitor 28. A first end of the capacitor 28 is electrically connected to the cathode of the first diode 26 and a current mirror circuit 30. A second end of the capacitor 28 is grounded. A first zener diode 32 is electrically connected across or, in other words, in parallel with the capacitor 28 with the cathode of the first zener diode 32 electrically connected to the first end of the capacitor 28 and the anode of the first zener diode 32 electrically connected to ground.

The current mirror circuit 30 includes first and second pnp transistors 34 and 36 respectively. The pnp transistors 34 and 36 are matched transistors. The emitter terminals of the pnp transistors 34 and 36 are electrically connected to the first end of the capacitor 28. The base terminals of the pnp transistors 34 and 36 are electrically connected to each other as well as a first node 38. The collector terminal of the first pnp transistor 34 is also electrically connected to the first node 38, whereby the collector terminal and the base terminal of the first pnp transistor 34 are shorted. Thus, the first pnp transistor 34 functions as a diode. A third resistor 40 is electrically connected in series between the collector terminal of the second pnp transistor 36 and ground.

A second diode 42 is also included in the circuit 10. The cathode of the second diode 42 is electrically connected to the first end of the capacitor 28 and the emitter terminals of the first and second pnp transistors 34 and 36. The anode of the second diode 42 is electrically connected to the first node 38.

The circuit 10 also includes a fourth resistor 44. A first end of the fourth resistor 44 is electrically connected to the first node 38. A second end of the fourth resistor 44 is electrically connected the second end of the secondary winding 18

(opposite the ignition plug 14) and the cathode of a second zener diode 46. The anode of the second zener diode 46 is grounded.

Referring now to FIGS. 8 and 9, the operation of the circuit 10 is described. FIG. 9a is a graph of the control signal $V_{IN}$ from the PCM to the IGBT 22 versus time. FIG. 9b is a graph of the current flow $I_{PW}$ through the primary winding 16 of the ignition coil 12 versus time. FIG. 9c is a graph of an output voltage signal from the circuit 10 versus time. As mentioned above, the IGBT 22 receives the control signal $V_{IN}$ from the PCM to control the timing of 1) the ignition or combustion and 2) the charging of the capacitor 28. In this circuit configuration, the IGBT 22 is operated as a switch having an OFF, or non-conducting state, and an ON, or conducting state.

Initially, at time=$t_0$, the capacitor 28 is not fully charged. The control signal $V_{IN}$ from the PCM is LOW (see FIG. 9a) thereby operating the IGBT 22 in the OFF, or non-conducting, state. Primary winding 16 sees an open circuit and, thus, no current flows through the winding 16.

At time=$t_1$, the control signal $V_{IN}$ from the PCM switches from LOW to HIGH (see FIG. 9a) thereby operating the IGBT 22 in the ON, or conducting, state. Current from the battery 20 begins to flow through the primary winding 16 of the ignition coil 12, the conducting IGBT 22, and the second resistor 25 to ground. Any of a number of switches or switching mechanisms can be used to connect current through the primary winding 16. In a preferred embodiment IGBT 22 is used. Between time=$t_1$ and time=$t_2$, the primary winding current $I_{PW}$, (illustrated in FIG. 8 with a dotted line) begins to rise. The time period between time=$t_1$ and time=$t_2$ is approximately one millisecond which varies with the type of ignition coil used.

At time=$t_2$, the control signal $V_{IN}$ from the PCM switches from HIGH to LOW (see FIG. 9a) thereby operating the IGBT 22 in the OFF, or non-conducting, state. As the IGBT 22 is switched OFF, flyback voltage from the primary winding 16 of the ignition coil 12 begins to quickly charge the capacitor 28 up to the required bias voltage. Between time=$t_2$ and time=$t_3$, the voltage at the first end of the secondary winding 18 connected to the spark plug 14 rises to the voltage level at which the ignition begins. The time period between time= $t_2$ and time=$t_3$ is approximately ten microseconds. The first resistor 24 is used to limit the charge current to the capacitor 28. The resistance value of the first resistor 24 is selected to ensure that the capacitor 28 is fully charged when the flyback voltage is greater that the zener diode.

At time=$t_3$, an ignition voltage from the secondary winding 18 of the ignition coil 12 is applied to the ignition plug 14 and ignition begins. Between time=$t_3$ and time=$t_4$, combustion of the air/fuel mixture begins and an ignition current $I_{IGN}$ (illustrated in FIG. 8 with a dash-dot line) flows through the second Zener diode 46, the secondary winding 18 of the ignition coil 12, and the ignition plug 14 to ground. At time=$t_4$, the ignition is completed and the combustion of the air/fuel mixture continues.

At time=$t_5$, the combustion process continues and the charged capacitor 28 applies a bias voltage across the electrodes of the ignition plug 14 producing an ionization current $I_{ION}$ due to the ions produced by the combustion process which flows from the capacitor 28. The current mirror circuit 30 produces an isolated mirror current $I_{MIRROR}$ identical to the ionization current $I_{ION}$. A bias current $I_{BIAS}$ (illustrated in FIG. 8 with a phantom or long dash-short dash-short dash line) which flows from the capacitor 28 to the second node 48 is equal to the sum of the ionization current $I_{ION}$ and the isolated mirror current $I_{MIRROR}$ (i.e., $I_{BIAS}=I_{ION}+I_{MIRROR}$).

The ionization current $I_{ION}$ (illustrated in FIG. 8 with a dashed line) flows from the second node 48 through the first pnp transistor 34, the first node 38, the fourth resistor 44, the secondary winding 18 of the ignition coil 12, and the ignition plug 14 to ground. In this manner, the charged capacitor 28 is used as a power source to apply a bias voltage, of approximately 80 volts, across the spark plug 14 to generate the ionization current $I_{ION}$. The bias voltage is applied to the spark plug 14 through the secondary winding 18 and the fourth resistor 44. The secondary winding induction, the fourth resistor 44, and the effective capacitance of the ignition coil limit the ionization current bandwidth. Accordingly, the resistance value of the fourth resistor 44 is selected to maximize ionization signal bandwidth, optimize the frequency response, and also limit the ionization current. In one embodiment of the present invention, the fourth resistor 44 has a resistance value of 330 k ohms resulting in an ionization current bandwidth of up to twenty kilohertz.

The current mirror circuit 30 is used to isolate the detected ionization current $I_{ION}$ and the output circuit. The isolated mirror current $I_{MIRROR}$ (illustrated in FIG. 8 with a dash-dot-dot line) is equal to or, in other words, a mirror of the ionization current $I_{ION}$. The isolated mirror current $I_{MIRROR}$ flows from the second node 48 through the second pnp transistor 36 and the third resistor 40 to ground. To produce a isolated mirror current signal $I_{MIRROR}$ which is identically proportional to the ionization current $I_{ION}$, the first and second pnp transistors 34 and 36 must be matched, i.e., have the identical electronic characteristics. One way to achieve such identical characteristics is to use two transistors residing on the same piece of silicon. The isolated mirror current signal $I_{MIRROR}$ is typically less than 300 microamps. The third resistor 40 converts the isolated mirror current signal $I_{MIRROR}$ into a corresponding output voltage signal which is labeled as $V_{OUT}$ in FIG. 8. The resistance value of the third resistor 40 is selected to adjust the magnitude of the output voltage signal $V_{OUT}$. The second diode 42 protects the mirror transistors 34 and 36 by biasing on and providing a path to ground if the voltage at node 38 crosses a threshold. A third transistor can also be used to protect the mirror transistor.

FIG. 9c illustrates an output voltage signal $V_{OUT}$ resulting from a normal combustion event. The portion of the output voltage signal $V_{OUT}$ from time=$t_5$ and beyond can be used as diagnostic information regarding combustion performance. To determine the combustion performance for the entire engine, the ionization current in one or more combustion chambers of the engine can be measured by one or more circuits 10 respectively.

In the present circuit 10, the ignition current $I_{IGN}$ and the ionization current $I_{ION}$ flow in the same direction through the secondary winding 18 of the ignition coil 12. As a result, the initiation or, in other words, the flow of the ionization current as well as the detection of the ionization current is quick. In the present circuit 10, the charged capacitor 28 operates as a power source. Thus, the circuit 10 is passive or, in other words, does not require a dedicated power source. The charged capacitor 28 provides a relatively high bias voltage from both ionization detection and the current mirror circuit 30. As a result, the magnitude of the mirrored, isolated current signal $I_{MIRROR}$ is large and, thus, the signal-to-noise ratio is high.

Section C: Ignition Diagnosis and Combustion Feedback Control System Using an Ionization Signal The spark ignition (SI) engine combustion process is governed by the in-cylinder air to fuel (A/F) ratio, temperature and pressure, exhaust gas re-circulation (EGR) rate, ignition time and duration, and other factors. Engine emission and fuel economy are dependent on the engine's combustion process. For homogeneous combustion engines, most often the engine air to fuel (A/F) ratio is controlled in a closed loop using a feedback signal either from a heated exhaust gas oxygen (HEGO) or from a universal exhaust gas oxygen (UEGO) sensor. The exhaust gas re-circulation (EGR) rate is controlled with the help of a delta ($\Delta$) pressure measurement. Due to the high cost of an in-cylinder pressure sensor, engine spark timing is controlled in an open loop and is corrected using a knock detection result. As a result of open loop control, the engine combustion process is sensitive to operational conditions, engine-to-engine variation, engine aging, and other related factors. This sensitivity results in a complicated calibration process due to engine mapping and the calibration process of various spark timing lookup tables, trims and adders, where the spark timing tables are used to vary the ignition/spark timing as function of engine speed and load, and the trims and adders are used to compensate engine ignition/spark timing when a special engine operational condition occurs (e.g., transient operation). The present invention proposes an ignition diagnostics and feedback control system using an ionization current as a feedback signal to improve ignition system robustness with respect to engine operational conditions, engine-to-engine variations, engine aging, and other related factors to reduce engine calibration needs.

Spark ignited engine systems in the prior art have several disadvantages and drawbacks. For example, the ignition control process is open loop and the actual ignition time and duration are unknown. Further, the command ignition time is controlled in an open loop with lookup tables as function of engine speed, load, etc., along with trims and adders to compensate engine operational condition variations. Additionally, the limitations imposed by using accelerometer-based engine knock detection prevent the spark ignition engine from running at its knock limit when needed, leading to reduced fuel economy.

In contrast, features of the present invention include individual cylinder diagnostics features such as ignition system diagnostics: charge timing 146, charge duration 145, ignition timing 160, ignition duration 170, plug fouling 197, pre-ignition 190, etc.; misfire detection: misfire flag 414, partial burn flag 412, and other related factors; knock detection: knock flag 404 and knock intensity 402; and MBT timing detection: robust multi-criteria MBT timing estimator 200.

Furthermore, features of the present invention also include control features such as closed loop cold start retard spark control using ionization feedback 1000; Closed loop MBT timing control using ionization feedback 1430, 1490, 1495; Closed-loop individual cylinder A/F ratio balancing 1300; Optimal wide open throttle air/fuel ratio control 1900; and Exhaust gas control using a spark plug ionization signal 1600.

Figure 10A:
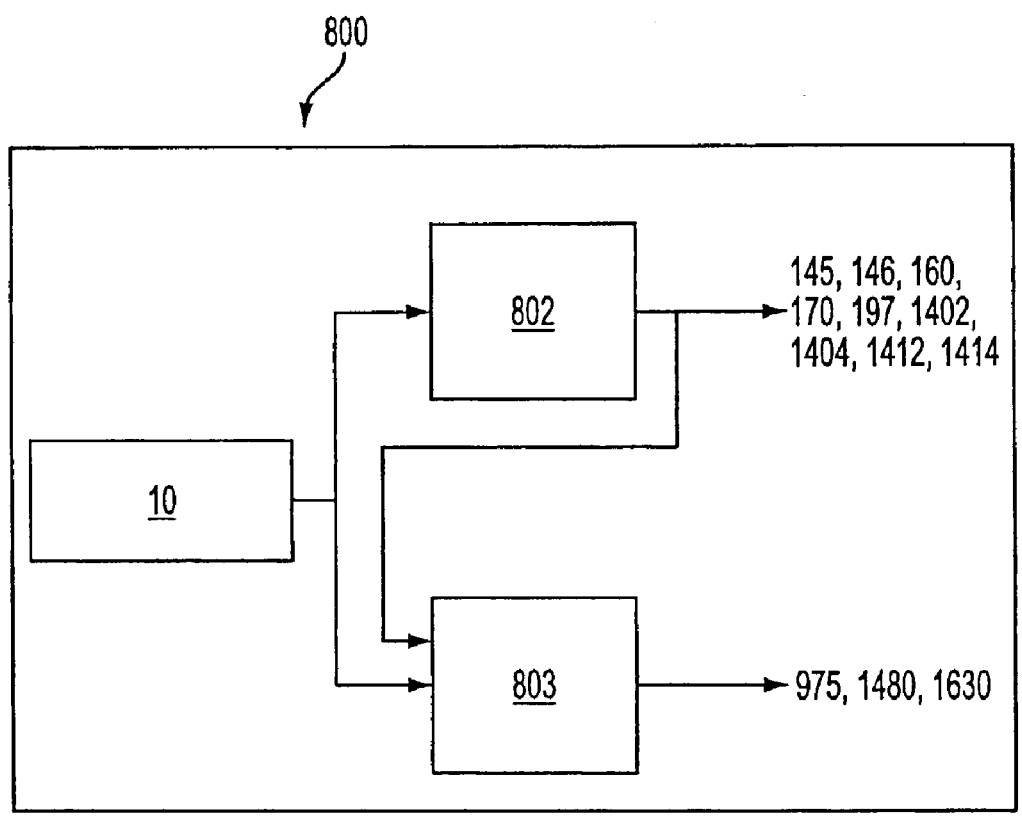
FIG. 10a is a block diagram of the ignition diagnostics and feedback control system of the present invention.
Figure 10B:
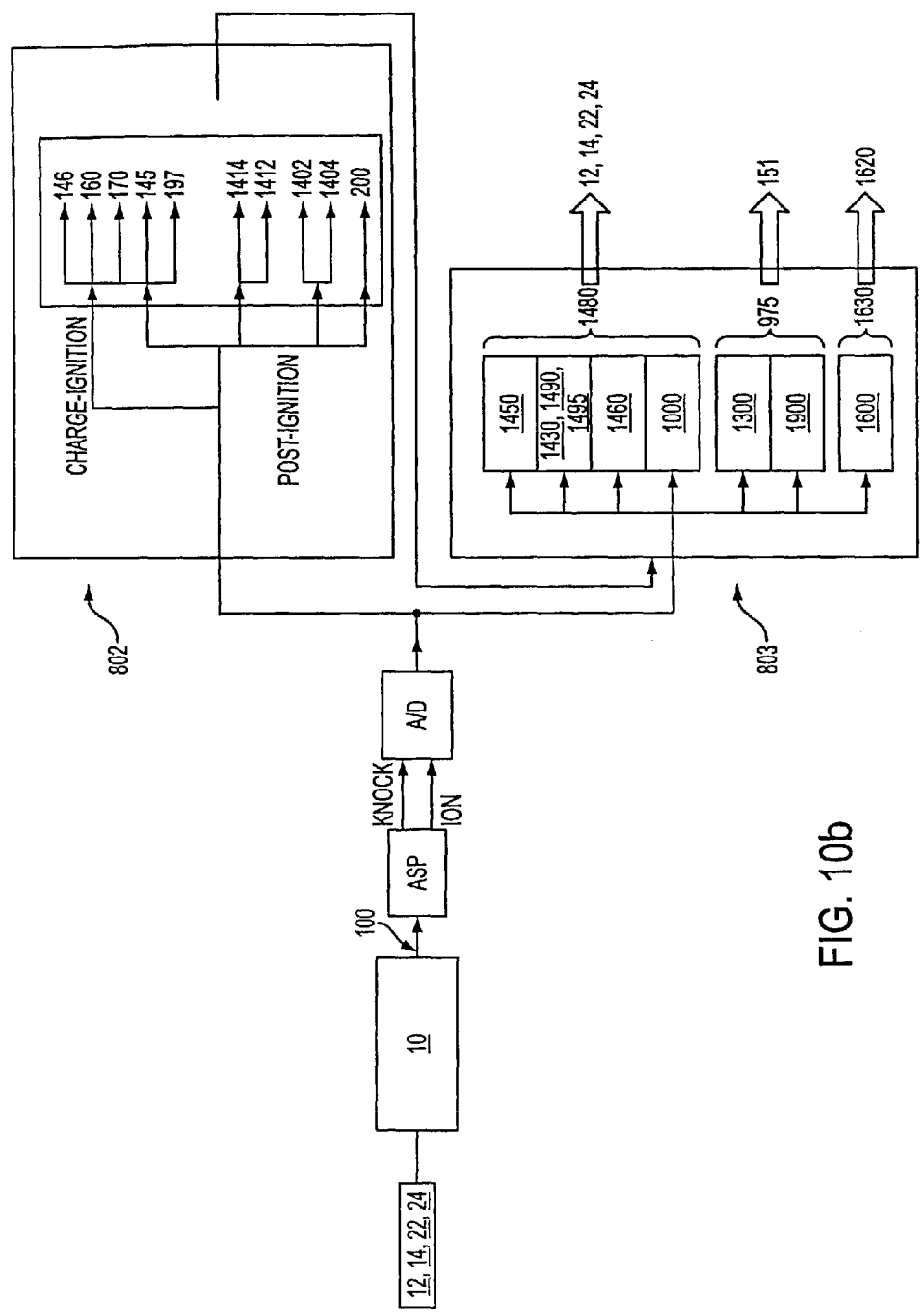
FIG. 10b is a block diagram of the ignition diagnostics and feedback control system of the present invention containing the features of each subsystem.

The present invention includes an ignition diagnostics and a feedback control system based upon detected ionization current in an individual cylinder 801. The system 801 is divided into two subsystems as illustrated in FIGS. 10a and 10b. The ignition diagnostics subsystem 802 and the ignition feedback control subsystem 803 both function to improve fuel economy and reduce emission engine calibrations.

Figure 11:
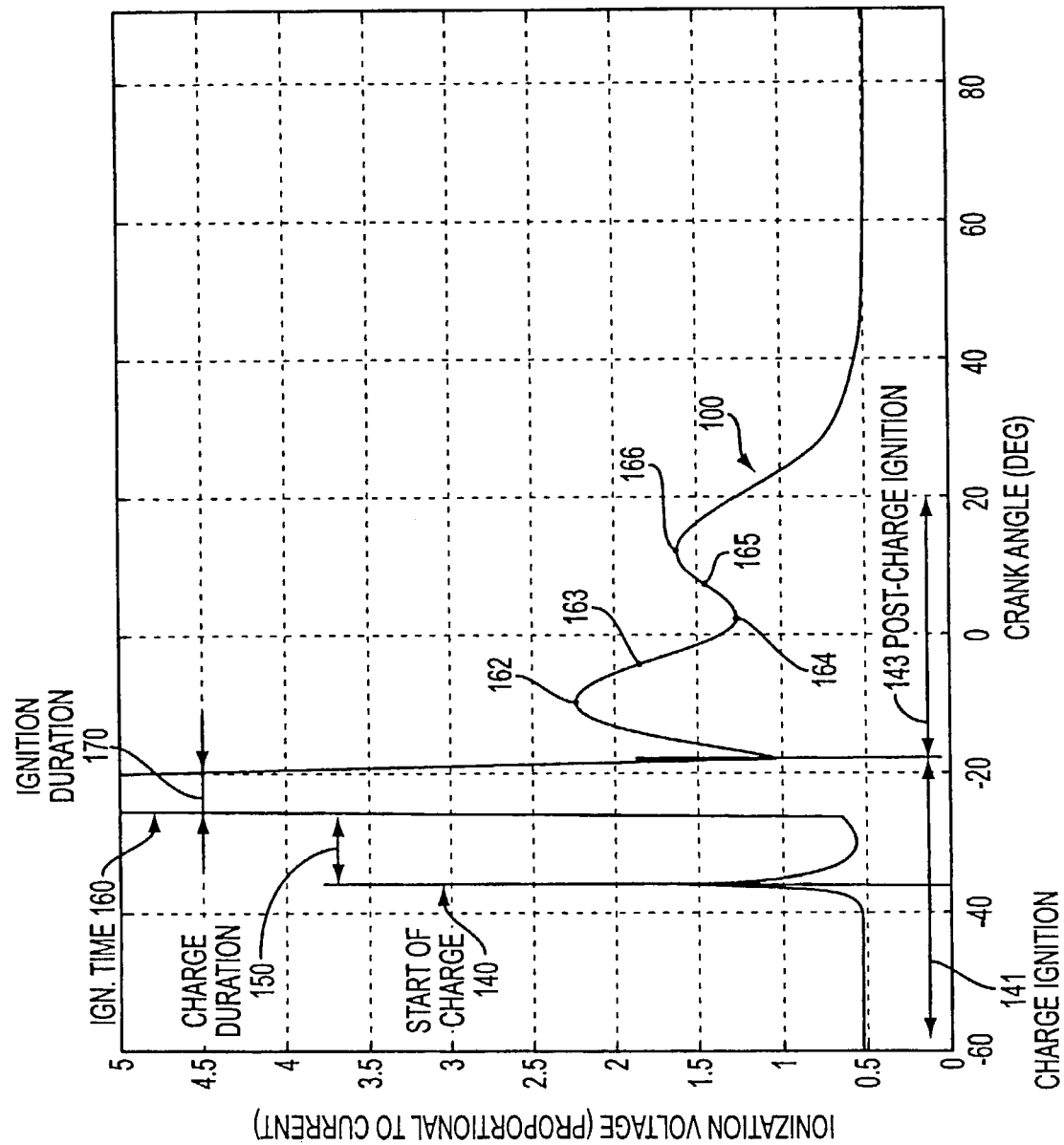
FIG. 11 is a graph of an ionization current signal that is multiplexed with charge current feedback signal.

A typical ionization signal is plotted in FIG. 11 which shows that the detected ion current signal 100 can be divided into two sections, charge ignition 141 and post-charge ignition signals 143.

Figure 12:
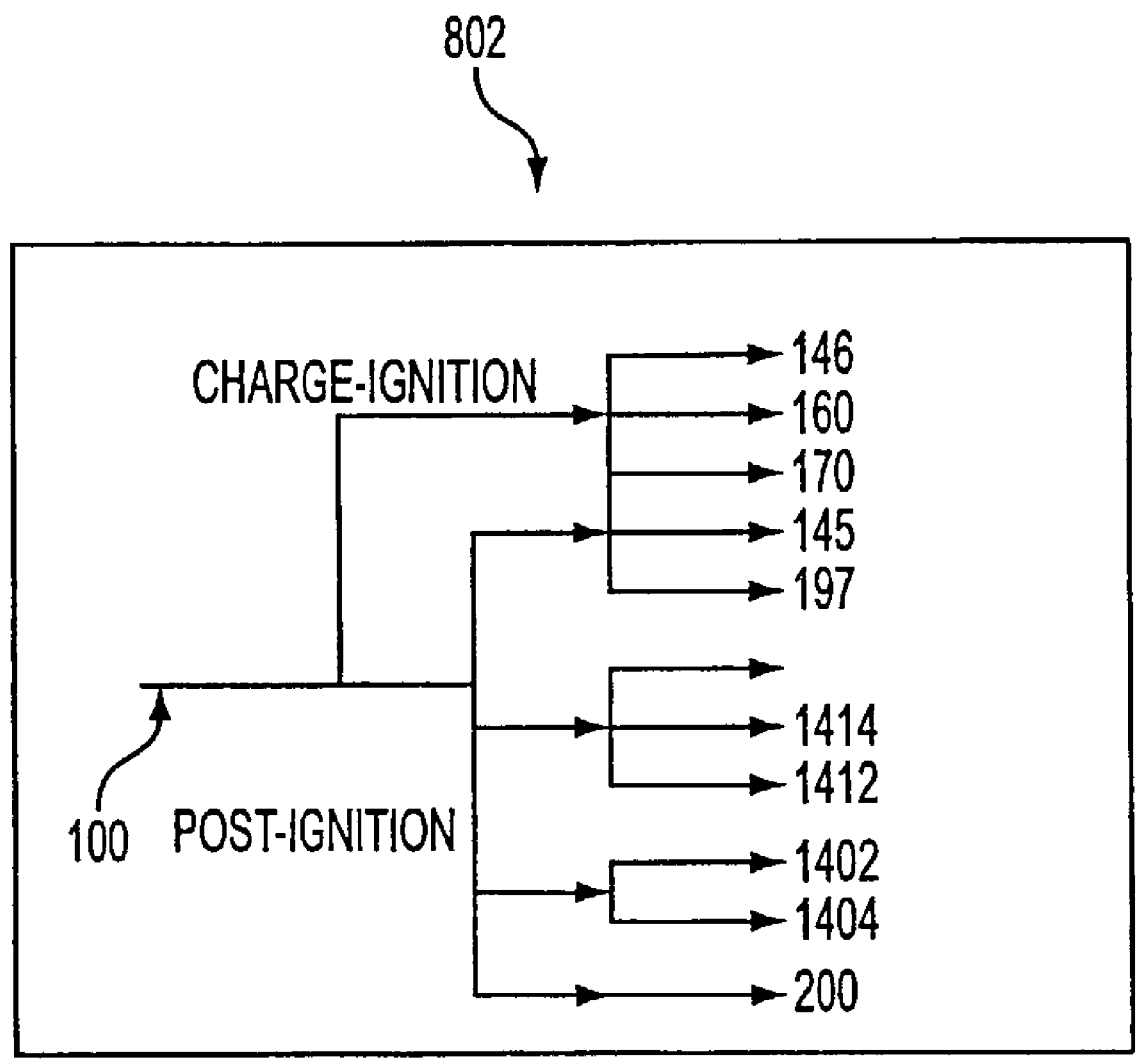
FIG. 12 is a drawing of the ignition diagnostics subsystem of the present invention.

The architecture of ignition diagnostics subsystem 802 is shown in FIG. 12 and includes four main features. First, the ignition system diagnostics provides the ignition primary coil charge timing 146, charge duration 145, secondary coil discharge timing (or in other words, ignition/spark timing 160), ignition duration 170, fault ignition system (such as failed coil, failed spark plug, etc.) using the charge-ignition portion 141 of the ion current signal 100. Also, the post ignition ionization current signal 143 is used to detect spark plug fouling 197.

Second, the misfire detection feature provides individual cylinder misfire information 1410 such as misfire and partial burn conditions using the post ignition ionization current signal 143 and the results of ignition system diagnostics. The resulting misfire detection is much more accurate than existing engine speed based misfire detection systems, especially at the engine deceleration condition where current detection systems fail to provide an accurate detection of misfire. The existing speed based misfire detection systems also have difficulty in detecting misfire for those engines with more than eight cylinders.

Third, the knock detection feature provides knock intensity 1402 and knock flag 1404 signals based upon a band-path filtered post-ignition portion of the ionization signal 100. One advantage of using an ionization signal 100 for knock detection is that it enables individual cylinder knock detection and also produces a cleaner knock signal when compared to current accelerometer based knock detection techniques which require intensive calibration due to engine valve noises.

Fourth, the robust multi-criteria MBT (Minimum timing for Best Torque) timing estimation apparatus and method 200 provides a compound index based upon the post-ignition ionization current signal 143 for an individual cylinder. This index combines multiple MBT timing indexes which are calculated using information provided by the ionization current signal 100 for the 10% mass fraction burned, the 50% mass fraction burn, and the peak cylinder pressure (PCP) locations for improved estimation robustness. When the engine is not knock limited, the index can be used for closed loop control of engine ignition/spark timing for improved fuel economy, reduced emissions, reduced calibration, etc.

Figure 13:
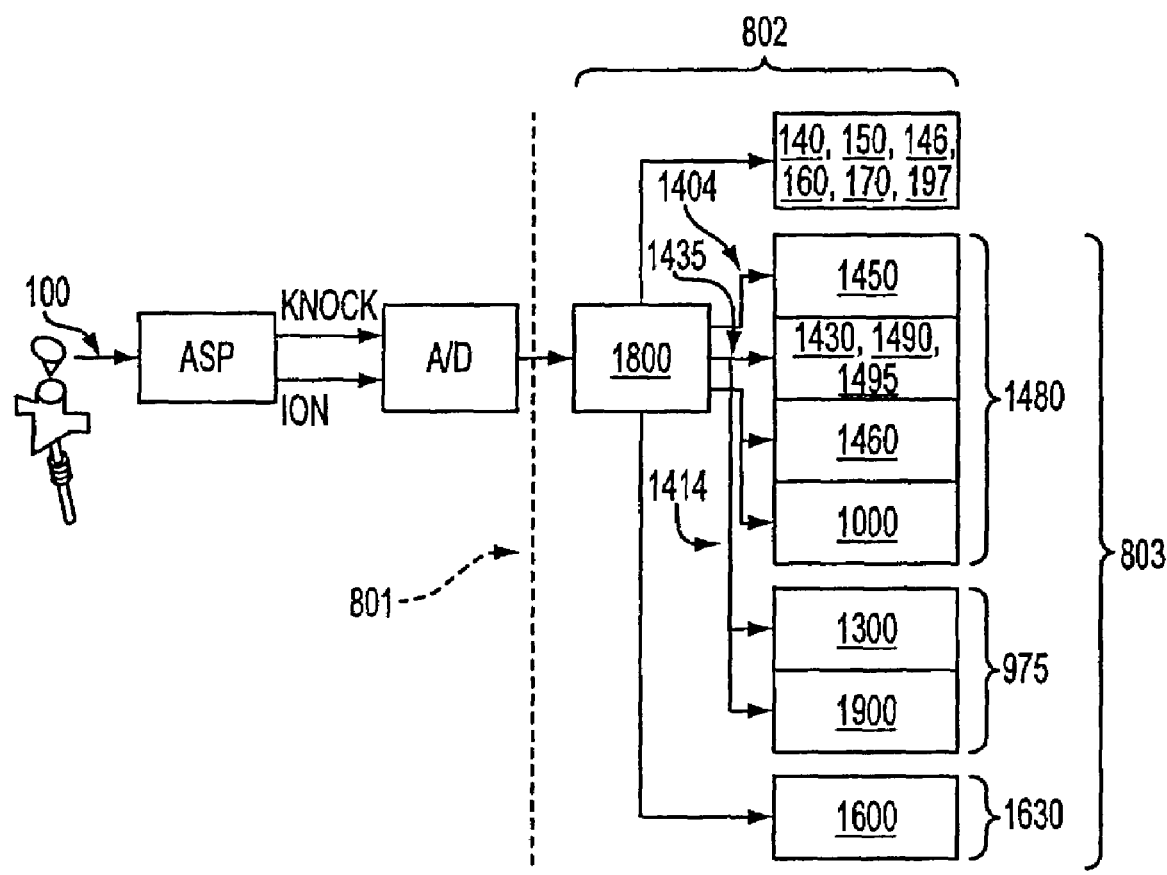
FIG. 13 is a logic block diagram of the system architecture of the ignition diagnostics and feedback control system.

The system architecture of the ionization feedback control subsystem 803 is shown in FIG. 13 and includes five controllers: (1) a closed loop cold start retard spark control using ionization feedback 1000; (2) a closed loop MBT timing control using ionization feedback 1430, 1490, 1495; (3) a closed-loop individual cylinder air to fuel ratio balancing control system 133; (4) optimal wide open throttle air/fuel ratio control 1900; and (5) exhaust gas control using a spark plug ionization signal 1600.

As to the closed loop cold start retard spark control using ionization feedback 1000, it is noted that 70% of the HC emission during an FTP cycle is produced during a cold start since the catalyst temperature does not reach its operational point quickly. Various approaches have been developed in the prior art to heat up the catalyst quickly during the cold start. One technique involves retarding the spark timing significantly to raise the exhaust temperature so that the catalyst can be heated up quickly. However, since retarding the spark timing is limited by partial burn and misfire, open loop calibration of retard spark timing for a cold start is done very conservatively due to engine-to-engine variations, engine aging, operational condition variations, etc. Under closed loop control of retard spark timing of the present invention, the engine retard timing limit is adjusted during a cold start to reduce the conservativeness and heat up the catalyst more quickly, thereby reducing HC emissions during a cold start.

As to the closed loop MBT timing control using ionization feedback 1430, 1490, 1495, when the spark timing of an internal combustion engine is neither knock limited, nor misfire/partial-burn limited, the engine operates at its MBT spark timing for best fuel economy when emission is satisfactory. Existing MBT timing control disclosed in the prior art is controlled in an open loop based upon engine mapping data. This approach does not compensate for engine-to-engine variations, engine operational conditions, aging of components, and other related factors. Consequently, many ignition/spark timing corrections used to compensate for those various conditions, called adders or trims, have to be added for improved engine performance. The closed loop MBT spark timing control strategy of the present invention adjusts the engine spark timing when the engine 161 is neither knock or misfire limited to provide improved fuel economy. When the engine 161 is knock limited, the closed loop control of the present invention adjusts the engine ignition/spark timing so that the engine 161 runs at its knock limit, thereby providing improved fuel economy and high torque output.

The third controller is the closed-loop individual cylinder air to fuel ratio balancing control system 1300. In the prior art, the airflow passage of an intake manifold for each individual cylinder is quite different. Consequently, the charge air volume and flow pattern for each individual cylinder is different, even at steady state operating conditions. Thus, even if the mean air to fuel (A/F) ratio of all cylinders remains at stoich, the air to fuel ratio of each individual cylinder can differ from stoich. In the present invention, the fuel injected for each individual cylinder is adjusted to ensure that each cylinder has the same air to fuel (A/F) ratio. The proposed individual cylinder air to fuel (A/F) ratio balancing method and apparatus of the present invention utilizes MBT timing estimation obtained during closed loop MBT timing control to adjust/trim the fuel metered for each cylinder using a fuel multiplier for each individual cylinder. In addition, a closed loop controller using a HEGO or UEGO sensor keeps the mean air to fuel (A/F) ratio at stoich. By using the fact that the MBT spark timing of a rich cylinder is relatively retarded compared to one at a stoich air to fuel (A/F) ratio and the MBT spark timing of a lean cylinder is relatively advanced compared to a stoich one, the individual cylinder fuel multiplier can be modified based upon detected MBT timing index or the resulting MBT timing control to balance relative air to fuel (A/F) ratios between individual cylinders.

As noted above, the fourth controller is the optimal wide open throttle air/fuel ratio control 1900. Normally, the air to fuel (A/F) ratio at wide open throttle (WOT) is adjusted to maximize the engine torque output. At this point, the engine 161 is operated at its minimum advanced MBT timing. In the prior art, air to fuel (A/F) ratio at WOT is optimized using an open loop calibration approach based on engine mapping data. The apparatus and method of the present invention adjusts the air to fuel (A/F) ratio to minimize MBT spark advance when the engine 161 is running at WOT.

Finally, with the exhaust gas control using a spark plug ionization signal 1600, an ionization signal 100 is used to calculate a combustion stability index. The combustion stability index can be the combustion burn rate or a parameter related to burn duration. The combustion stability index is then used to control the exhaust gas re-circulation (EGR) rate to increase the exhaust gas re-circulation EGR dilution. The EGR rate is increased when the combustion stability index is below a threshold. This enables the engine to run at an increased EGR rate while maintaining stable combustion. As a result, fuel economy is improved, while emissions are decreased.

Section D: Optimal Wide Open Throttle Air/Fuel Ratio Control

This feature of the present invention uses an ionization signal to optimize the air to fuel ratio (AFR) of a combustion mixture when an engine is operated at wide open throttle (WOT). This yields the highest BMEP (Brake specific Mean Effective Pressure), or in other words, maximizes the engine's torque output with the best fuel economy. In addition, spark timing is also optimized.

Engines are typically operated at a stoichiometric air to fuel ratio AFR (which is approximately 14.7 to 1 for gasoline) to optimize catalytic converter performance. Operating an engine at below stoichiometric (less than 14.7 to 1) results in operating the engine with a rich air to fuel ratio AFR. In this instance, the fuel does not completely combust and the catalytic converter can get clogged from the resulting emissions. On the other hand, operating an engine at above stoichiometric (greater than 14.7 to 1) results in operating the engine with a lean air to fuel ratio AFR. In this instance, there is excess oxygen in the emissions. This causes the catalytic converter to operate at an elevated temperature, thereby limiting the conversion of nitrogen-oxygen compounds ("NOx"). More importantly, operating at this condition for long durations may damage the catalyst converter.

Normally, oxygen sensors are used when controlling an air to fuel ratio AFR. The oxygen sensor measures the presence of oxygen in the air/fuel mixture. However, when operating an engine at wide open throttle WOT, the air/fuel mixture is outside the stoichiometric range, normally below the stoich. The air to fuel ratio AFR and the spark timing for engines running at wide open throttle WOT conditions use extensive calibration to produce the best torque output. Due to the non-stoich operation at wide open throttle WOT, the oxygen sensor (which generates either a rich or a lean signal) can not be used as an indicator of air to fuel ratio AFR. Therefore, the air to fuel ratio AFR is not being controlled in a closed loop under wide open throttle operation conditions.

The present invention 900 uses the ionization signal to detect the air to fuel ratio AFR that yields the highest torque or BMEP at wide open throttle WOT. At the same time, a closed loop controller is used to regulate the air to fuel ratio AFR when the engine is operated at the wide open throttle WOT. In addition, the engine spark timing is optimized at its minimum timing for the best torque (MBT) timing for the corresponding conditions.

Optimal WOT A/F ratio detection involves optimizing the A/F ratio at wide open throttle WOT condition. When an engine is operating at wide open throttle WOT condition, it is desired that the engine outputs the highest BMEP (torque) to meet the torque demand. The highest BMEP at each engine operating condition is not only a function of the spark timing, but also a function of the air to fuel ratio AFR if the air to fuel ratio AFR is allowed to deviate from the stoich air to fuel ratio. When an appropriate spark timing is found for the operating condition, the highest BMEP is established through the most efficient combustion. The best combustion efficiency can be achieved when the combustible mixture attains its fastest laminar flame speed. For most fuels, the fastest laminar flame speed usually occurs at an equivalence ratio φ equal to 1.1 (where λ, defined as the inverse of φ, equals to 0.9). The excess-air factor, λ, is a factor which indicates the amount that an air to fuel ratio AFR is above or below a stoichiometric mixture. Thus, at λ=1.0, the air/fuel mixture is at stoichiometric. At λ=1.3, the air/fuel mixture is 130% of stoichiometric or 30% above stoichiometric.

Because an oxygen sensor (which provides either a rich or a lean switch signal) is of minimal use when trying to sense the air to fuel ratio AFR far away from the stoichiometric mixture, existing technology uses an open loop control strategy and extensive calibration work when an engine operates at wide open throttle WOT conditions. A sensor that can detect an efficient combustion condition is needed to control the air to fuel ratio AFR at wide open throttle WOT conditions in a closed loop.

FIG. 11 is a typical ionization signal 100 detected from a spark plug 105 inside the combustion chamber. It is a plot of the ionization signal 100 during both charge ignition 141 and post charge ignition 143. After the spark breakdown, a flame kernel is formed in the spark gap. The first peak 162 of the ionization signal 100 is produced as a result of the initial flame formation. The chemical reaction caused by the flame formation increases the number of ions present in the engine cylinder. After the flame kernel is well established, the flame front gradually propagates away from the gap and the ionization signal 100 gradually declines. Meanwhile, the flame front pushes both unburned and burned gases in front of it and behind it and causes the local temperature in the vicinity of the gap to increase along with the cylinder pressure. Since the mixture around the spark gap is the first part of the mixture burned in the cylinder and is the first part of the burned mixture that is compressed in the cylinder, the local temperature of the air/fuel mixture is always highest in the gap. As the flame propagates away, the ionization signal 100 starts to increase again due to the elevated temperature. When the cylinder pressure reaches its peak, the gap temperature also reaches its hottest point. Therefore, the second peak 166 of the ionization signal 100 occurs as a result of the secondary ionization due to the high temperature.

Figure 14:
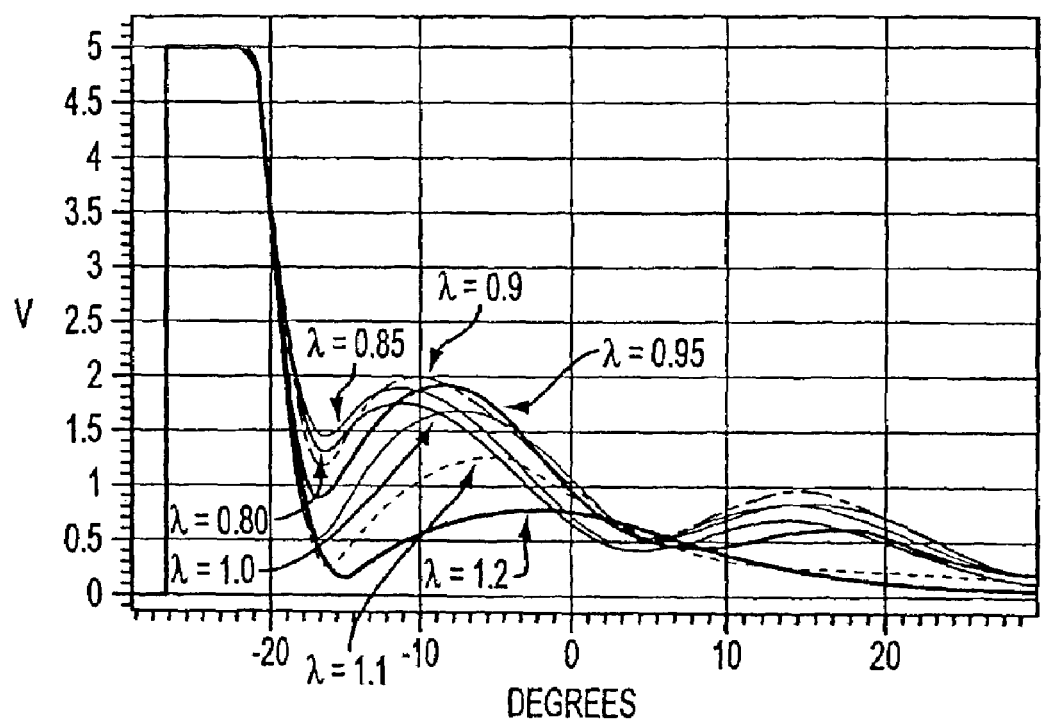
FIG. 14 illustrates an Air/Fuel ratio sweep vs. crank angle.

U.S. Pat. No. 6,029,627 discloses that the first peak 162 reaches its highest value when the excess-air factor λ is between 0.9 and 0.95. In addition, the second peak 166 reaches its highest value when λ is around 1.1. At a light load condition, the first peak 162 most likely peaks around λ=0.9 as shown in FIG. 14. However, when the engine load gets higher, the first peak 162 increases as λ increases beyond 0.9. The increase in the first peak 162 is due to increased carbon species dissociation caused by higher temperatures due to the increased load condition. In addition, the second peak 166 does not usually peak around λ=1.1 as described in U.S. Pat. No. 6,029,627, but instead occurs around λ=0.9.

Around λ=0.9, both flame speed and flame temperature are at their highest. The fastest flame speed indicates the most efficient combustion process. The appearance and placement of the second peak 166 depends on different loads, sparks and air to fuel ratios and might not appear at all at some operating conditions. However, at wide open throttle WOT conditions, the second peak 166 will always show up when the mixture is richer than stoichiometric AFR.

Figure 15:
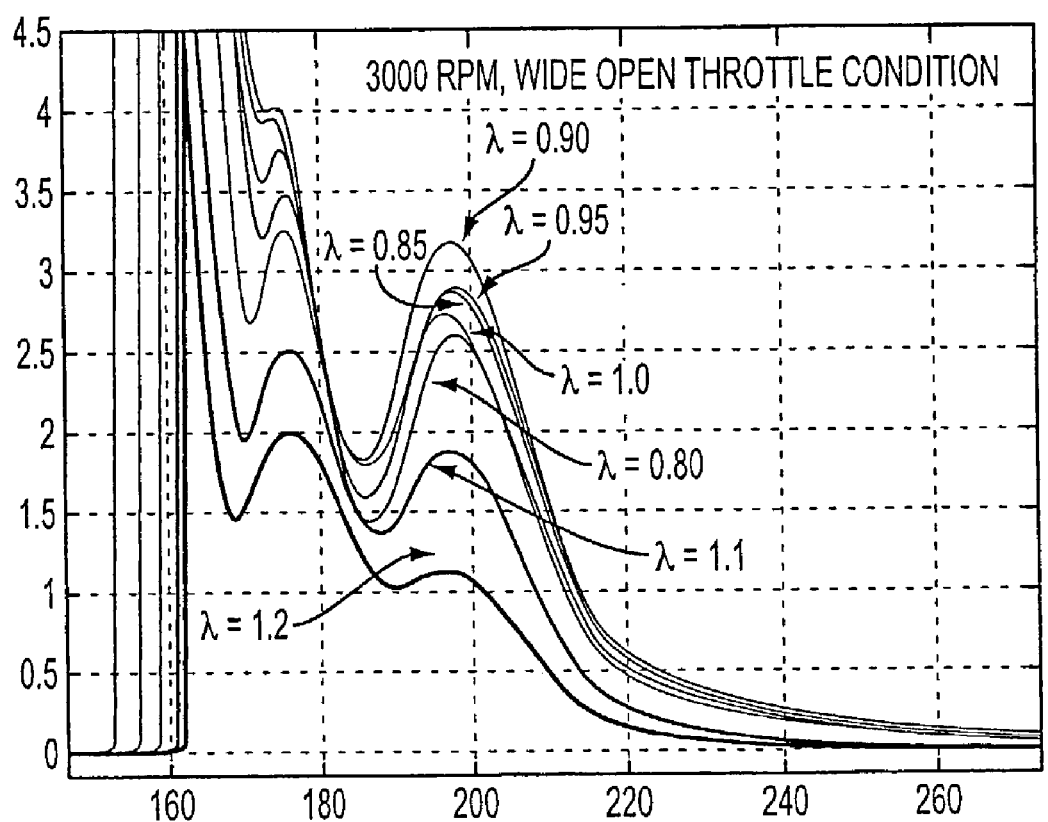
FIG. 15 is a plot of a 300 cycle average ionization at wide open throttle condition Air/Fuel ratio sweep at MBT for Lambda=1.2, 1.1, 1.0, 0.95, 0.9, 0.85, 0.8
Figure 16:
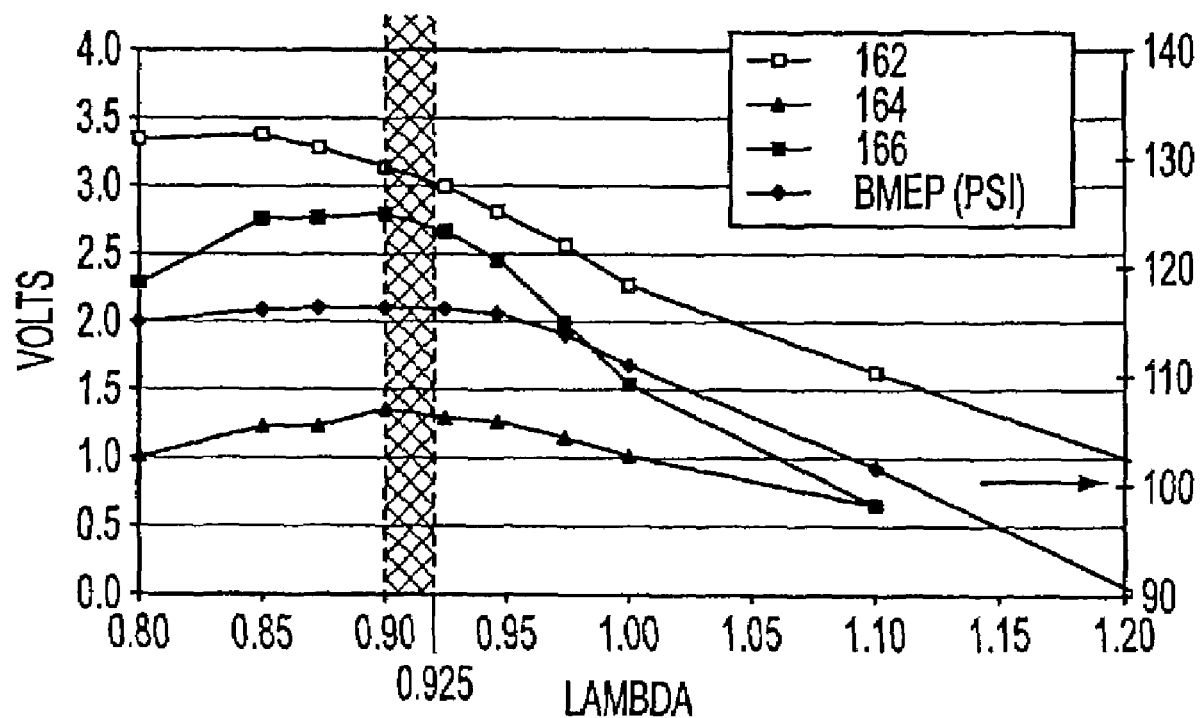
FIG. 16 illustrates an A/F ratio sweep at WOT.
Figure 17:
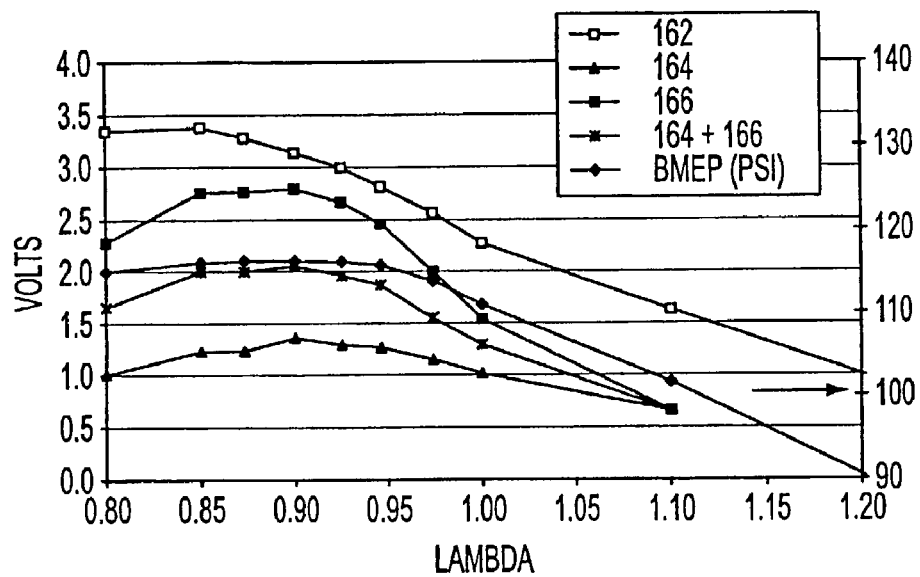
FIG. 17 illustrates a 3000 rpm SA=20 BTDC Air/Fuel ratio sweep at WOT

Maximizing either the valley value 164 or the second peak value 166 versus the air to fuel ratio AFR can be used as a criterion to find the most vigorous combustion condition. This condition usually occurs when λ is between 0.9 and 0.925. From FIG. 15 and FIG. 17, it is clear that this criterion holds true when minimum timing for the best torque MBT timing is used for each air to fuel ratio AFR condition. In FIG. 17, the second peak 166 is about 2.6 volts when λ is between 0.9 and 0.925 and the valley 164 is about 1.3 volts. Both the second peak 166 and the valley 164 are at maximum values. This criterion also holds true when a fixed spark timing is used for 1500 rpm wide open throttle WOT condition and 2000 rpm wide open throttle WOT condition as shown in FIG. 14 and FIG. 16 respectively.

To improve the robustness of the optimal air to fuel ratio AFR detection capability, the values for the valley 164 and the $2^{nd}$ peak 166 are combined to estimate the optimal air to fuel ratio AFR during the wide open throttle WOT operation.

$$C_{AFR}=(V_{valley}+V_{2nd\text{-}PEAK})/2, \quad \text{(Equation 1)}.$$

$V_{valley}+V_{2nd\text{-}PEAK}$ is plotted in FIG. 17. It reaches a maximum around λ=0.9.

Real-time optimal A/F ratio control algorithm: Note that the air to fuel ratio AFR index $C_{AFR}$ for a specific air to fuel ratio AFR does not provide information whether the air to fuel ratio AFR, that the engine is operated at, is optimal or not. A completed relationship of $C_{AFR}$ and air to fuel ratio AFR is used to determine the preferred air to fuel ratio AFR at wide open throttle WOT operation. However, this relationship is a function of many factors, such as engine-to-engine variation, engine aging, and engine operational conditions (altitude, humility, etc.). Consequently, it is difficult to optimize air to fuel ratio AFR for wide open throttle WOT conditions using off-line optimization.

Figure 18:
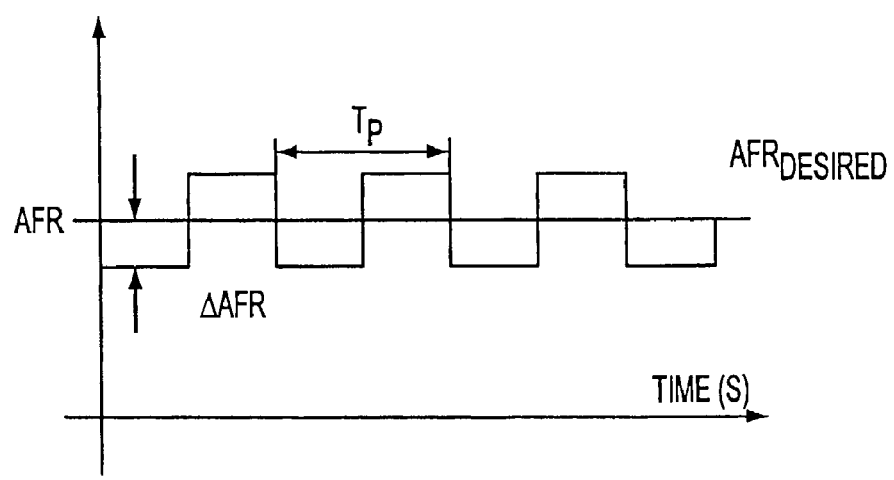
FIG. 18 illustrates the A/F ratio perturbation of the present invention.
Figure 19:
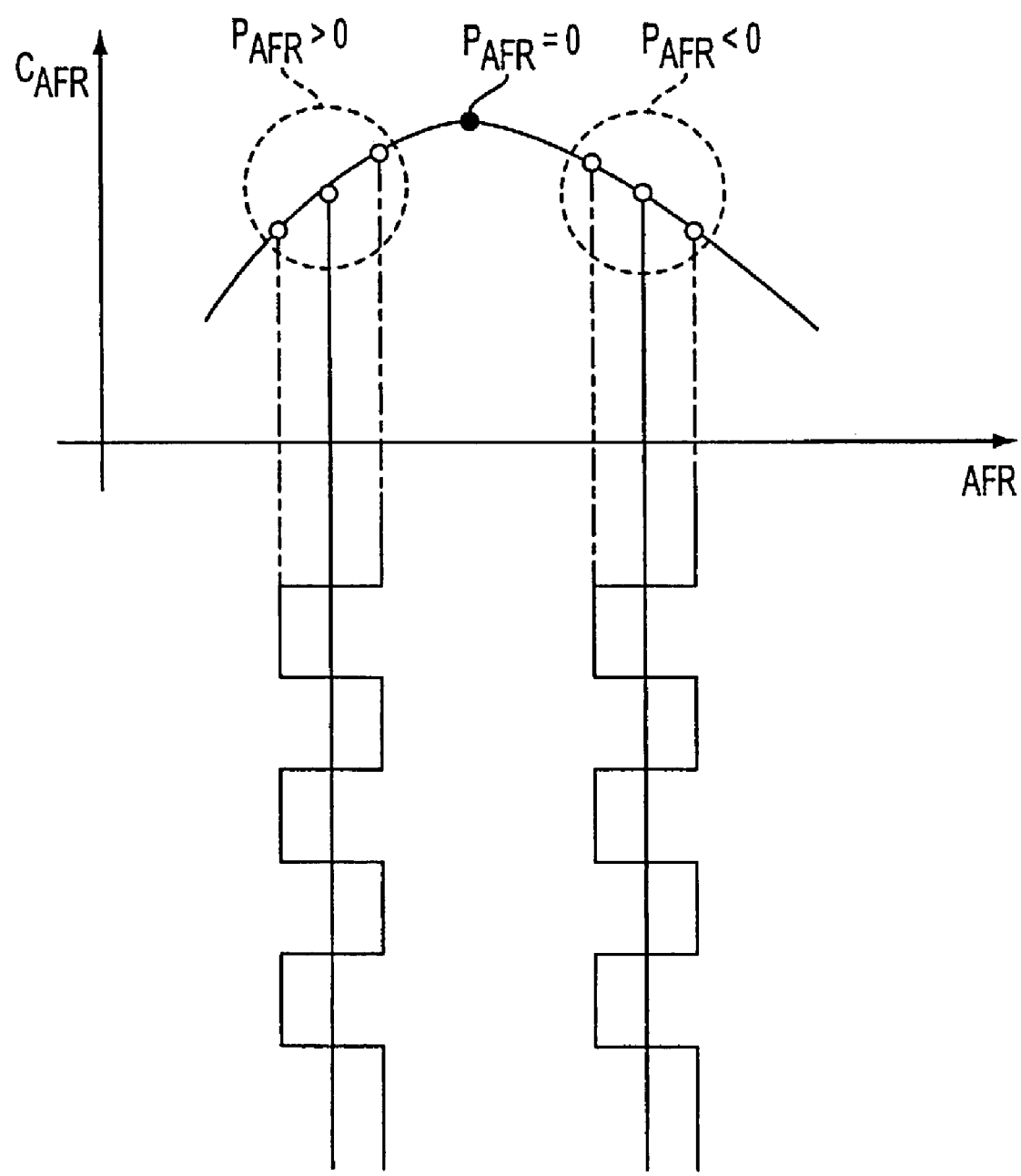
FIG. 19 illustrates the A/F ratio optimization of the present invention.

This feature of the present invention optimizes the wide open throttle WOT air to fuel ratio AFR on-line using the relationship between $C_{AFR}$ and air to fuel ratio AFR at WOT. Similar to a closed loop stoich air to fuel ratio AFR control system, an air to fuel ratio AFR perturbation (or offset) is added to the desired mean air to fuel ratio AFR. See FIG. 18 where $\Delta_{AFR}$ and $T_P$ are the magnitude and period of the air to fuel ratio AFR perturbation or air to fuel ratio AFR offset, respectively. The typical value of the perturbation magnitude $\Delta_{AFR}$ is 0.05, and the typical perturbation period is between a quarter second and half a second with a 50 percent duty cycle. An optimal WOT air to fuel ratio AFR control gradient parameter can be defined as:

$$P_{AFR}=(C_{A/F}(H)-C_{A/F}(L))/\Delta_{AFR} \quad \text{(Equation 2)}$$

where air to fuel ratio AFR index $C_{AFR}(H)$ corresponds to the maximum A/F ratio index obtained when the air to fuel ratio AFR is perturbed by adding $\Delta_{AFR}$, and $C_{AFR}(L)$ corresponds to the minimum air to fuel ratio AFR index obtained when the air to fuel ratio AFR is perturbed by subtracting $\Delta_{AFR}$. For a typical case that the nominal λ is 0.925 with $\Delta_{AFR}$ equal to 0.05 when the engine is running at 3000 rpm with wide open throttle, $C_{A/F}(H)$ is 1.85 and $C_{A/F}(L)$ 1.95. Since the air to fuel ratio AFR index $C_{AFR}$ is a convex function of the air to fuel ratio AFR (see both FIGS. 16 and 17), there are three possible ratio gradients for $P_{AFR}$ (see FIG. 19):

$P_{AFR}>0$: The engine overall air to fuel ratio AFR with respect to optimal AFR at WOT is rich;

$P_{AFR}=0$: The engine overall air to fuel ratio AFR is optimized for best torque; and $P_{AFR}<0$: The engine overall air to fuel ratio AFR with respect to optimal AFR at WOT is lean.

In a preferred embodiment, the real-time control strategy adjusts the engine air to fuel ratio AFR based upon the air to fuel ratio AFR gradient parameter. During the wide open throttle WOT operation, the engine desired mean excess-air correction factor $\Delta\lambda$ is updated using:

$$\Delta\lambda_{DESIRED}(k+1)=\Delta\lambda_{DESIRED}(k)+\alpha*P_{AFR} \quad \text{(Equation 3)},$$

where $\alpha>0$ is a calibratable constant coefficient for the real-time optimization algorithm. In this case, when the $P_{AFR}$ is greater than 0 (air to fuel ratio AFR is rich), a positive correction ($\alpha P_{AFR}>0$) is added to the desired mean excess-air correction factor ($\Delta\lambda_{DESIRED}$) by reducing the desired fuel quantity to increase the engine mean A/F ratio, thereby increasing the percentage of air. When $P_{AFR}$ is less than 0 (air to fuel ratio AFR is lean), a negative correction ($\alpha P_{AFR}<0$) is added to decrease the desired mean excess-air correction factor $\Delta\lambda$, thereby increasing the desired fuel quantity and decreasing the percentage of air. When $P_{AFR}$ is equal to 0, no adjustment is required.

Figure 20:
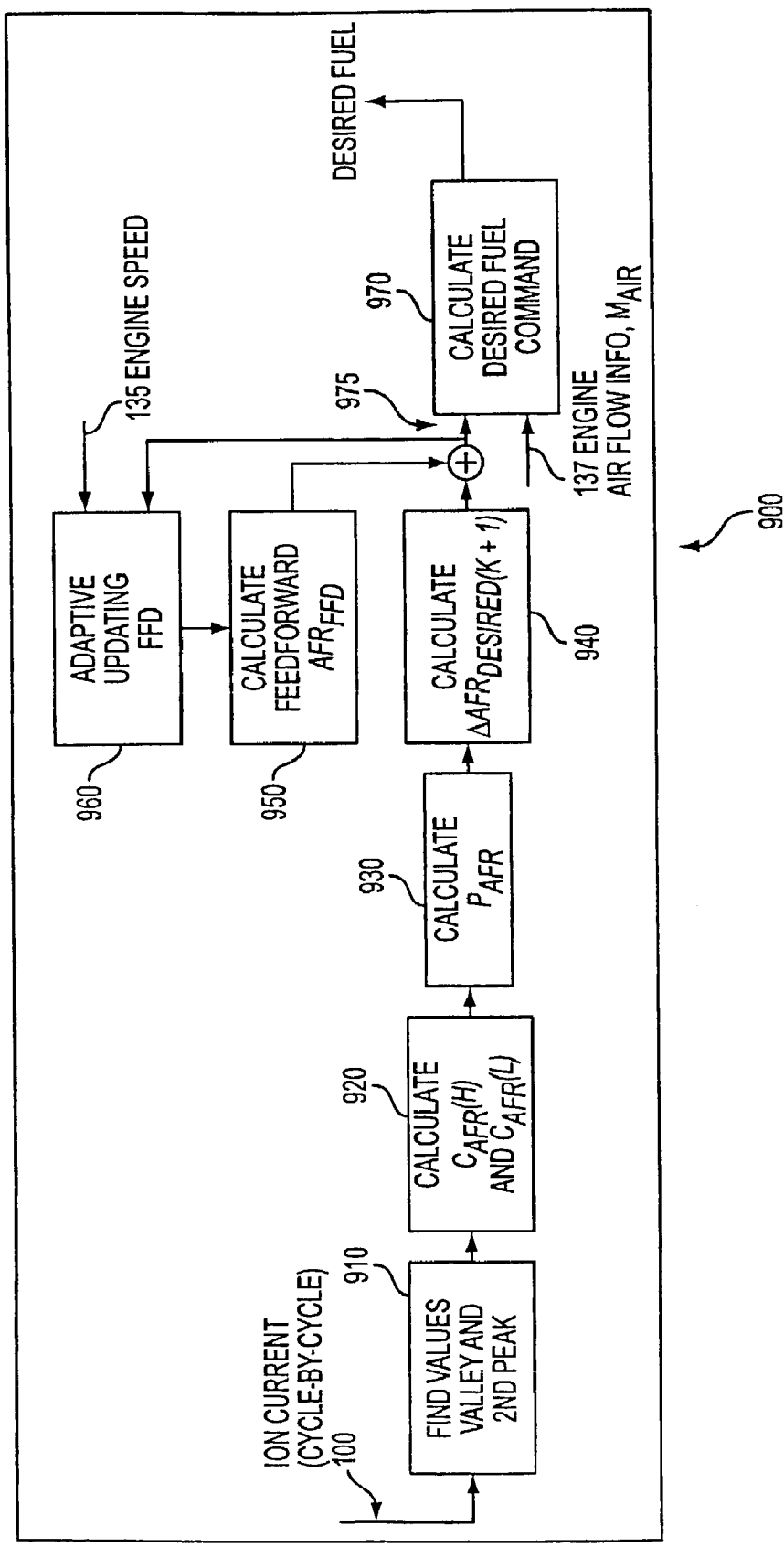
FIG. 20 illustrates the real-time WOT A/F ratio optimization method of the present invention.

FIG. 20 is a diagram of the WOT air to fuel ratio AFR control method discussed above. Each step is number coded and the details are described below. In step 910 the valley and $2^{nd}$ peak values are found. More-particularly, the valley value 164 and the $2^{nd}$ peak value 166 is calculated using the ionization signal as discussed in "Optimal WOT A/F ratio detection," where the definition of the valley 164 and the $2^{nd}$ peak 166 are found in FIGS. 14 and 16. This step is updated every firing event.

In step 920, $C_{AFR}(H)$ and $C_{AFR}(L)$ are calculated using equation 1. As described in FIG. 18, a positive or negative perturbation is added to the desired mean excess-air correction factor $\Delta\lambda$. When the positive perturbation is added, $C_{AFR}(H)$ is calculated, and when the negative perturbation is added, $C_{AFR}(L)$ is calculated. The mean values of $C_{AFR}(H)$ and $C_{AFR}(L)$ of a perturbation period are used as output of this step. Therefore, this step runs every firing event, but output every perturbation period ($T_P$). For port injection engines, due to fuel transport delay, the calculation will be delayed until the transition is completed.

In step 930, the air to fuel ratio AFR control gradient $P_{AFR}$ is calculated. This step runs every air to fuel ratio AFR perturbation cycle. In order to make sure that the WOT air to fuel ratio AFR is optimized at a given engine speed, this step calculates $P_{AFR}$ when the engine speed variation is within a calibratable value.

In step 940, the updated desired air to fuel ratio correction factor $\Delta\lambda_{DESIRED}(k+1)$ is calculated using Equation 2. This step runs every air to fuel ratio AFR perturbation period. In the cases when the $P_{AFR}$ is not calculated due to larger engine speed variation, $\Delta\lambda_{DESIRED}(k+1)$ shall be set to zero.

In step 950 the feedforward air to fuel ratio $\lambda_{FFD}$ is calculated. The feedforward air to fuel ratio AFR is based upon a lookup table that is a function of engine speed 135 and other factors. This table provides an open loop desired air to fuel ratio AFR for the engine system. Normally, this table is obtained through the engine calibration process. The conventional calibration process to obtain the feedforward table is to map the WOT engine output torque as a function of air to fuel ratio AFR at each given engine speed. Then, the feedforward table can be obtained by selecting the AFR associated with the maximum WOT torque output at various engine speeds. For the control system with adaptive learning capability, e.g., step 960, the feedforward table will be updated, using the calculated $\Delta\lambda_{DESIRED}(k+1)$, to compensate for engine-to-engine variations, engine aging, etc.

In step 960, the feedforward control FFD is updated. This step updates the feedforward control portion of the WOT air to fuel ratio AFR. The step calculates the difference between current feedforward output and the final desired air to fuel ratio $\Delta\lambda_{DESIRED}(k+1)$, and uses the difference to update the feedforward table gradually. An engine speed signal 135 is received from an engine speed sensor 136 located in the engine 161. The engine speed is used to as the input of the feedforward lookup table. This step runs every perturbation period.

In step 970, the commanded fuel signal is calculated. This step calculates the commanded fuel signal based upon the desired air to fuel ratio $\lambda_{DESIRED}(k+1)$, where the $\lambda_{DESIRED}(k+1)$ equals to $\Delta\lambda_{DESIRED}(k+1)+\lambda_{FFD}$, and the current engine airflow rate $\dot{m}_{AIR}$ 137 received from an air-mass flow sensor 138 located in the engine 161. The desired fuel flow rate $\dot{m}_{FUEL}(k+1)$ equals to current engine airflow rate $\dot{m}_{AIR}$ divided by desired air to fuel ratio $\lambda_{DESIRED}(k+1)$. This step updates the engine fuel commanded every engine combustion event or is executed at the same rate at which the fueling step runs at.

It is a goal of the present control method to maintain the optimal air to fuel ratio AFR gradient $P_{AFR}$ at zero. With the help of the convex property of $C_{AFR}$ as a function of WOT air to fuel ratio AFR, this gradient approach method shall converge with a proper calibrated $\alpha$.

Figure 21:
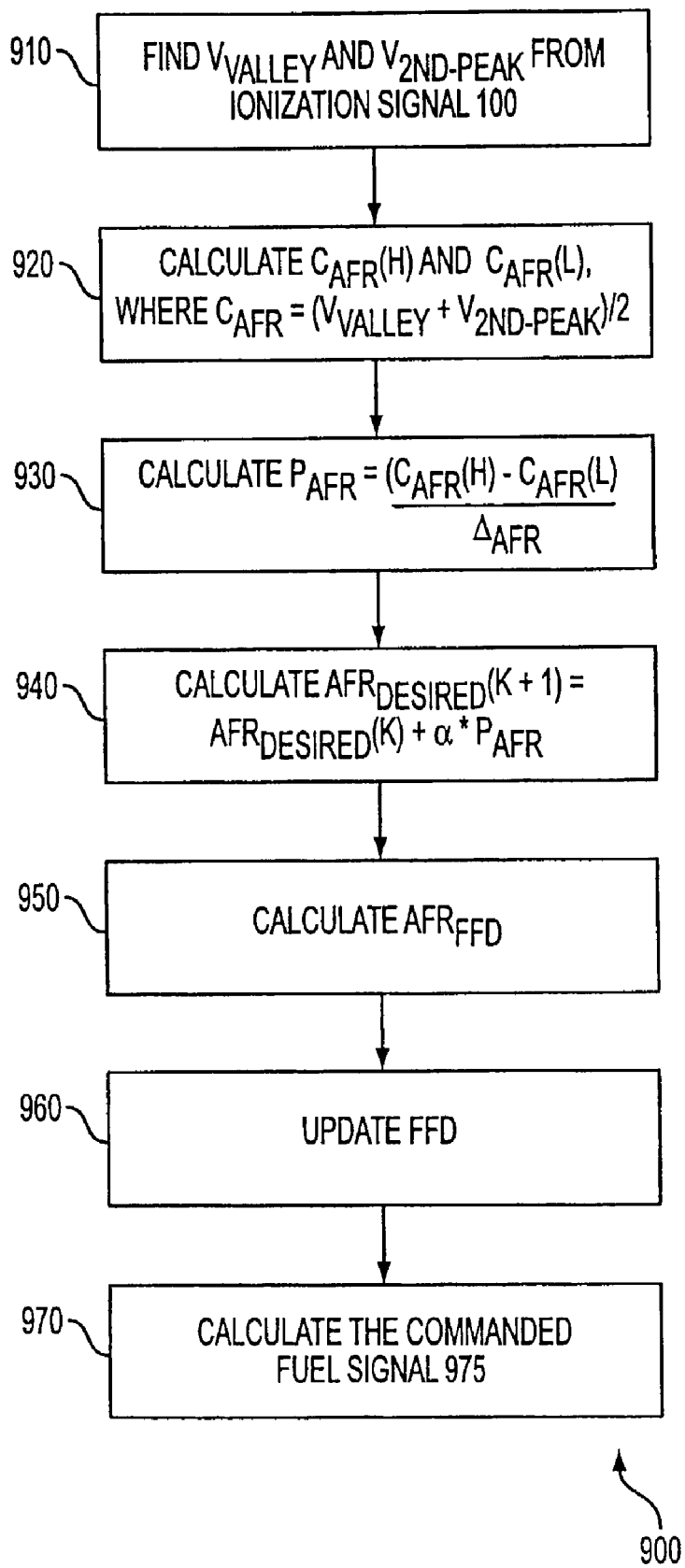
FIG. 21 is a flowchart of the real-time WOT A/F ratio optimization method of the present invention.
Figure 22:
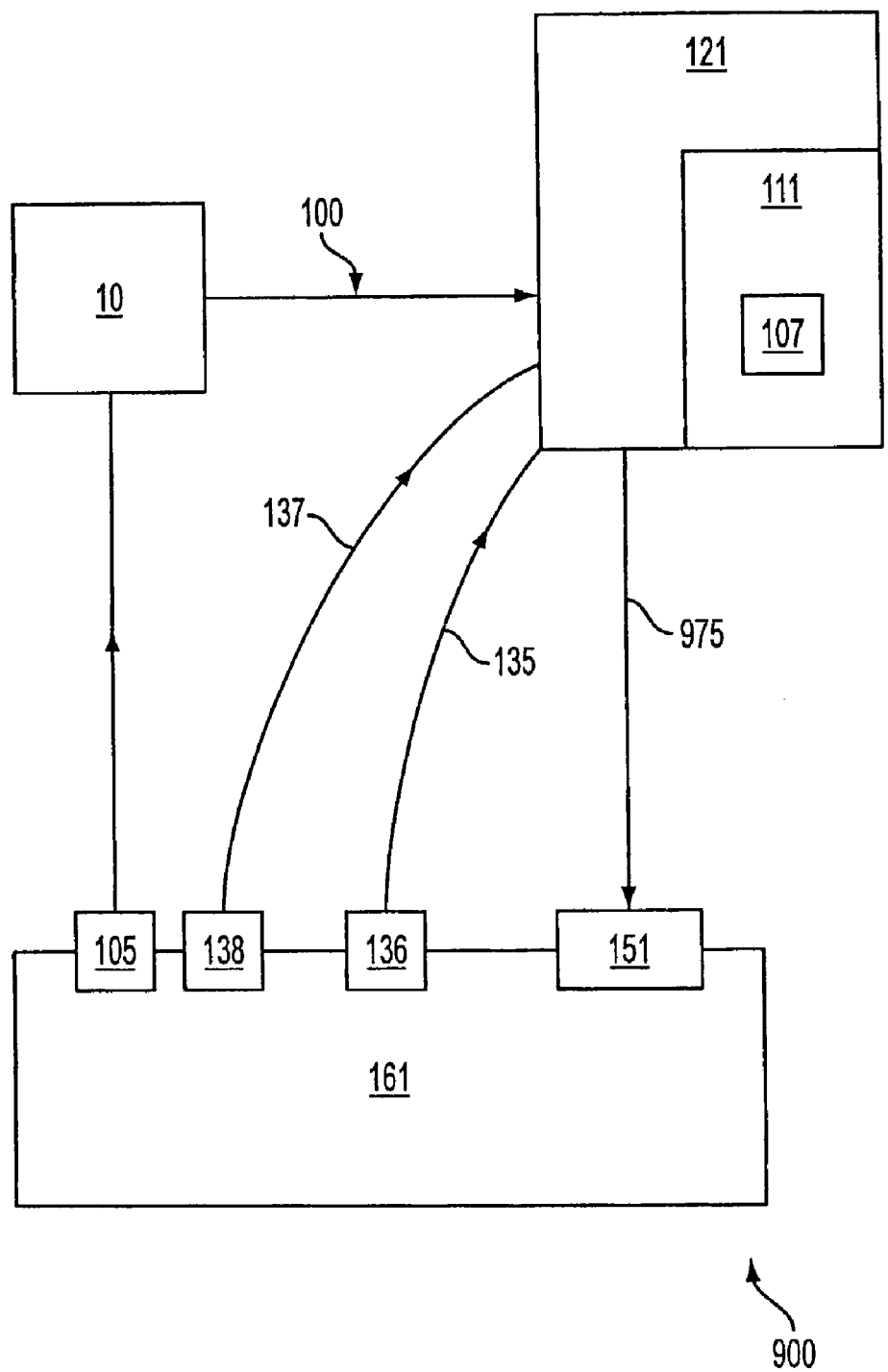
FIG. 22 is a logic block diagram of the real-time WOT A/F ratio optimization controller of the present invention.

In a preferred embodiment, the steps (or instructions) in FIGS. 20 and 21 are stored in software or firmware 107 located in memory 111 (see FIG. 22) 900. The steps are executed by a controller 121. The memory 111 can be located on the controller or separate from the controller 121. The memory 111 can be RAM, ROM or one of many other forms of memory means. The controller 121 can be a processor, a microprocessor or one of many other forms of digital or analog processing means. In a preferred embodiment, the controller is engine control unit ECU 121.

The ECU 121 receives an ionization signal 100 from an ionization detection circuit 10. The ECU 121 executes the instructions 107 stored in memory 111 to determine a desired air to fuel ratio AFR. It then outputs the desired fuel command 975 to some form of fuel control mechanism such as a fuel injector 151 located on the engine 161.

Section E: Closed Loop Cold Start Retard Spark Control Using Ionization Feedback Air pollution from automobile exhaust is caused in part by hydrocarbon (HC) emission. A catalyst converter is used in an internal combustion engine to reduce these pollutants by converting the harmful materials to harmless materials. Because the catalyst converter does not operate when the temperature of the catalyst is below its operational point, around 70% of the hydrocarbon (HC) emission during the FTP (Federal Test Procedure) cycle is produced during the cold start when the catalyst temperature is below its operational point. Various approaches have been developed to heat up the catalyst (or achieve catalyst light-off) quickly during the cold start. One way involves retarding (or delaying) the spark time (or ignition timing) to raise the exhaust temperature. As a result, the catalyst heats up quickly during the cold start, reducing HC emission. Since spark retard is limited by partial burn and misfire, open loop calibration of a retard spark for a cold start is performed slowly and conservatively. The conservativeness of the open loop calibration is mainly due to engine-to-engine variations, engine aging, operational condition variations, etc.

The retard spark control method of the present invention uses a closed loop spark timing controller to adjust the engine retard limit during a cold start. The goal is to run an engine at its retard limit without partial burn and misfire during a cold start to reduce the time needed to quickly heat up the catalyst. Therefore, use of a retard spark for fast heating of a catalyst during a cold start is maximized and cold-start hydrocarbon (HC) emission during a cold start is reduced.

The feature of the present invention described in Section E comprises a subsystem of the ignition diagnostics and feedback control system disclosed in FIG. 13 which uses ionization feedback current to raise the catalyst temperature quickly. The relationship of the subsystem to the diagnostics and control system is shown in FIG. 13, where the cold start retard spark control is marked as logic block 1000. The method comprises using a closed loop to control the spark retard timing during an engine cold start to retard the engine spark timing as much as possible without engine misfire and with minimum partial burn. The increased exhaust temperature heats up the catalyst quickly which, as a result, reduces HC emissions.

Figure 23:
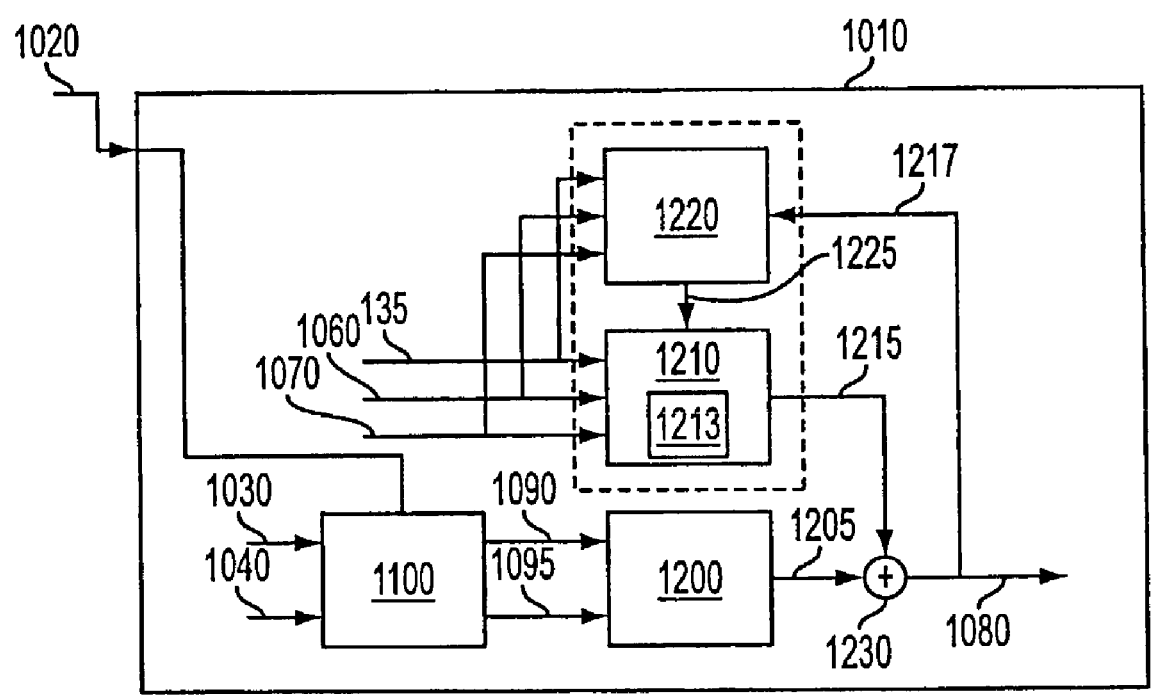
FIG. 23 illustrates the closed loop retard spark control using ionization current feedback apparatus of the present invention.

The closed loop cold start retard spark control system using ionization feedback loop 1010 of the present invention 1000 is illustrated in FIG. 23. A cold start enable flag 1020 (or command or signal) is used to enable (or activate) the closed loop control. The enable flag 1020 is generated when the catalyst temperature (measured or estimated) crosses a threshold (1015). The typical range of the threshold is about 400 degree Celsius.

Inputs to the closed loop 1010 can include some or all of the signals discussed below which include a partial burn index 1030, a misfire index 1040, engine speed (RPM) 135, engine load 1060, and engine coolant temperature 1070. In addition, the loop inputs are not limited to these signals, but can, in other embodiments, receive additional inputs. The partial burn index signal 1030 is obtained during a parameter estimation process for misfire detection. The misfire index signal 1040 is obtained during a misfire detection calculation by integrating the ion current during the combustion process and/or the peak value of the ionization current during the combustion. A threshold is used for the misfire calculation. The current engine speed 135 measured in RPM (Revolutions Per Minute). The engine load 1060 is calculated as a percentage of maximum load, fueling or the Indicated Mean Effective Pressure (IMEP). The engine coolant temperature signal 1070 is a conditioned engine coolant temperature signal.

The signal output from the closed loop is the cold start spark signal 1080 which is an ignition timing signal which will fire a spark plug at a Crank-angle After Top Dead Center (CATDC). Normally, the spark plug in a cylinder will be fired at its MBT timing normally located before the top dead center (TDC). However, the ignition timing can be retarded (or delayed) causing the spark plug to fire at retard timing (e.g., after top dead center) to increase the exhaust gas temperature, thereby heating the catalyst quickly.

The closed loop retard spark control using ionization current feedback 1010 consists of four major components or functions (see FIG. 23) which include an error and gain generator 1100, a proportional and integration (PI) control processing block 1200, a default spark timing processor 1210, and an adaptive learning apparatus 1220. They are listed below with detailed descriptions.

Figure 24:
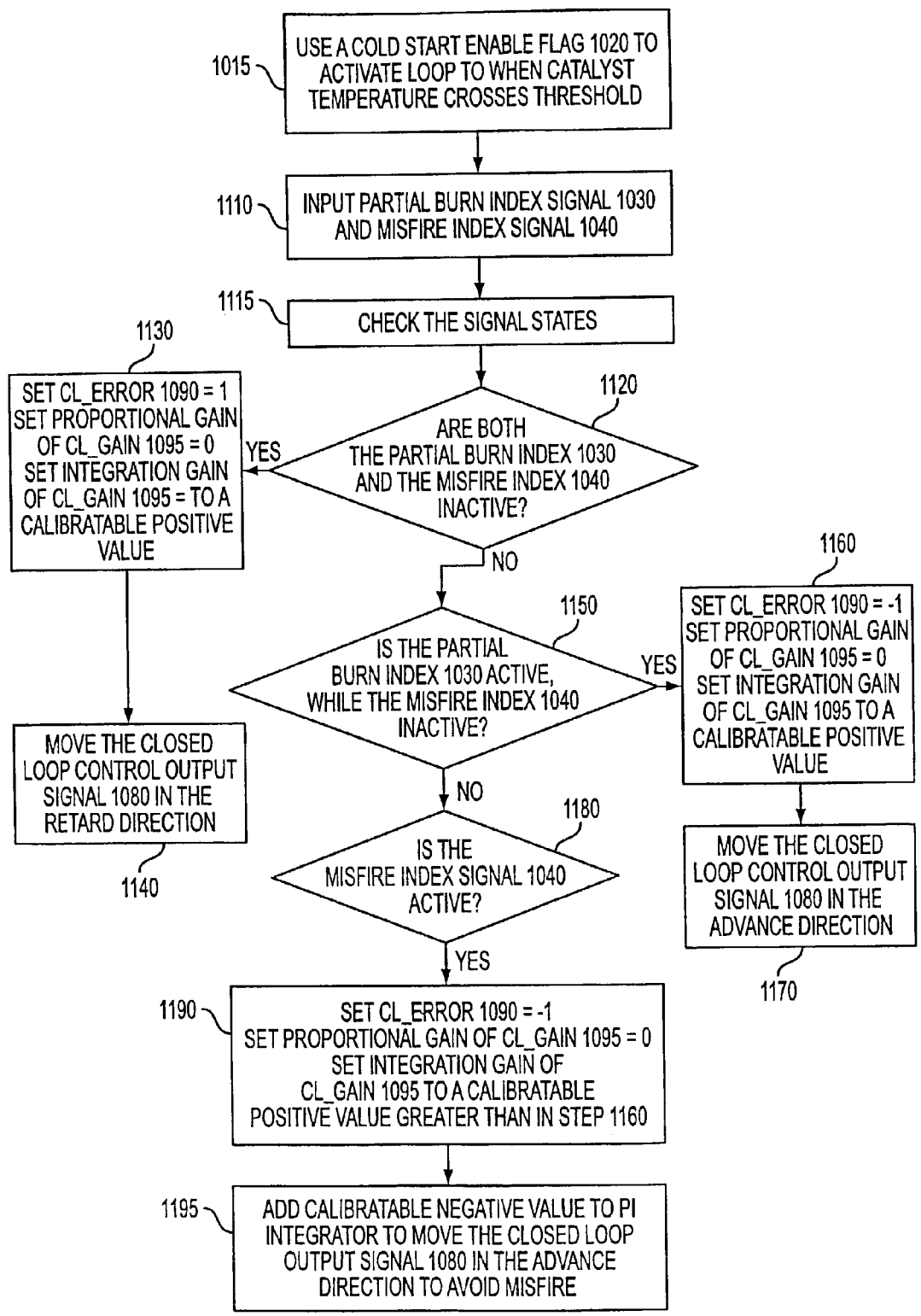
FIG. 24 is a flowchart of the steps taken in the present embodiment in deciding whether to advance or retard the ignition timing.
Figure 25A:
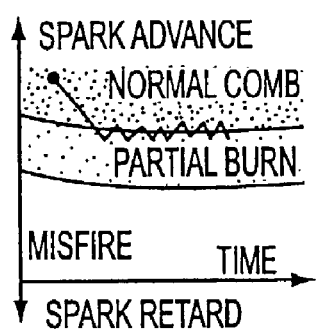
FIG. 25a illustrates the closed loop cold start control method when the partial burn index and the misfire index are inactive.

FIG. 23 illustrates four major components of the closed loop controller 1010 of the present invention. The first is the error and gain generator 1100. The partial burn index signal 1030 and the misfire index signal 1040 are input to the error and gain generator 1100. In a preferred embodiment, the error and gain generator 1100 can be a processor, microprocessor or any form of processing means. The misfire index is calculated in Section A of this application by using the ionization current signal, and the partial burn index can be calculated using the information calculated during the misfire detection process, such as area integration of the ionization current over the combustion window and the peak value over the combustion window. By setting proper thresholds higher than the misfire ones, partial burn index can be obtained by comparing the thresholds and calculated value. The error and gain generation generator 1100 outputs two signals, CL_error 1090 and CL_gain 1095, where CL_gain consists of both proportional and integration gains. Signals CL_error 1090 and CL_gain 1095 can be any of three output values depending on the states of the partial burn index and the misfire index, "negative one", "one" and a "calibratable positive value":

The partial burn index signal 1030 and the misfire index signal 1040 are input to the error and gain generator 1100 (see FIG. 24). Check the signals' states 1115. If both the partial burn index 1030 and the misfire index 1040 are inactive 1120, then a closed loop error signal CL_error 1090 is set to "one", the proportional gain of a closed loop gain signal CL_gain 1095 is set to "zero," while the integration gain of CL_gain is set to a calibratable positive value 1130. The typical range of the calibration positive value is between 0.01 and 2. In response to these inputs, the control output 1205 of the proportional and integration (PI) control processing block 1200 will move the closed loop control's output signal 1080 in the retard direction 1140, thereby delaying the ignition timing. Thus, the firing of the spark plug is delayed for that cylinder, causing the spark plug to fire at a more retard crank-angle than the previous ignition event. FIG. 25a shows how the control method works for this case.

Figure 25B:
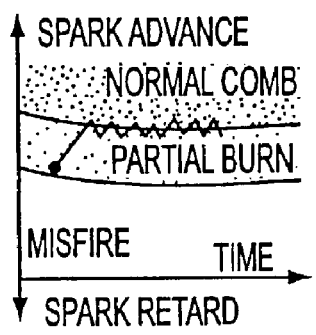
FIG. 25b illustrates the closed loop cold start control method when the partial burn index is active and the misfire index is inactive.

If the partial burn index is active and the misfire index is inactive 1150, then CL_error 1090 is set to negative "one," the proportional gain of CL_gain 1095 is set to "zero," while the integration gain of CL_gain 1095 is set to a calibratable positive value 1160 at a similar range to case 1. In response to these inputs, the control output 1205 of the proportional and integration (PI) control processing block 1200 will move the spark timing output signal 1080 in the spark advance direction 1170. Thus, the firing of the spark plug is advanced for that cylinder causing the spark plug to fire before the previous spark timing. FIG. 25b shows how the control method works for this case.

Figure 25C:
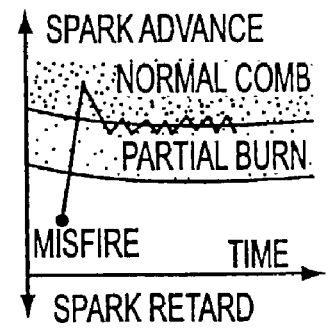
FIG. 25c illustrates the closed loop cold start control method when the misfire index is active.

If the misfire index signal 1040 is active 1180, then CL_error 1090 is set to negative "one," the proportional gain of CL_gain 1095 is set to "zero," while the integration gain of CL_gain 1095 is set to a calibratable positive value greater than cases 1 and 2. The upper bound of the calibratable positive value can reach 4 to avoid misfire in next combustion event. In response to these inputs, the proportional and integration (PI) control processing block will add a calibratable negative value (or offset, e.g., −5 degree) to the PI integrator causing its control output 1205 to move the spark timing output signal (or ignition timing signal) 1080 in the spark advance direction to avoid misfire and return to either case 1 or case 2 (1195). When a misfire occurs, the PI integrator is reset by adding a calibratable spark advance (a negative value) to the existing integrator register to eliminate the misfire quickly. FIG. 25c shows how the control method works for this case.

Therefore, the general method of the present invention comprises running the engine spark time at its retard limit. That is, to run the engine at a maximum allowable retard time without misfire and with minimum partial burn of the air-fuel (A/F) mixture. Thus: 1) when the engine is not at partial burn, the spark timing moves in the retard direction at a certain rate 1140, such as quarter crank degree per combustion event; 2) when the spark timing is at partial burn, the spark timing moves in the advance direction at a certain rate 1170 similar to case 1; and 3) when a misfire occurs, a correction will be added to the PI integrator to move the spark timing in the advanced direction quickly to avoid further misfire 1195.

The second major component is the proportional and integration (PI) control processing block 1200. In a preferred embodiment, only the integration portion of the PI controller 1200 or integration controller 1200 is used for closed loop control of the retard spark during a cold start. Both the integration gain CL_gain 1095 and the integration error CL_error signals 1090 are provided by the error and gain generator 1100 to the PI controller 1200.

The third major component is the default spark timing processor 1210. Default (or reference) spark timing is stored in a lookup table 1213 which is a function of engine speed 135, engine load 1060, engine coolant temperature 1070 and other factors. It can be obtained from the engine calibration process. The lookup table 1213 can be stored in memory located in the default spark timing processor 1210 or in a discrete memory chip. Due to the adaptive learning feature of this processor or controller 1210, the default spark timing table 1213 is modified by input 1225 (the adaptive learning output signal) from the adaptive learning apparatus 1220 so that the default (or reference) spark timing signal 1215 is compensated by the default spark timing processor 1210 or timing processor 1210 to account for engine-to-engine variation, engine aging, and other related factors. The output from the default timing apparatus 1210 is the reference signal 1215 which is summed with the output 1205 of the PI controller 1200 by summer 1230 to produce the cold start spark signal 1080.

The fourth major component is the adaptive learning apparatus 1220. The adaptive learning apparatus 1220 compares (in comparator 1224) the current cold start spark timing output signal $ST_{CURRENT}$ 1080 (or current spark timing signal 1080 or current ignition timing correction signal 1080) with a default cold start spark timing signal $ST_{DEFAULT}$ 1221 generated from a lookup table 1223 based upon the engine's current operating conditions (135, 1060, 1070) which serve as inputs to the adaptive learning block 1220. The lookup table 1223 can be stored in memory located in a processor 1222 or in a discrete memory chip. When the engine operational condition is close to a neighborhood of any mesh point of default spark timing lookup table 1223, the spark timing value $ST_{TABLE}$(OLD) of the lookup table 1223 at that specific point $ST_{TABLE}$ will be replaced by $ST_{TABLE}$(NEW) using the following formula:

$$ST_{TABLE}(NEW) = ST_{TABLE}(OLD) + \beta^* (ST_{CURRENT} - ST_{DEFAULT}) \quad 1226,$$

where $\beta$ is a calibratable positive coefficient with a typical value of 0.02. In order to limit the capability of the adaptive algorithm for safety and other reasons, the maximum allowed change of $ST_{TABLE}$(NEW) 1226 from the default calibration can not be greater than a calibratable crank degree. If the change of calculated $ST_{TABLE}$(NEW) 1226 exceeds the limit, the boundary value will be used as $ST_{TABLE}$(NEW) 1226.

Figure 26:
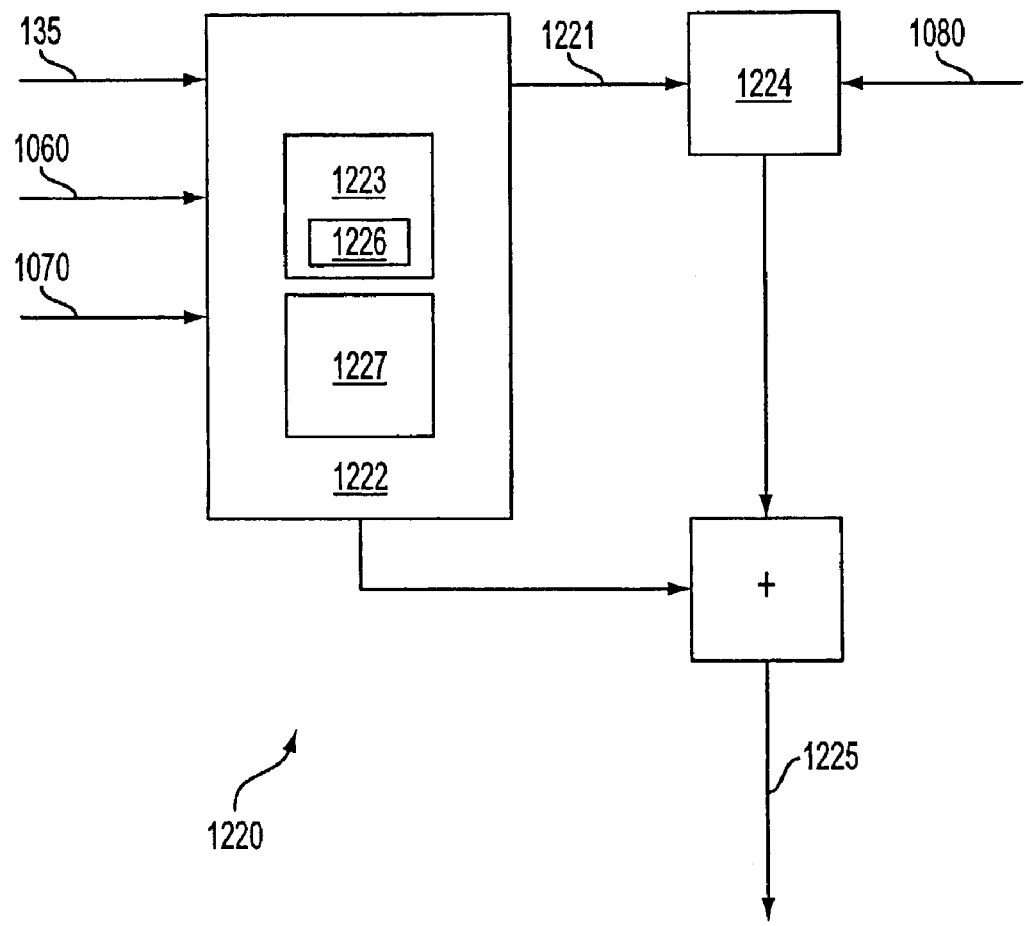
FIG. 26 is a logic block diagram of the adaptive learning manager.

In one preferred embodiment, the adaptive learning apparatus 1220 comprises a processor 1222, a comparator 1224, and software stored in memory comprising instructions 1227 (which can be the same memory 1223 that table 1223 is stored in or in different memory). For the default spark timing lookup table, see FIG. 26. The operating conditions include engine speed (rpm) 135, engine load 1060 and coolant temperature 1070. The adaptive learning apparatus 1220 together with the default spark timing processor 1210 constitute the feedback portion 1217 or feedback controller 1217 of the closed loop 1010.

Section F: Robust Multi-Criteria MBT Timing Estimation Using Ionization Signal It is a goal of an ignition system of an internal combustion engine to time the ignition/spark so that the engine produces its maximum brake torque with a given air to fuel mixture. This ignition/spark timing is referred to as the minimum timing for best torque or MBT timing. The mean brake torque of an internal combustion engine is a function of many factors such as air to fuel ratio, ignition/spark timing, intake air temperature, engine coolant temperature, etc. By fixing all the factors that affect the mean brake torque of an internal combustion engine, the engine mean brake torque is a convex function of ignition/spark timing when the ignition/spark timing varies within a certain range, where MBT timing corresponds to the peak location of the convex function. If the spark timing is retarded or advanced relative to the MBT timing, the mean brake output torque is not maximized. Hence, running an internal combustion engine at its MBT timing provides the best fuel economy. Therefore, it is desirable to find criteria which can be used to produce a reliable estimate of MBT timing for closed loop control of engine ignition/spark timing. This invention proposes a method to determine engine MBT timing at current operational conditions using a spark plug ionization signal.

Different from the cylinder pressure signal that exhibits a relatively stable pressure curve throughout engine operating conditions, the waveform shape of a spark plug ionization signal can change with varying loads, speeds, spark timings, air to fuel A/F ratios, exhaust gas re-circulation EGR rates, etc. Searching for the ionization post flame peak that is supposed to be lined up with the peak pressure location is not always a reliable MBT timing criteria due to the disappearance of this peak at low loads, retarded spark timing, lean A/F ratios, or higher EGR rates. The present invention solves this problem by establishing a robust multi-criteria MBT timing estimation method utilizing different ionization signal waveforms that are generated under different engine operating conditions.

The spark plug ionization signal 100 is a measure of the local combustion mixture conductivity between the spark plug electrodes during the combustion process. This signal 100 is influenced not only by the complex chemical reactions that occur during combustion, but also by the local temperature and turbulence flow at the spark gap during the process. The ionization signal 100 is typically less stable than the cylinder pressure signal that is a measure of the global pressure changes in the cylinder.

The MBT timing control strategies appearing in the prior art are predominantly based on post flame peak detection. The post flame peak detection usually lines up with the peak pressure location. It has been recognized that the MBT timing occurs when the peak pressure location is around 15° After Top Dead Center (ATDC). By advancing or delaying the spark timing until the second peak of the ionization signal peaks around 15° ATDC, it is assumed that the MBT timing is found.

Unfortunately, the second peak of the ionization signal 100 does not always appear in the ionization signal 100 waveform at all engine operating conditions. At light loads, lean mixtures, or high EGR rates, the second peak can be difficult to identify. Under these circumstances, it is almost impossible to find the MBT timing using the $2^{nd}$ peak location of the ionization signal 100.

The present invention establishes multiple MBT timing criteria to increase the reliability and robustness of MBT timing estimation based upon spark plug ionization signal 100 waveforms. Therefore, the present method optimizes ignition timing by inferring from the ionization signal where the combustion event is placed in the cycle that corresponds to the MBT timing.

FIG. 11 shows a typical ionization signal 100 versus crank angle. Different from a pressure signal waveform, an ionization signal 100 waveform actually illustrates more details of the combustion process. For example, the ionization signal 100 waveform shows when a flame kernel is formed and propagates away from the gap, when the combustion is accelerated intensively, when the combustion reaches its peak burning speed, and when the combustion ends. An ionization signal 100 usually consists of two peaks. The first peak 162 of the ionization signal 100 represents the flame kernel growth and development, and the second peak 166 is caused by re-ionization due to the temperature increase resulting from pressure increase in the cylinder.

The combustion process of an internal combustion engine 161 is usually described using the mass fraction burn versus crank angle. Through mass fraction burn, we can find when the combustion has its peak burning acceleration and peak burning velocity. Locating these events at a specific crank angle will allow us to obtain the most efficient combustion process. In other words, we can find MBT timing through these events. The inflexion point 163 right after the first peak 162 can be correlated to the maximum acceleration point of the cylinder pressure signal. This point is usually between 10% to 15% mass fraction burned (see FIG. 27, point 163 of case 1). The inflexion point 165 right before the second peak 166 of the ionization signal 100 correlates well with the maximum heat release point of the cylinder pressure signal and is located around 50% mass fraction burned (see FIG. 27, point 165 of case 1). In addition, the second peak 166 is related to or correlates to the peak pressure location of the pressure signal (see FIG. 27, point 166 of case 1).

At MBT timing, the maximum flame acceleration point is located at Top Dead Center TDC. It has been established that the 50% mass fraction burn is located around 8–10° After Top Dead Center (ATDC) and the peak pressure location is around 15° ATDC when a combustion process starts at MBT timing. Combining all three individual MBT timing criterion or criteria into one produces increased reliability and robustness of the MBT timing prediction.

Figure 27:
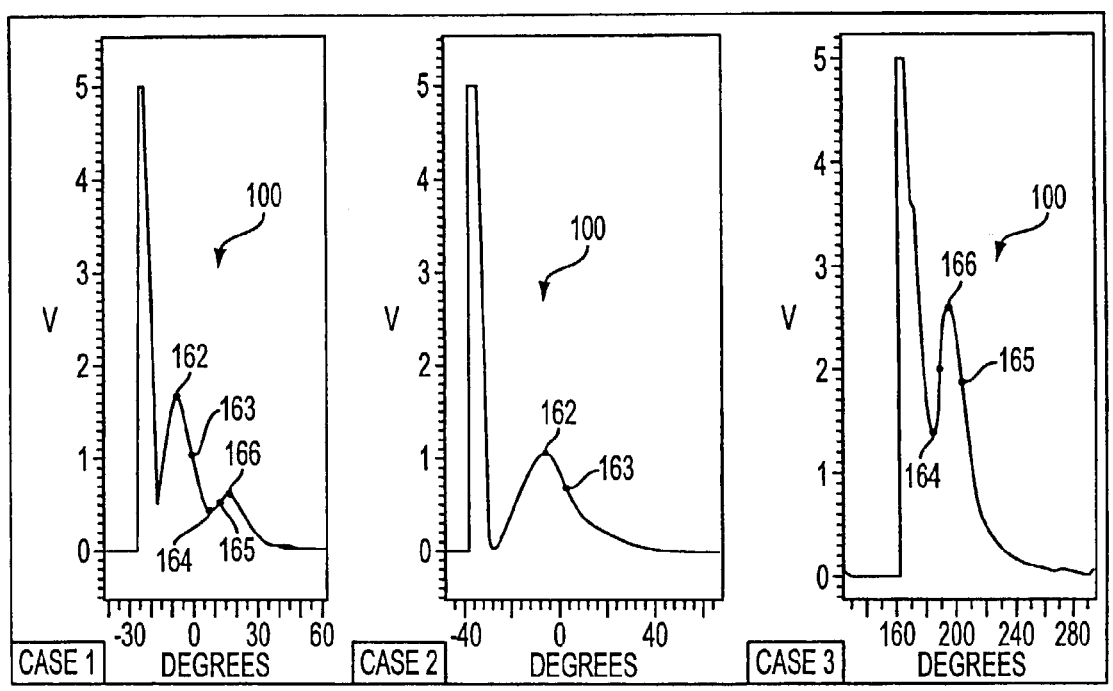
FIG. 27 are plots of three cases of ionization waveforms.

FIG. 27, cases 1, 2 and 3, illustrate three waveforms that the ionization signal takes at various engine operating conditions (case 1—1500 rpm, 2.62 bar BMEP, EGR=0%; case 2—1500 rpm, 2.62 bar BMEP, EGR=15%; case 3—3000 rpm, WOT, cylinder #3): Case 1 illustrates a normal waveform where both peaks 162, 166 are present in the waveform. In Case 2, the second peak 166 does not show up due to the relatively low temperature resulting from the high EGR, a lean mixture or a low load condition, or from a combination of these factors. In Case 3, the first peak 162 merges with the ignition signal due to the longer crank angle ignition duration resulting from a relatively constant spark duration at high engine speed.

Figure 28:
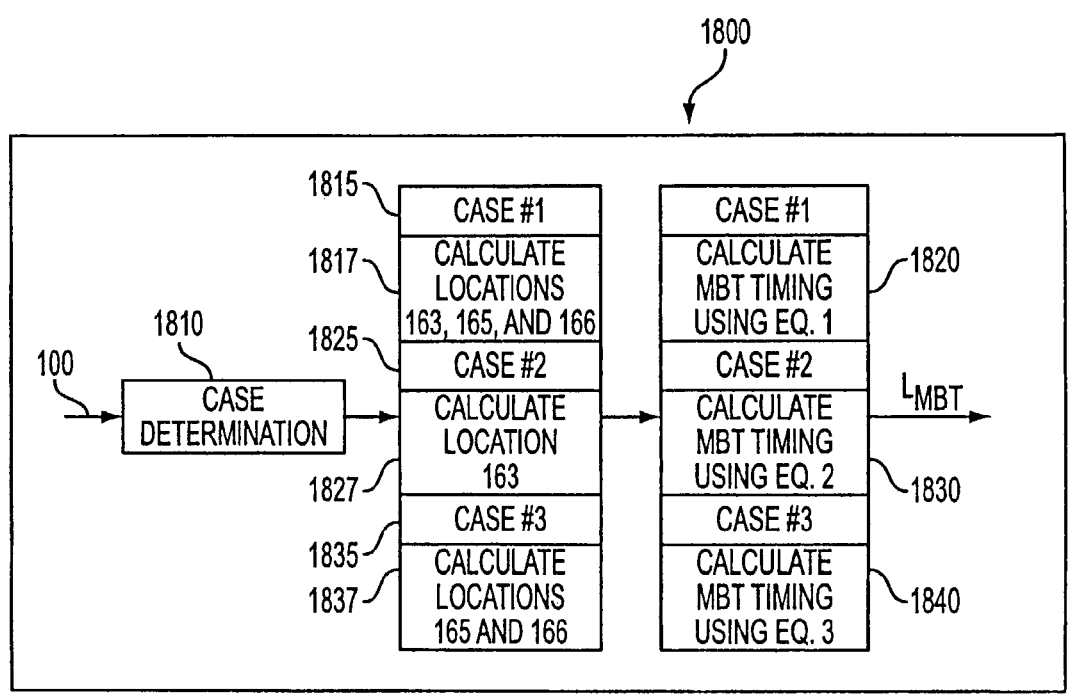
FIG. 28 is a block diagram of the multi-criteria MBT timing estimation method of the present invention.

Locations 162–166 in FIG. 28 are defined as follows: 162, the first peak location of the ionization signal; 163, the maximum flame acceleration location (close to or correlated to Top Dead Center (TDC) at MBT timing); 164, the valley location of the ionization signal; 165, the maximum heat release location (correlated to 50% burn location and close to 8–10% After Top Dead Center (ATDC) at MBT timing); and 166, the second peak location (correlated to peak cylinder pressure location and close to 15–17° After Top Dead Center (ATDC) at MBT timing).

In a preferred embodiment, the present invention uses MBT timing estimation criterion which is a combination of the maximum flame acceleration location 163, the 50% burn location 165, and the second peak location 166 which are shown in cases 1 through 3 of FIG. 27.

When the ionization signal 100 waveform takes on the waveform of case 1, all three MBT timing criteria will be used due to their availability. That is, $$L_{MBT}=(L_{163}+(L_{165}-L_{50\%BURN})+(L_{166}-L_{PCP}))/3, \quad \text{(Equation 1)}$$

where $L_{MBT}$ is the estimated MBT timing location, $L_{163}$ is the maximum flame acceleration location, $L_{165}$ is the maximum heat release location, $L_{50\%BURN}$ is the 50% burn location of the pressure signal when the engine is running at MBT timing, $L_{166}$ is the second peak location, and $L_{PCP}$ is the Peak Cylinder Pressure location when the engine is running at MBT timing. $L_{50\%BURN}$ and $L_{PCP}$ are typically located around 8–10° and 15–17° ATDC respectively. Since MBT timing for $L_{50\%BURN}$ and $L_{PCP}$ varies as a function of engine operational conditions, in a preferred embodiment a lookup table containing values of $L_{50\%BURN}$ and $L_{PCP}$ can be used when calculating the desired MBT location for different operating conditions.

For case 2, the only available MBT criterion is location 163. Therefore, equation 1 reduces to:

$$L_{MBT}=L_{163}, \quad \text{(Equation 2)}$$

where $L_{MBT}$ is the estimated MBT timing location.

For case 3, locations $L_{165}$ and $L_{166}$ are available. The MBT timing calculation utilizes both $L_{165}$ and $L_{166}$ calculate the estimated timing location as follows:

$$L_{MBT}=((L_{165}-L_{50\%BURN})+(L_{166}-L_{PCP}))/2, \quad \text{(Equation 3)}$$

As with Case 1, both $L_{50\%BURN}$ and $L_{PCP}$ can be selected to be constant values (i.e., (8–10°) and (15–17°), respectively) or one can use the outputs of lookup tables to reflect variations due to engine operational conditions. The lookup tables 113 can be stored in memory 111. Any form of memory such as RAM, ROM or even an analog memory storage such as magnetic tape can be used. The data in the lookup table can be accessed by a processor, microprocessor, controller, engine control unit, or any of a number of processing or controlling means 122.

Figure 29:
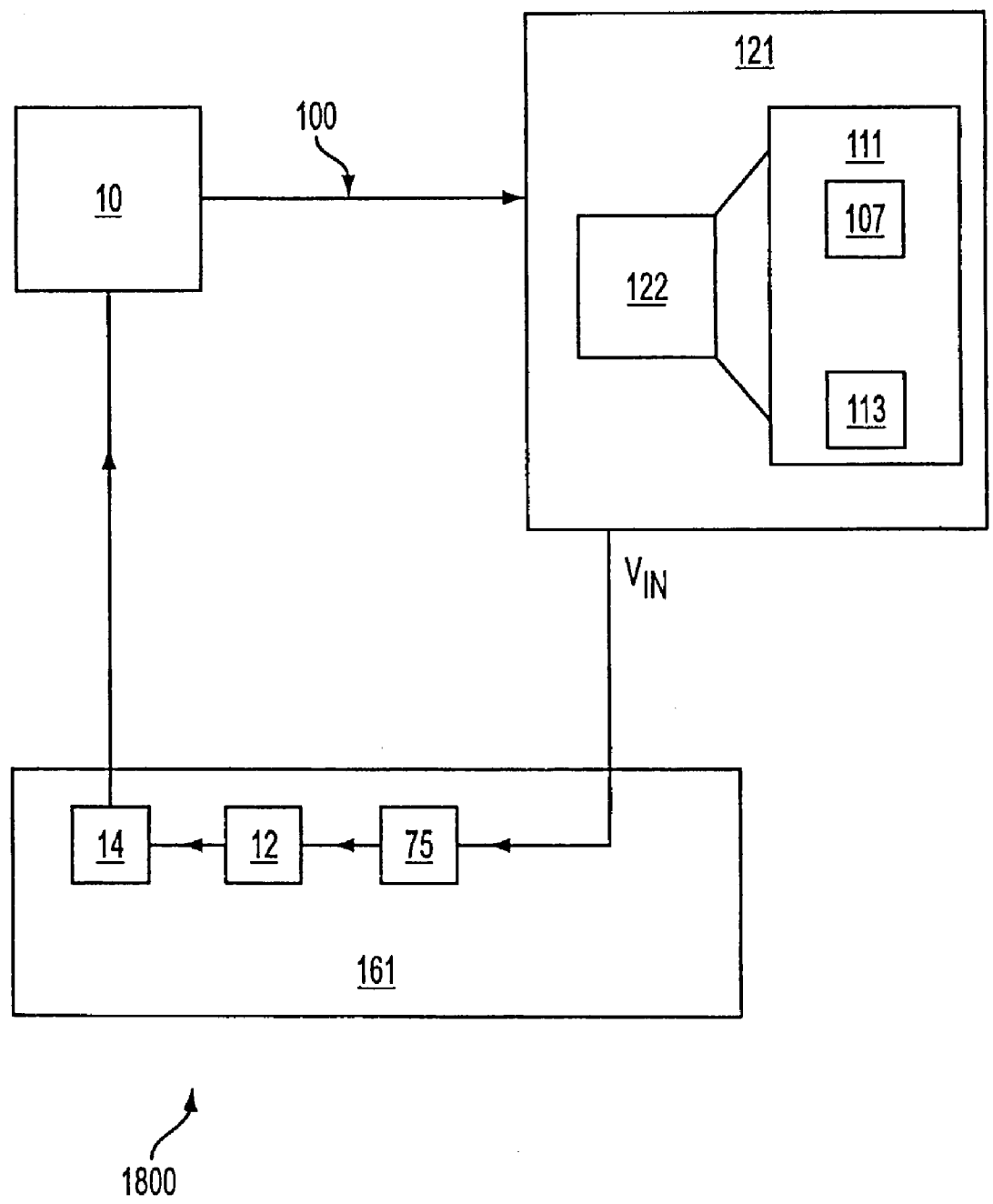
FIG. 29 illustrates a logic block diagram of the present invention.
Figure 30:
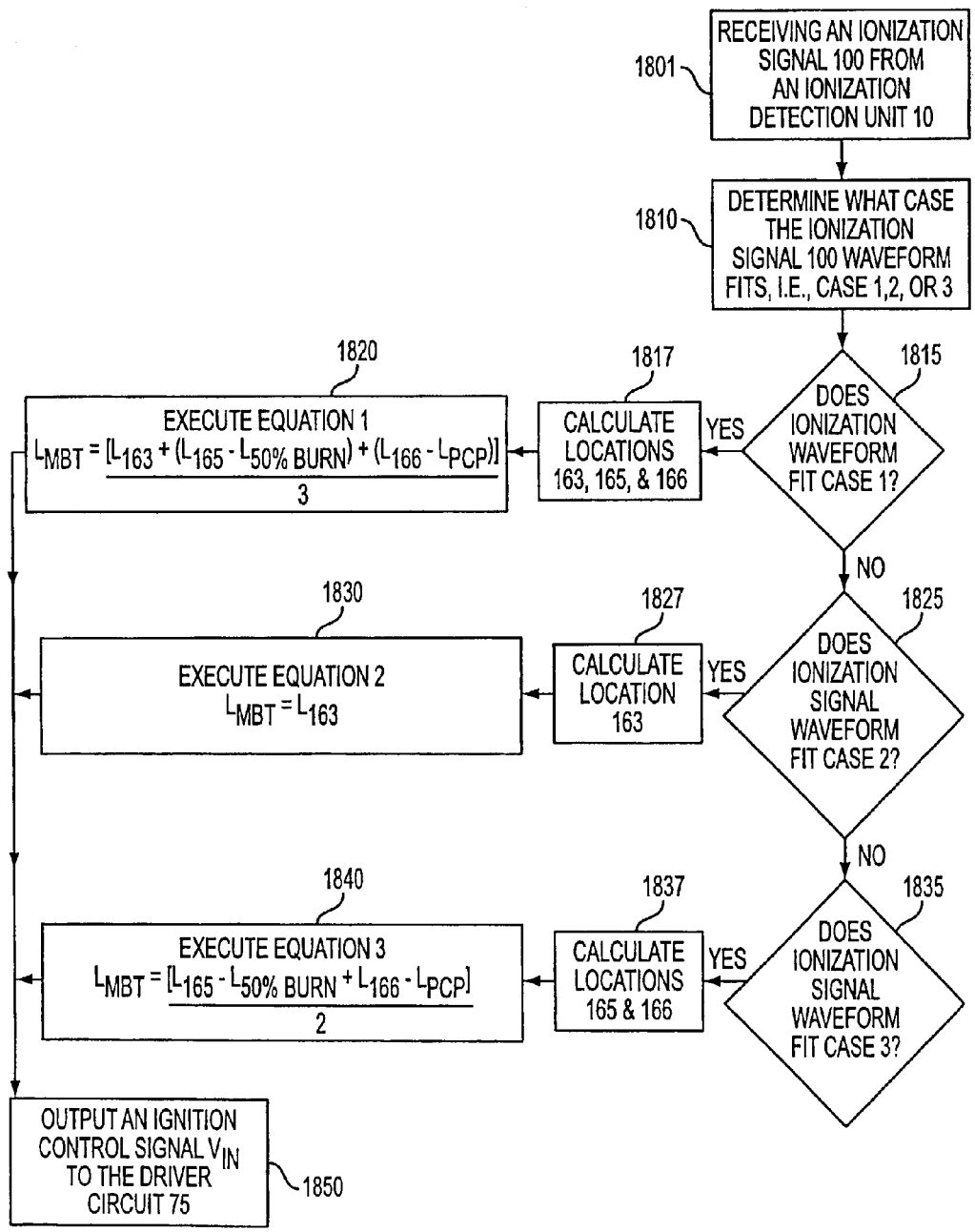
FIG. 30 is a flowchart of the steps taken by the multi-criteria MBT timing estimation method and apparatus of the present invention.

FIG. 28 is a block diagram of the robust multi-criteria MBT timing estimation method of the present invention. FIG. 29 illustrates a logic block diagram of the present invention 1800. The engine control unit ECU 121 receives the ionization signal 100 from an ionization detection unit 10 (Step 1801). (See FIG. 30). Next, the processor 122 in the ECU executes software or firmware 107 stored in memory (which can be the same memory 111 in which the lookup table 113 is stored or different memory). The software 107 comprises instructions to determine which case the ionization signal 100 waveform fits, i.e., case 1, 2 or 3 (1810). If ionization signal 100 fits case 1 (1815), calculate locations $L_{163}$, $L_{165}$ and $L_{166}$ (1817). Next, the software 105 calculates MBT timing by executing equation 1, $$L_{MBT} = (L_{163} + (L_{165} - L_{50\%BURN}) + (L_{166} - L_{PCP}))/3 \quad (1820).$$

If ionization signal 100 fits case 2 (1825), calculate location $L_{163}$ (1827). Next, the software 105 calculates MBT timing by executing equation 2, $L_{MBT} = L_{163}$ (1830). If ionization signal 100 fits case 3 (1835), calculate locations $L_{165}$ and $L_{166}$ (1837). Next, the software 105 calculates MBT timing by executing equation 3, $$L_{MBT} = ((L_{165} - L_{50\%BURN}) + (L_{166} - L_{PCP}))/2 \quad (1840).$$

The ECU 121 calculates an ignition timing control signal $V_{in}$, using a closed loop MBT timing controller (e.g., the one described in Section G), and outputs it to a driver circuit 75 (1850). The driver circuit 75 charges the ignition coil 12 which current to flow between the spark plug 14 electrodes. The air to fuel (A/F) mixture between the electrodes conducts heavily, dumping the energy stored in the ignition coil 12 in the spark plug 14 gap. The sudden release of energy stored in the coil 12 ignites the air to fuel (A/F) mixture in the cylinder.

Section G: Closed Loop MBT Timing Control Using Ionization Feedback

This feature of the invention comprises a method and apparatus to control the engine (minimum timing for the best torque (MBT) spark timing in a closed loop using either ionization or pressure feedback. Both an ionization signal and an in-cylinder pressure signal can be used for calculating and estimating engine MBT timing criterion (or criteria) for each individual cylinder, where this criterion provides a relative measure of how far away the current engine spark timing is from MBT timing. See Sections F, "Robust Multi-Criteria MBT Timing Estimation Using Ionization Signal," and J, "The Determination of MBT Timing Through the Net Pressure Acceleration of the Combustion Process". When the engine is neither knock spark limited (i.e., the MBT spark is more advanced than knock limited spark timing), nor misfire/partial-burn limited (i.e., the desired spark is more retarded (or delayed) than the misfire/partial-burn limited spark timing), the engine is operated in a closed loop MBT timing control mode using MBT timing criterion feedback.

On the other hand, when the engine is knock limited, a knock limit manager maintains operation of the engine at its non-audible knock limit using a closed loop knock limit control. When the engine is misfire/partial-burn limited (e.g., during the cold start, it is desirable to run the engine at its retard limit to heat up the catalyst quickly, see Section E), the misfire limit manager maintains the engine at its misfire/partial-burn limit.

It is desirable to run an automobile internal combustion engine at its MBT spark timing, if possible, for improved fuel economy. Due to the lack of a combustion feedback control system in the prior art, the ignition timing is controlled in open loop based upon an MBT timing table based upon the engine mapping data. One disadvantage of this approach is that it requires a long calibration process and the MBT timing control system is sensitive to changes in system parameters. In other words, the open loop MBT timing control is not able to compensate the MBT spark timing changes due to engine-to-engine variations, engine aging, and engine operational condition variations (altitude, temperature, etc.). In addition, the long calibration process extends the development duration and increases costs. An open loop ignition timing control limits its calibration to a conservative calibration so that the engine cannot be operated at its physical limits (e.g., knock limit). This, in turn, reduces fuel economy.

The present invention uses a closed loop MBT timing control, with the help of knock and misfire/partial burn limit management, to improve the robustness of an open loop ignition timing control. This, in turn, reduces engine system calibrations, and improves engine fuel economy.

The present invention comprises a subsystem of an ignition diagnostics and feedback control system using ionization feedback. The relationship of this subsystem to the diagnostics and control system is shown in FIG. 13 and the logic blocks are labeled 1450, (1430, 1490, 1495), and 1460. This subsystem comprises a closed loop controller which uses estimated MBT timing criteria generated from either (or both) an ionization signal 100 and an in-cylinder pressure signal and ignition diagnostics (knock, partial-burn, and misfire) to control engine ignition timing. When the engine is not knock limited, it operates at its MBT timing for the best fuel economy. When the engine is knock limited, the engine runs at its non-audible knock limit for the best torque output. When the engine is misfire/partial-burn limited, the engine is maintained at its misfire/partial-burn limit.

Three different embodiments of the closed loop MBT timing control architecture are discussed below: a) a cylinder-by-cylinder approach, b) an average approach, and c) a mixed approach. They are differentiated by whether the MBT timing is controlled cylinder-by-cylinder or globally. The first embodiment controls the engine MBT spark timing of each cylinder individually. The MBT, knock, and misfire information of a given cylinder is used to control that cylinder's MBT timing. The second embodiment uses an averaged approach. To be more specific, all cylinders are controlled using a single MBT timing control parameter. The third embodiment uses a mixed approach. That is, the engine misfire and knock are controlled individually, while the MBT timing is controlled globally. The following is a detailed description of each embodiment.

In the cylinder-by-cylinder approach, the MBT timing criterion 1435, the knock information 1400 and the misfire information 1410 of each individual cylinder are calculated separately. Furthermore, the engine's individual MBT timing controller 1430 controls the ignition timing (see FIG. 31). The cylinder-by-cylinder closed loop controller 1430 runs every ignition event. The output of this closed loop controller is the recommended MBT timing signal 1480 for individual cylinders. The inputs to this closed loop controller 1430 are listed below:

The individual cylinder MBT criterion 1435 or individual cylinder MBT timing criterion 1435 is calculated from an ionization signal 100 or in-cylinder pressure signal generated using a parameter estimation method (see Sections F, "Robust Multi-Criteria MBT Timing Estimation Using Ionization Signal" and J, "The Determination of MBT Timing Through the Net Pressure Acceleration of the Combustion Process") for the ionization case. This parameter discloses whether the current engine spark is before or behind the MBT spark timing for that individual cylinder.

Individual cylinder knock information 1400 consists of a knock intensity parameter 1402 and a knock flag 1404. The knock intensity 1402 indicates how severe the knock is and the knock flag 1404 indicates if an audible knock exists or not. Note that both the knock intensity 1402 and the knock flag 1404 can be obtained from either ionization 100 or in-cylinder pressure signals.

Individual cylinder misfire information 1410 consists of both partial-burn 1412 and misfire flags 1414. Again, both partial-burn 1412 and misfire flags 1414 can be obtained from ionization current 100 or in-cylinder pressure signals.

Figure 32:
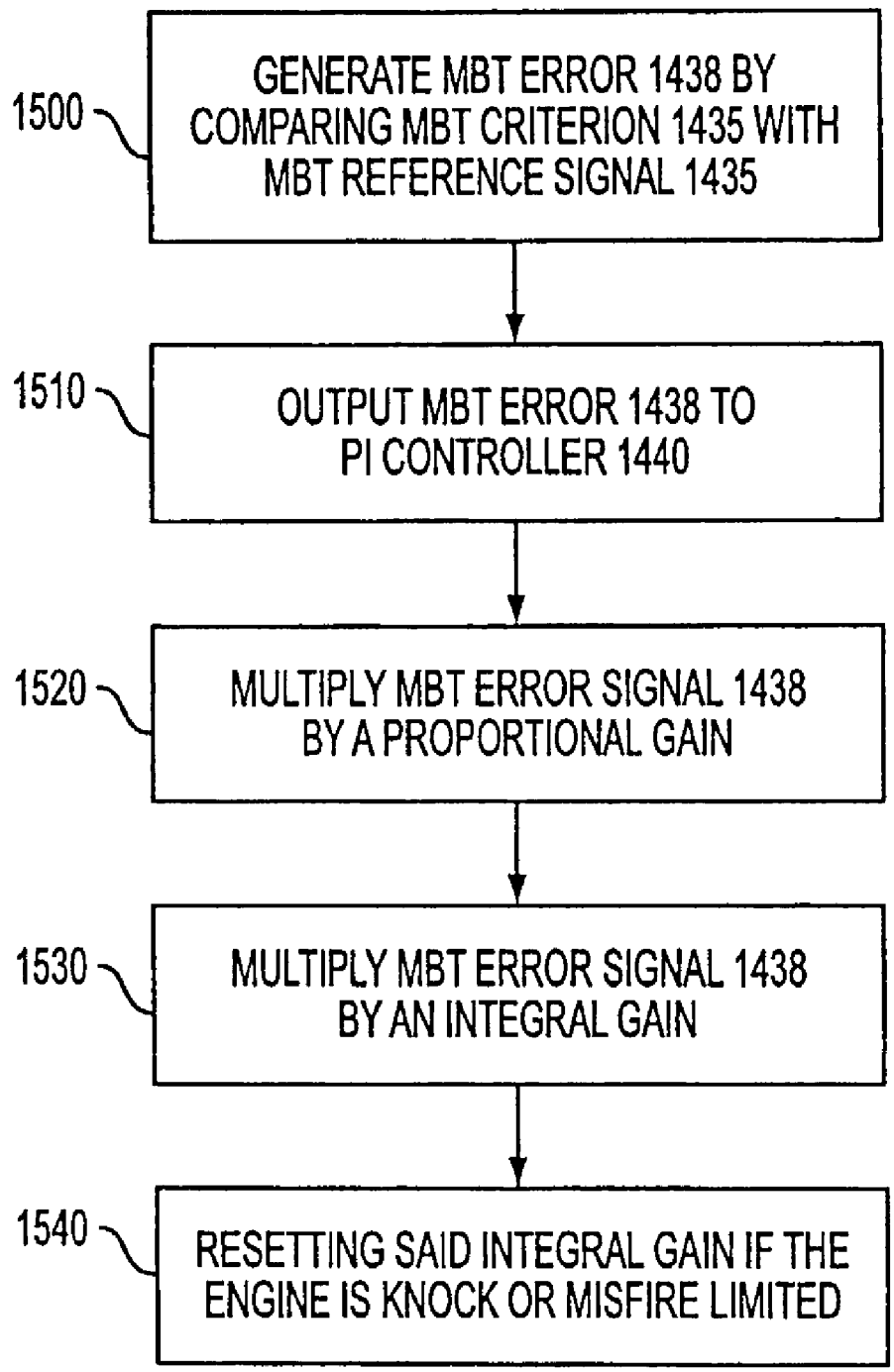
FIG. 32 is a flowchart of steps taken by the PI controller of the present invention.

The cylinder-by-cylinder closed loop MBT timing controller 1430 of the present invention consists of three major subsystems: 1) a closed loop MBT timing proportional and integral (PI) controller 1440, 2) a knock spark advance limit manager 1450, and 3) a misfire spark retard limit manager 1460. The MBT criterion 1435 is compared with the MBT reference signal 1437 (1500), and the resulting error 1438 is input to the PI controller 1440 (1510) (See FIG. 32). The output 1442 of the PI controller 1440 provides the desired MBT timing if the engine 161 is neither knock limited, nor misfire limited. The saturation manager 1470 outputs the ignition/spark timing signal 1480 used to control the ignition timing for that particular cylinder. In a preferred embodiment, the saturation manager 1470 can prevent output windup.

The knock limit manager 1450 provides a knock limit signal 1452 that provides the maximum spark advance allowed at the current engine 161 operational conditions. For example, when the engine 161 is not knock limited, the knock manager 1450 provides a spark advance limit signal 1452 associated with the engine's 161 physical configuration and calibration. When the engine 161 is knock limited, the knock manager 1450 provides a spark advance limit signal 1452 that makes it possible for the engine 161 to run at its knock limit, or in other words, allows the engine 161 to run with light or non-audible knock.

Similarly, the misfire limit manager 1460 provides a misfire limit signal 1462. For example, when the engine 161 is without partial-burn or misfire, it provides the engine 161 with a physical retard spark limit signal 1462 associated with the engine's 161 physical configuration and calibration. When the engine 161 spark timing is misfire limited, it provides a retard limit signal 1462 to allow the engine 161 to operate at its partial-burn/misfire limit. The retard spark limit signal 1462 is input to the saturation manager 1470.

When the engine 161 is either knock or misfire limited (that is, the saturation manager 1470 is active), the corresponding knock 1452 or retard limit 1462 information is forwarded by the saturation manager 1470 and is used to reset the PI integrator (see integration reset logic below) to avoid integration rewinding problems.

Figure 31:
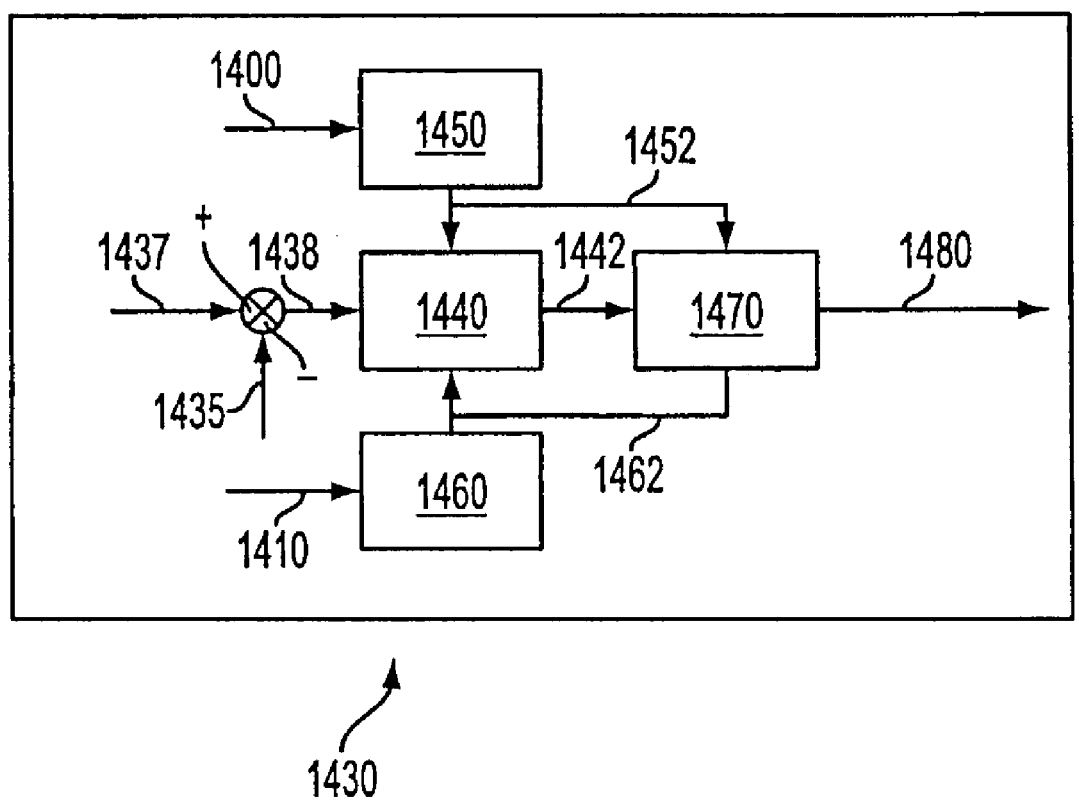
FIG. 31 is a logic block diagram of an individual cylinder MBT timing controller.
Figure 33:
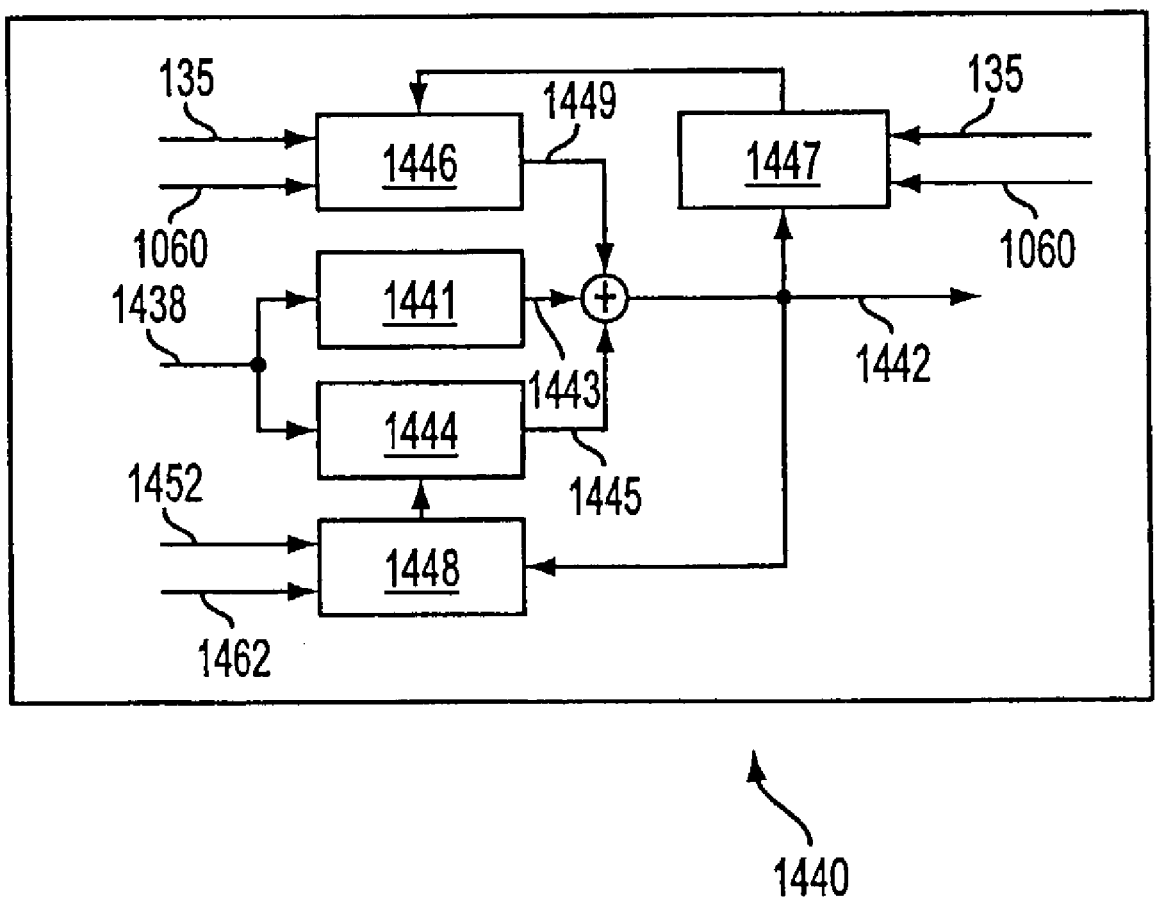
FIG. 33 is a logic block diagram of the closed loop MBT timing PI controller of the present invention.

The PI controller 1440 of FIG. 31 (see FIG. 33 for a detailed configuration) consists of proportional 1441 and integral controller 1444, a feedforward controller 1446 with adaptive learning capability 1447, and an integration reset logic manager 1448 to prevent integration control overflow and rewinding problems. The functionality of these logic devices is described below:

The feedforward controller 1446 is designed to modify open loop MBT timing over the given engine operation map. In addition, an adaptive learning manager 1447 is used to compensate for engine-to-engine variation, engine aging, and operation environmental variation, etc. The feedforward controller 1446 outputs feedforward output 1449.

The proportional 1441 and integral controllers 1444 output a proportional control output 443 and an integral controller output 1445 respectively. The proportional control output 443 is produced by multiplying the MBT error input 1438 by the proportional gain (1520) producing a proportional error signal 1443. The typical value for the proportional gain is around 0.2. The integral controller output 1445 is produced by multiplying the integrated MBT error 1438 by the integral gain (1530) producing an integrated error signal 1445. The typical value for the integral gain is around 0.1. The integrated error signal can be reset when the engine is knock or misfire limited (see below). The proportional error signal 1443, the integrated error signal 1445, and the feedforward output 1449 are summed to produce timing signal 1442.

The integration reset manager 1448 is a logic device 1448 that becomes active when the engine 161 is knock limited or misfire limited. The reset integrated error signal is calculated in such a way that the sum 1442 of the feedforward 1449, proportional 1443, and integral controller 1445 outputs are limited by either the knock 1450 or the misfire limit 1460 managers. That is, if the engine is knock or misfire limited, then the integral error signal is reset (1540) such that the final output stays right at either the knock limit or misfire/partial-burn limit.

The second major subsystem, the knock spark advance limit manager 1450 controls the closed loop knock limit. It includes a PI controller 51441, 51444, 51446, 51448, 51447, a knock error and gain generator 1454 and a saturation manager 1470.

Only the integration portion of the PI controller (which comprises blocks 51441, 51444, 51446, 51448, 51447 in the knock manager 1450) is used for closed loop knock limit control 1450 (see FIG. 34) since the proportional gain is set to zero at all times. The integration gain and the error used by the PI controller 51441, 51444, 51446, 51448, 51447 are provided by the knock error and gain generator 1454 (1552) (see FIG. 35). The integral reset logic device 51448 is used to reset the integral gain and integrator controller 51444 output 51445 to avoid overflow and rewinding when the output is saturated (1540).

Figure 34:
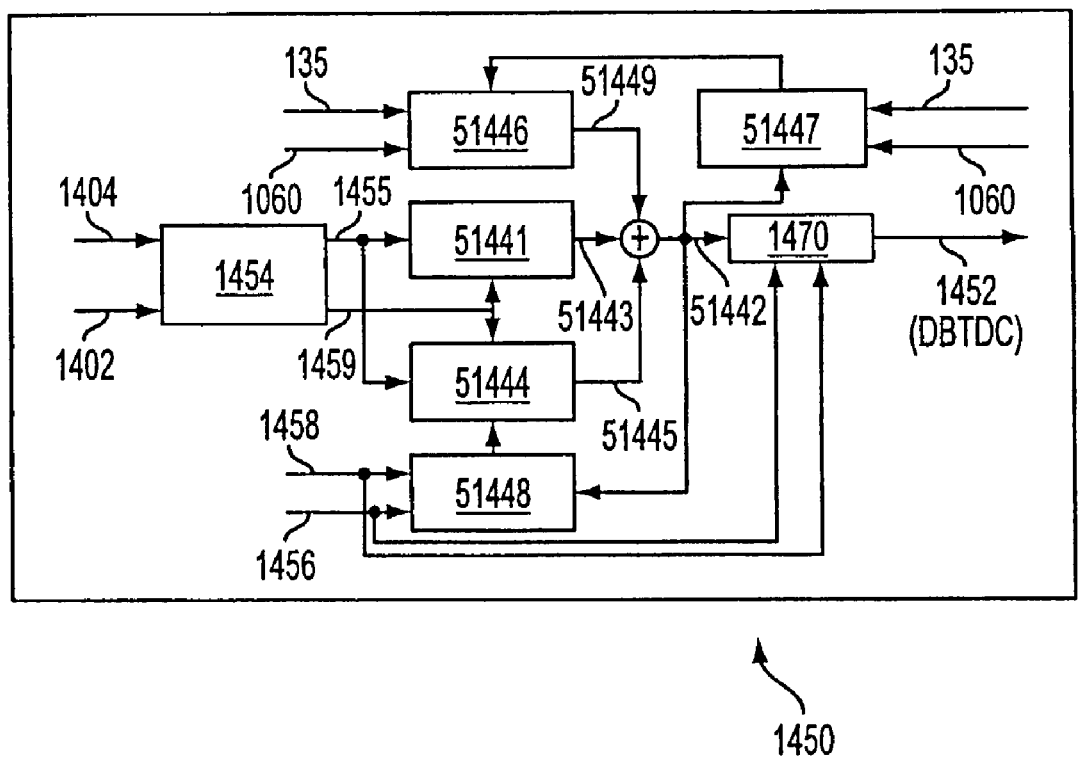
FIG. 34 is a logic block diagram of the closed loop knock spark limit management of the present invention.
Figure 35:
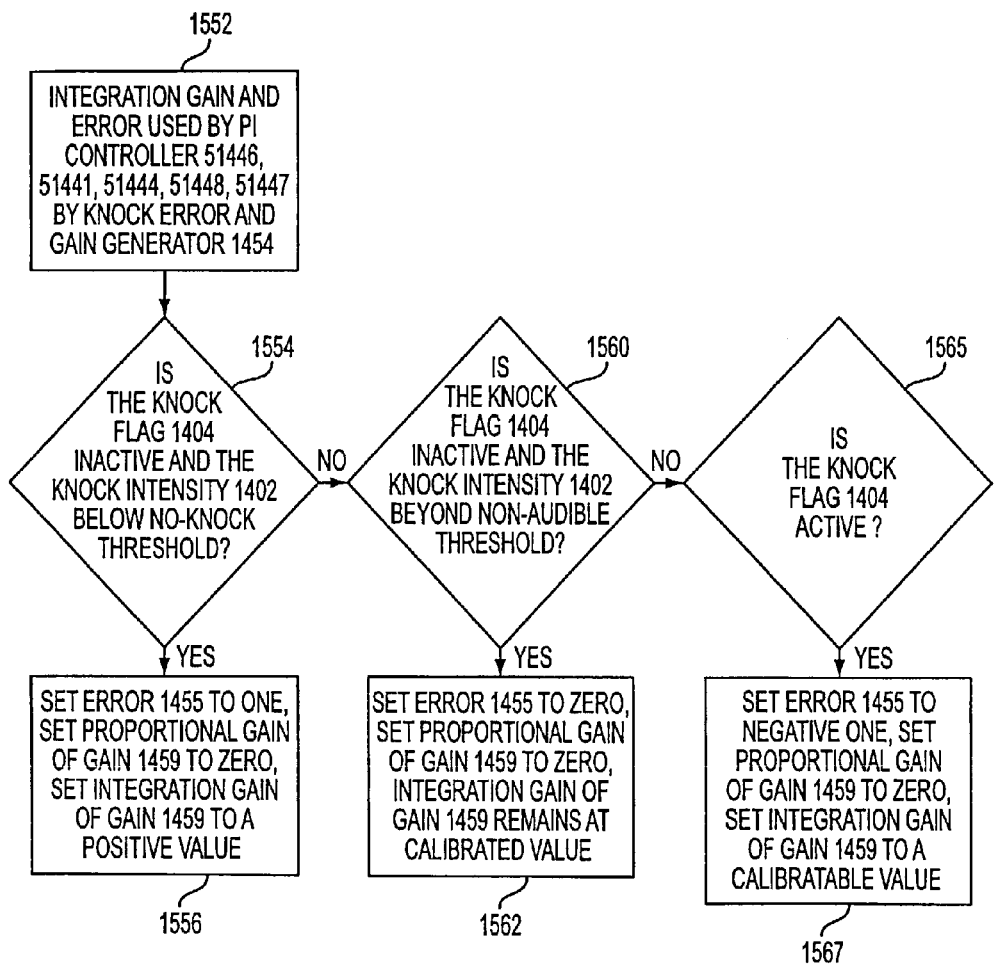
FIG. 35 is a flowchart of the steps taken by the present invention during closed loop control when the engine is knock limited.

The closed loop knock spark advance limit manager 1450 (see FIG. 34 for a detailed configuration) consists of a knock error and gain generator 1454 which is operably connected to the PI controller 51441, 51444, 51446, 51448, 51447 disclosed in the knock manager 1450 in FIG. 34.

The knock error and gain generator 1454 is a logic block or device in which both the knock intensity 1402 and the knock flag 1404, calculated in a preferred embodiment by using the ionization current signal 100, are used as inputs. The generator 1454 outputs two signals, "Error" 1455 and "Gain" 1459, where "Gain" 1459 consists of both proportional and integration gains. Both the "Error" 1455 and "Gain" 1459 outputs are generated using the knock intensity 1402 and knock flag 1404 signals and are divided into three states: a) no knock, b) inaudible knock, and c) audible knock.

The no knock state occurs when the knock flag signal 1404 is inactive and the knock intensity 1402 is below the no knock threshold. In this case, if the knock flag signal 1404 is inactive and the knock intensity 1402 is below the no knock threshold (1554), the "Error" output 1455 is set to one. In addition, the proportional gain of the "Gain" output 1459 is set to zero, while the integration gain is set to a positive value (1556) such as 0.2, that may be calibrated. Thus, the proportional control output 51443 of the PI controller 51441, 51444, 51446, 51448, 51447 is zero, while the integral controller output 51445 equals a positive value. The knock error and gain generator 1454 moves the closed loop timing output 51442 in the advance direction between the hard advance lower limit 1456 and the hard advance upper limit 1458 since the integration reset logic 51448 resets the integrator to limit the timing output within the timing boundary defined by 1456 and 1458 if the timing output 51442 is outside the boundary.

The inaudible knock state occurs when the knock flag signal 1404 is inactive and the knock intensity 1402 is beyond the knock threshold. This is the desired operational condition when the engine 161 is knock limited. In this case, if the knock flag signal 1404 is inactive and the knock intensity 1402 is beyond the non-audible knock threshold (1560), the "Error" output 1455 is set to zero. In addition, the proportional gain of the "Gain" output 1459 is set to zero, while the integration gain remains at the calibrated value (1562) as in the no knock case. Thus, the proportional control output 51443 of the PI controller 51441, 51444, 51446, 51448, 51447 is zero, while the integral controller output 51445 remains at its previous positive value. This allows the timing advance limit signal 1452 to remain unchanged.

The audible knock state occurs when the knock flag 1404 becomes active. In this case, if the knock flag 1404 is active (1565), the "Error" output 1455 is set to negative one. In addition, the proportional gain of the "Gain" output 1459 is set to zero, while the integration gain is set to a calibratable value (1567) such as 0.4. Plus, a calibratable negative value is added to the integrator to move the spark timing in the retard direction to avoid engine knock and to return to either case b or case a, immediately.

The general method of the closed loop knock limit management is to allow the engine to run its spark timing right at its advance limit (hard advance upper limit 1458) or as close as possible. That is, when the engine 161 is knock limited, the engine 161 will run at its maximum advance timing limit with a inaudible knock (i.e., case b, timing at knock limit DBTDC). When the engine 161 is not knock limited, spark timing signal 1452 moves in an advanced direction at a certain rate until it reaches the hard limit. When the engine 161 runs right at its inaudible knock limit, the spark timing limit signal 1452 remains unchanged. And when the engine 161 runs with an audible knock, a correction will be added to the knock PI integrator 51441, 51444, 51446, 51448, 51447 to move the spark timing signal 1480 in the retard direction quickly to avoid further engine knocking.

The feedforward knock spark limit controller 51446 and the adaptive knock spark limit controller 51447 set a feedforward spark limit that is a function of engine speed 135 and engine load 1060. It can be obtained through the engine calibration process. Due to the adaptive learning feature of this controller 51447, the feedforward spark limit is modified based upon the output of the adaptive learning method so that the feedforward spark limit is able to compensate for engine-to-engine variation, engine aging and so on. The adaptive learning controller 51447 compares the current spark limit with the feedforward timing limit signal 51442 at the current engine operating conditions (such as engine speed and load) to correct the feedforward timing limit 51442 adaptively.

Figure 36:
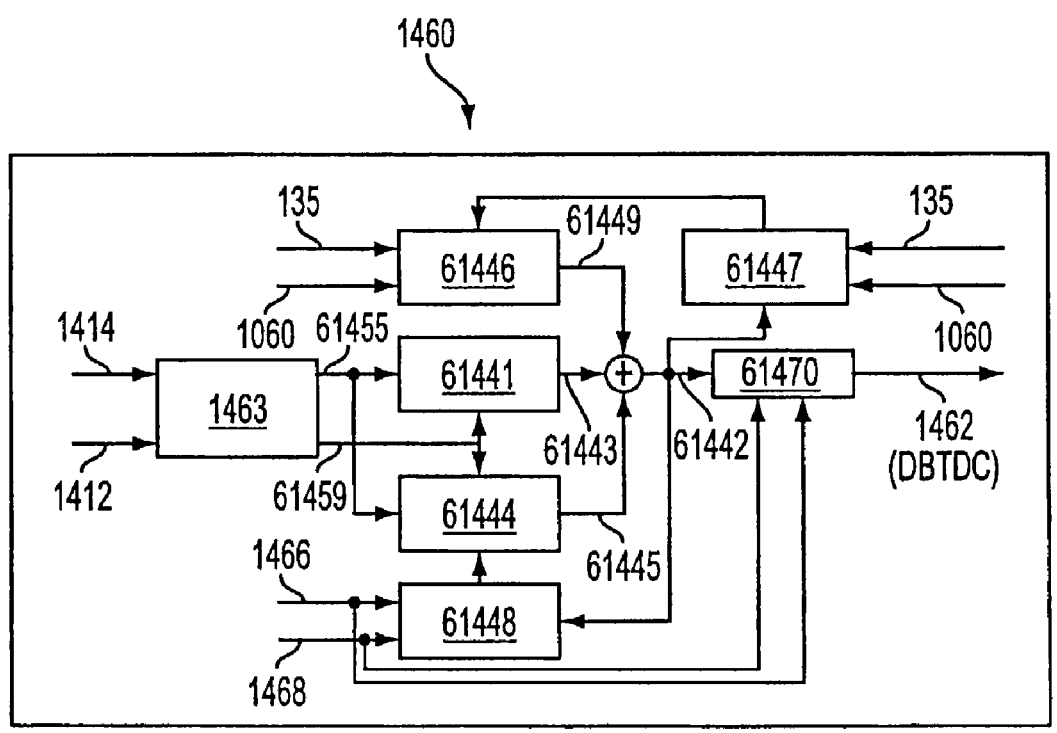
FIG. 36 is a logic block diagram of the closed loop retard timing limit management of the present invention.
Figure 37:
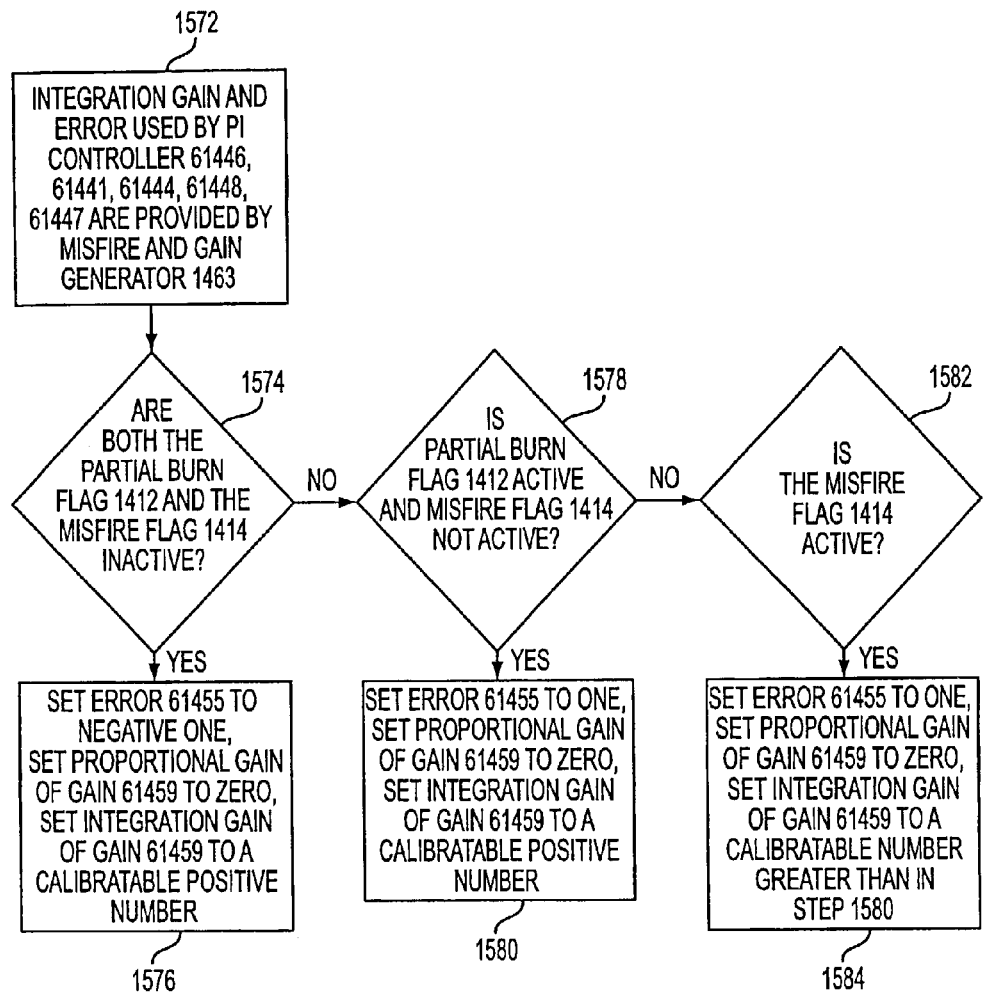
FIG. 37 is a flowchart of the steps taken by the present invention during closed loop control when the engine is misfire limited.

The third major subsystem, the closed loop misfire controller 1460 or misfire retard limit manager 1460 controls closed loop misfire. The closed loop misfire controller 1460 (see FIG. 36 for a detailed configuration) consists of a misfire error and gain generator 1463. Here, the PT controller 61441, 61444, 61446, 61448, 61447 is used to generate a spark advance limit signal. The integration gain and the error used by the PI controller 61441, 61444, 61446, 61448, 61447 are provided by the misfire error and gain generator 1463 (1572) (see FIG. 37).

Only the integration portion of the PI controller 61441, 61444, 61446, 61448, 61447 is used for closed loop control of the retard spark limit. Both the integration gain and error are provided by the error and gain generation block (or error and gain generator) 1463. When a misfire occurs, the PI integrator 61444 is reset by adding an adjustable spark advance (a positive value) to the existing integrator register to quickly eliminate the misfire.

In the misfire error and gain generator block 1463, both the partial-burn flag 1412 and the misfire flag 1414, which in a preferred embodiment, is calculated using the ionization current signal 100, are used as inputs. This block outputs signals, "Error," 61455 and "Gain," 61459, where the "Gain" signal consists of both the proportional and the integration gains. They can be divided into three states: d) both partial burn 1412 and misfire 1414 flags are inactive, e) partial burn flag 1412 is active, but the misfire flag 1414 is not active, and f) active misfire flag (or index) 1414.

In the case where both partial burn 1412 and misfire 1414 flags are inactive (1574), the "Error" output 61455 is set to a negative one, the proportional gain of the "Gain" output 61459 is set to zero, while the integration gain of the "Gain" output 61459 is set to a positive value (1576) such as 0.2., that may be calibrated. Thus, the proportional control output 61443 of the PI controller 61441, 61444, 61446, 61448, 61447 is zero, while the integral controller output 61445 decreases. This allows the closed loop control output 1462 to move in the retard direction until it reaches the hard retard upper limit 1468. Note that when ever output 1462 is not between the hard upper and lower limits (1468 and 1466), the integrator will be reset by the reset logic 61448 such that the output stays within the range.

In the case where the partial burn flag 1412 is active, but the misfire flag 1414 is not active (1578), the "Error" 61455 output is set to one, and the proportional gain of the "Gain" output 61459 is set to zero, while the integration gain of the "Gain" output 61459 is set to a an adjustable positive number (1580) same as case d. Thus, the proportional control output 61443 of the PI controller 61441, 61444, 61446, 61448, 61447 is zero, while the integral controller output 61445 is set to a positive value. This allows the spark timing 1462 to move in an advance direction.

In the case where the misfire flag (or index) 1414 is active (1582), the "Error" output 61455 is set to one, and the proportional gain of the "Gain" output 61459 is set to zero, while the integration gain of the "Gain" output 61459 is set to an adjustable value greater than case e (1584) such as 0.4. Thus, the proportional control output 61443 of the PI controller 61441, 61444, 61446, 61448, 61447 is zero, while the integral controller output 61445 moves in an advance direction. An adjustable positive value is added to the PI integrator 61444 to immediately move the closed loop control output signal 1462 in the advanced direction to avoid misfire and to return to either case e or case d, immediately.

The general method of the closed loop misfire spark limit control is to provide the engine spark timing signal 1462 right at its retard limit. That is, to allow the engine to run at its maximum allowed retard time (i.e., maximum delay from the MBT timing for that cylinder) without a misfire and with minimum partial burn. When the engine 161 is not at the partial burn state, the spark timing signal 1462 will move in the retard direction at a certain rate determined by the integration gain calibrated in case d. When the engine 161 is at partial burn, the spark timing 1462 moves in the advance direction at a certain rate calibrated by the integration gain defined in case b. In the case where a misfire occurs, a correction will be added to the PI integrator 61444 to move the spark timing signal 1462 in the advance direction quickly to avoid further misfires.

The feedforward retard spark limit controller 61446 and the adaptive retard spark limit learning controller 61447 set a feedforward retard spark limit that is a function of engine speed 135 and engine load 1060. It can be calculated during the engine's calibration process. Due to the adaptive learning feature of the controller 61447, the feedforward spark limit is modified based upon the output of the adaptive learning method so that the feedforward spark limit is able to compensate for engine-to-engine variations, engine aging, etc. The adaptive learning circuit 61447 compares the current retard spark limit with the default limit at the current engine operating conditions (such as engine speed 135 and load 1060) to correct the feedforward retard spark limit adaptively.

As stated supra, the second embodiment of the MBT timing control architecture uses an average approach. In this embodiment, the knock information 1400 and the misfire information 1410 of all the individual cylinders are used to calculate the worst case knock 1406 and worst case misfire information 1416 which is then fed into the advance 1450 and the retard limit 1460 managers. A knock processor 1408 and a misfire processor 1418 perform the calculations. In addition, the latest engine MBT criterion 1435 is used to control the ignition timing, see FIG. 38.

The worst case knock information 1406 consists of both a worst case knock flag 1407 and a worst case knock intensity 1409. The worst case knock flag 1407 is set to active as long as one of the individual cylinder knock flags 1404 is active over one engine cycle. The worst case knock intensity 1409 is equal to the maximum of all knock intensities 1402 for all the cylinders over one engine cycle.

Similar to the worst case knock information 1406, the worst case misfire information 1416 consists of both a worst case partial-burn flag 1417 and a worst case misfire flag 1419. As long as one of the partial-burn 1412 or misfire 1414 flags is active over one engine cycle, the corresponding worst case partial-burn 1417 or misfire flag 1419 is set to active over one engine cycle.

Figure 38:
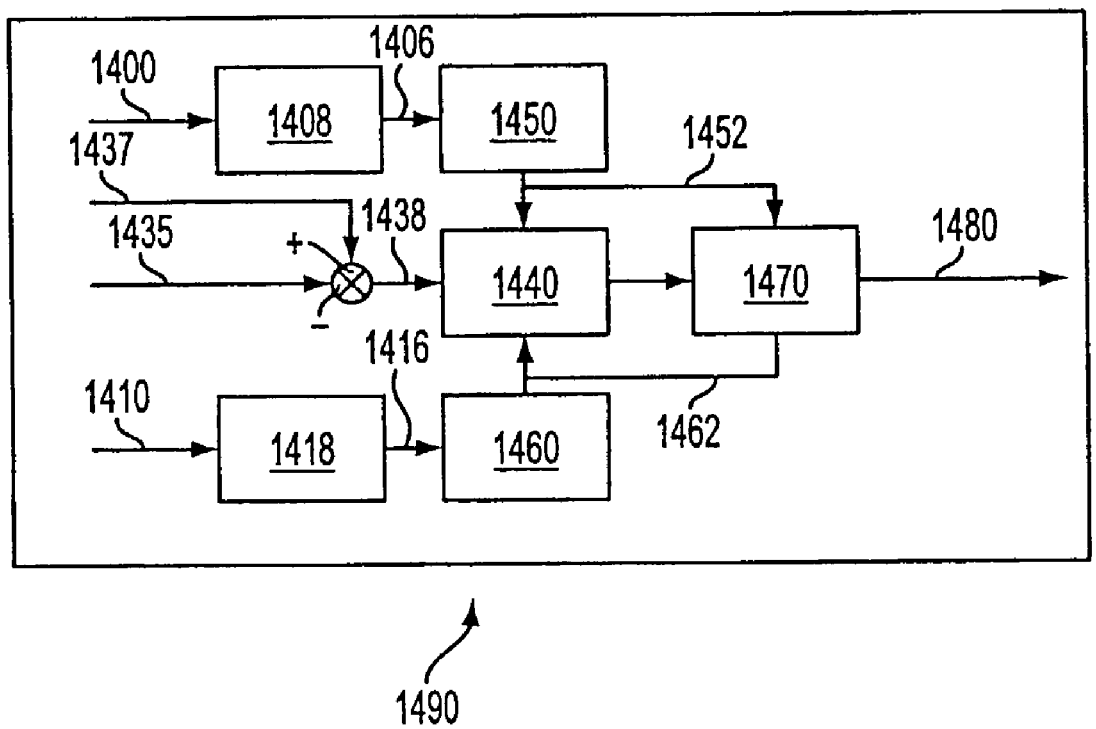
FIG. 38 is a logic block diagram of the average MBT timing control of the present invention.

The function of the MBT timing controller 1490 of the average approach embodiment is similar to the function of the controller used in the cylinder-by-cylinder method embodiment (compare FIG. 31 and FIG. 38). In addition, the average approach method uses only one PI controller 1440, one knock limit manager 1450 and one misfire limit manager 1460 to generate one mean MBT ignition timing control signal 1480 which is used to control the ignition for all cylinders. A difference between this embodiment and the cylinder-by-cylinder embodiment is that the worst case knock 406 and misfire 1416 information is used by the knock advance limit 1450 and the misfire retard limit 1460 managers respectively (see FIG. 38). In addition, current MBT criterion (or criteria) 1435 for the current cylinder is input to the MBT PI controller 1440. The advantage of the average method is that only one PI controller 1440 is used for all cylinders which reduces the throughput requirement. However, since this method does not use individual cylinder knock and misfire limit management, a more conservative knock and misfire control of each cylinder occurs since one mean signal 1480 is used for all cylinders.

As stated supra, the third embodiment of the MBT timing control architecture uses a mixed approach. In this embodiment, the individual knock 1400 and misfire information 1410 is used to calculate both knock 1400 and misfire 1410 for each cylinder. In addition, the current knock 1400 and misfire information 1410 is input to the MBT PI controller 1440. Also, the current engine MBT criterion 1435 for the current cylinder is used to control ignition timing, see FIG. 39.

The mixed MBT control method 1495 runs every combustion event. The knock 1450 and misfire limit 1460 managers select the knock and misfire limits for the current cylinder and uses them for the PI saturation using the knock processor 1408 and misfire processor 1418. However, the PI integrator is reset using the next cylinder's knock and misfire limit. That is, if the output could be saturated by either the knock or misfire for the next cylinder, the integrator will be reset to its corresponding boundary value.

Figure 39:
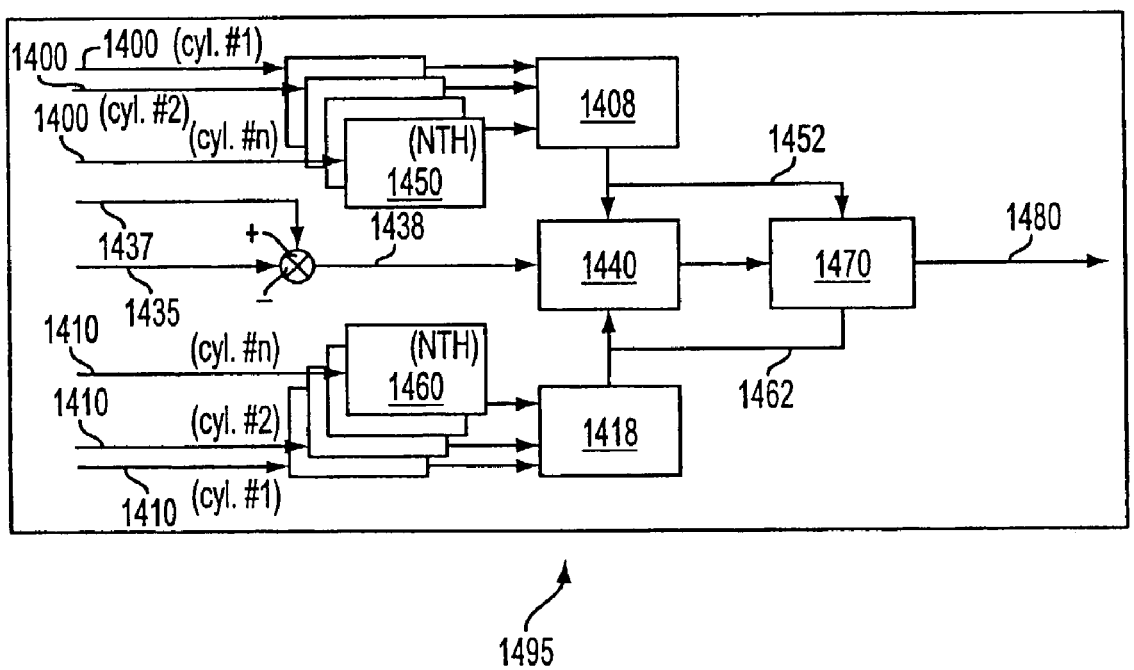
FIG. 39 is a logic block diagram of the mixed MBT timing control of the present invention.

The MBT timing controller of the mixed method 1495 is similar to the average approach method (compare FIGS. 38 and 39). Both the average and the mixed methods use only one PI controller 1440. The difference is that the average method uses a single knock manager 1450 and a single misfire manager 1460, while the mixed method uses multiple ones. Thus, the output timing limit signal 1480 has individual knock and misfire limits. The advantage of using the mixed method is that only one PI controller 1440 is used for all cylinders which reduces the throughput requirement. Also, use of multiple knock 1450 and misfire managers 1460 produces improved fuel economy.

Section H: Closed-Loop Individual Cyclinder Air/Fuel Ratio Balancing

This feature of the present invention comprises a method of controlling individual cylinder air to fuel (A/F) ratios using a closed loop 1300 and an ionization signal 100. An individual cylinder ionization signal 100 is used to calculate the minimum timing for best torque (MBT) timing information of that cylinder. This MBT timing information 1320 is then used to control the individual cylinder's A/F ratio using a closed loop 1300. The control is based upon the relationship between the MBT timing information and the A/F ratio. In addition, an adaptive learning method is employed to modify (or update) the feedforward control logic block of the present invention.

The individual cylinder A/F ratio of an internal combustion engine 161 varies due to the fact that the intake manifold cannot distribute airflow into the individual cylinders evenly, even when the global A/F ratio (i.e., the average A/F ratio of all the cylinders) is maintained at stoich. The difference in A/F ratio between individual cylinders affects engine emission, fuel economy, idle stability, vehicle Noise, Vibration and Handling (NVH), etc.

The closed loop control of an individual cylinder's A/F ratio of the present invention utilizes the MBT criterion, see Section F: Robust Multi-Criteria MBT Timing Estimation Using Ionization Signal, provided by the ionization signal 100 or by the in-cylinder pressure signal, see Section J: The Determination of MBT Timing Through the Net Pressure Acceleration of the Combustion Process, to balance the A/F ratios of the individual cylinders.

Figure 40:
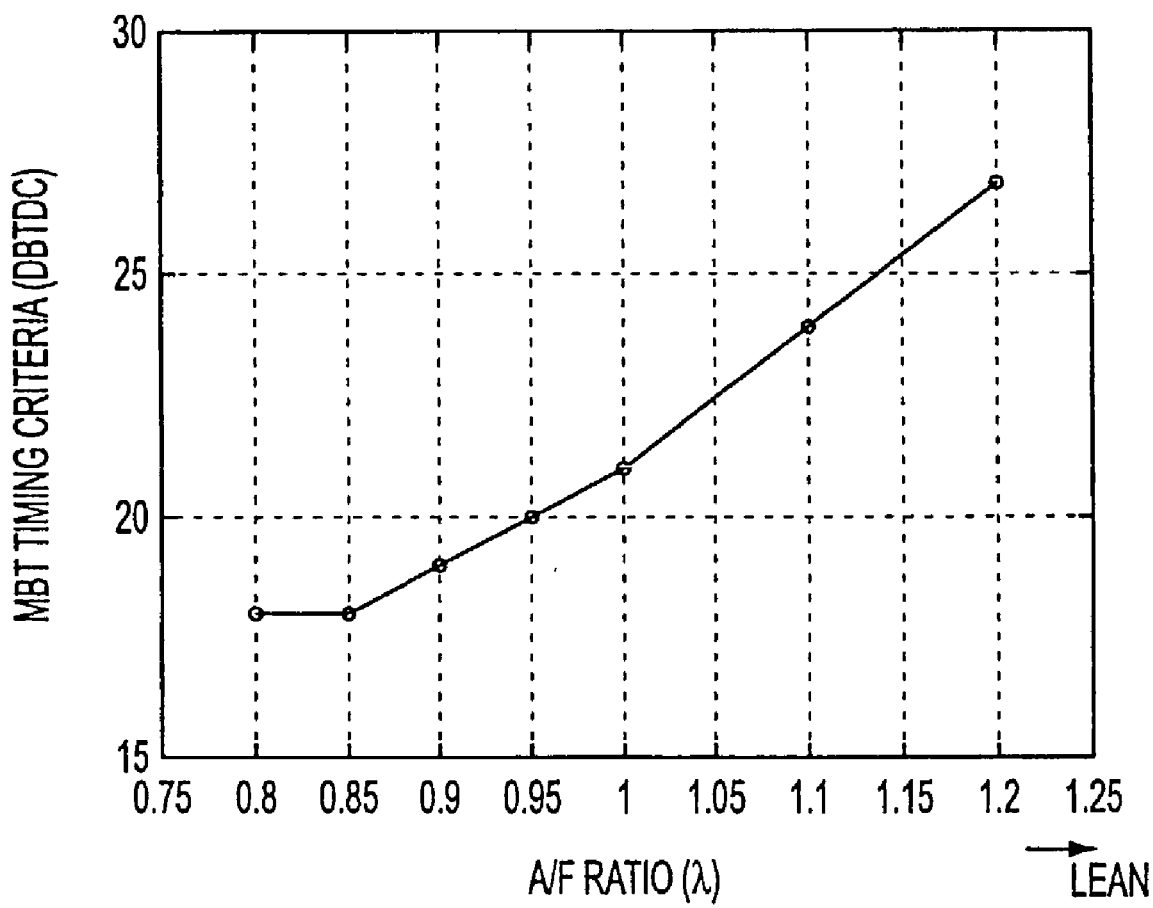
FIG. 40 is a plot of the relationship between A/F ratio and MBT spark timing.

This invention is a subsystem of an ignition diagnostics and feedback control system using ionization current feedback illustrated in FIG. 13. It is labeled 1300 in FIG. 13. When an engine 161 is operated near to its MBT spark timing, it is known in the art that engine MBT timing criterion, calculated from either in-cylinder pressure or from an ionization signal 100, is a function of the A/F ratio at which the engine 161 is operated. When the A/F ratio increases or moves to the lean direction (i.e., a leaner A/F ratio), the MBT spark timing is advanced and moves forward from Top Dead Center (TDC). This movement is due to the fact that leaner the A/F ratio is, the longer it takes for the combustion flame to develop. FIG. 40 shows a test relationship curve of MBT spark timing versus A/F ratio using a 2.0 L, four cylinder engine running at 3000 RPM with Wide Open Throttle (WOT).

When the engine 161 is operated near the MBT spark timing, the relationship between A/F ratio and MBT spark timing information or criterion (obtained using either the ionization signal 100 or the in-cylinder pressure signal) also holds at the individual cylinder level. For the same reasons discussed above, the MBT spark timing of a relatively lean cylinder (i.e., a cylinder operated at a lean A/F ratio) is advanced when compared with cylinders operated with relatively rich A/F ratios.

Figure 41:
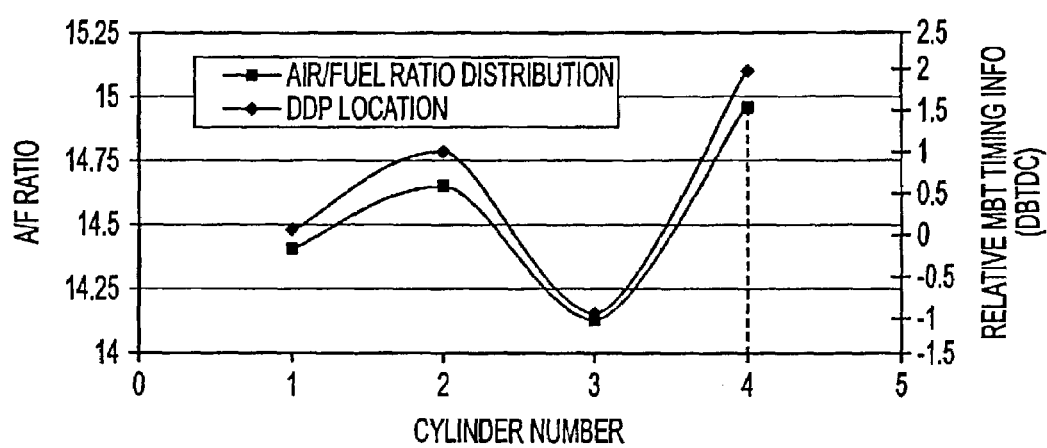
FIG. 41 illustrates the relationship between A/F ratio and MBT spark timing for the individual cylinders of a 2.0 L, four cylinder engine.

FIG. 41 shows a test relationship of MBT timing information and A/F ratio for individual cylinders of a 2.0 L, four cylinder engine running at 1500 RPM, 2.62 Bar Brake Mean Effective Pressure BMEP with 20% engine gas re-circulation (EGR) and ignition timing at 47° Before Top Dead Center BTDC. The engine 161 was run very close to stoich with an A/F ratio of 14.54. Furthermore, the relatively leanest cylinder (e.g., cylinder #4 with an A/F ratio of 14.96) had its MBT timing criterion (a relative criterion indicating how far the current spark timing of the cylinder is from MBT timing) 2 degrees more advanced than the mean MBT criteria. Similarly, the cylinder with the richest A/F ratio (cylinder #3 with an A/F ratio of 14.13) had its MBT timing criterion 1 degree behind (or delayed when compared to) the mean MBT spark timing.

Figure 42:
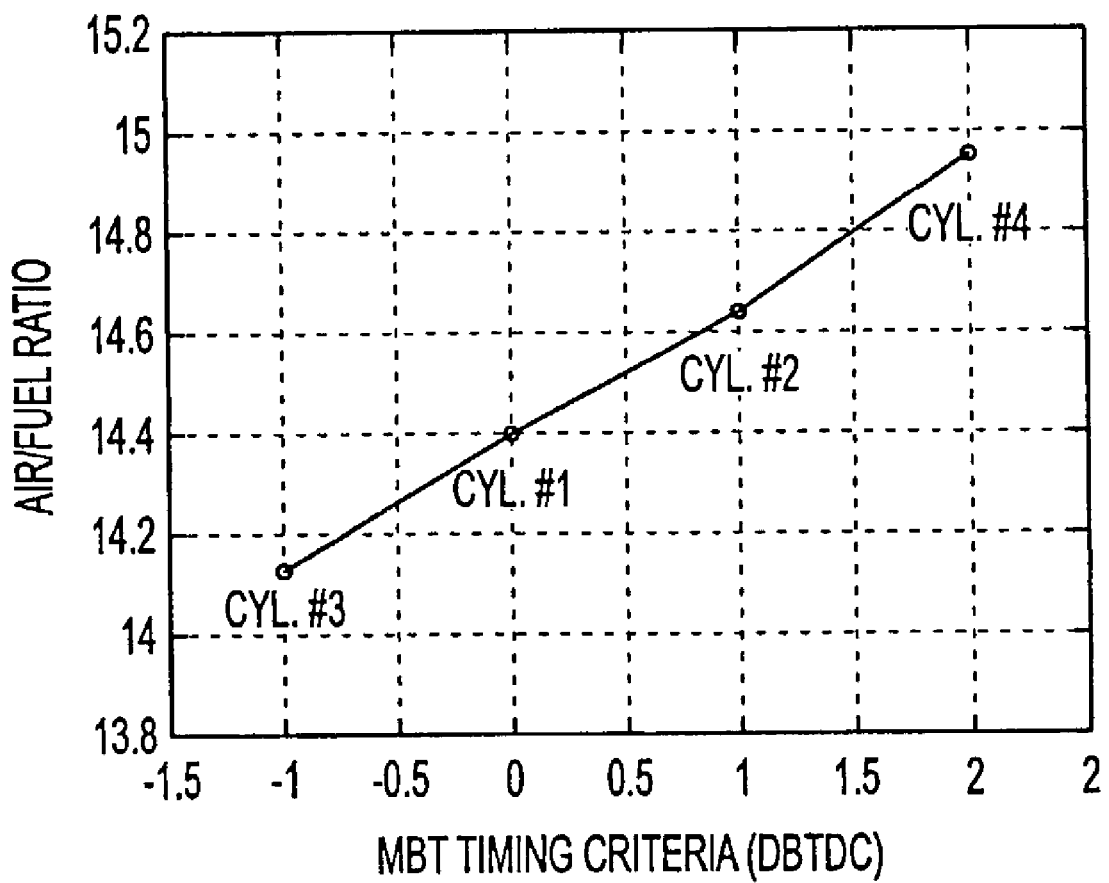
FIG. 42 is a plot of the linear relationship between A/F ratio and MBT timing information for the individual cylinders of a 2.0 L, four cylinder engine.

FIG. 41 has been redrawn in FIG. 42 to show the individual cylinder relationship of A/F ratio and MBT timing criteria. From FIG. 42, it is seen that the relationship of A/F ratio versus MBT criteria is generally linear even though the data is collected from individual cylinders. From FIG. 42, it can be determined that a predominantly linear relationship exists between MBT timing information and A/F ratio even at the individual cylinder level when the engine is operated near its MBT timing.

Figure 43:
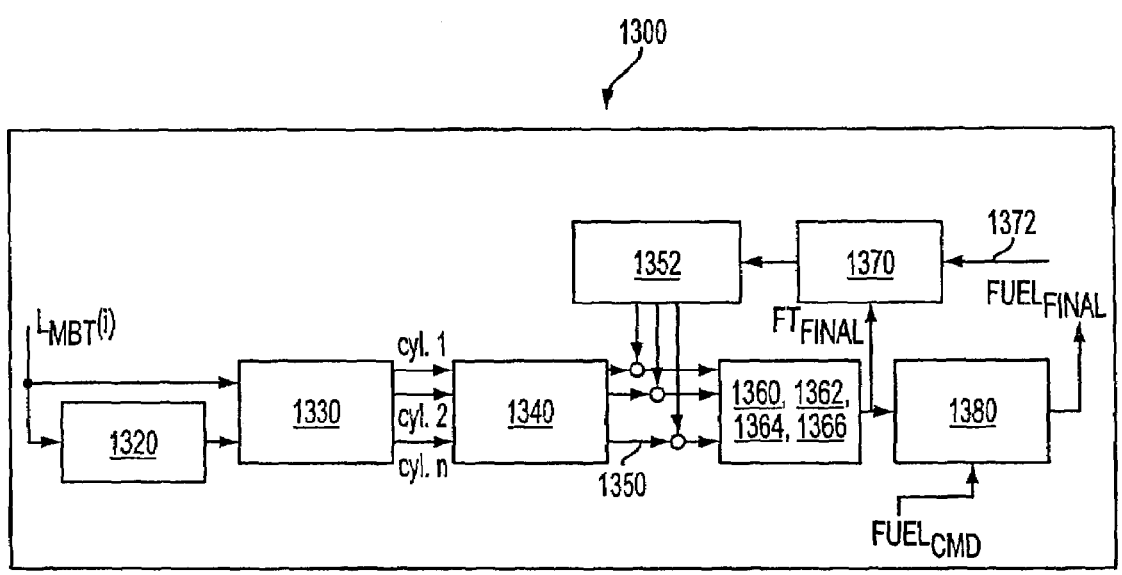
FIG. 43 is a logic block diagram of the closed loop individual cylinder A/F ratio balancing control method of the present invention.

The present invention uses this relationship to balance the A/F ratio for individual cylinders. The method used in the present invention uses a closed loop controller to adjust (or trim) the fuel of individual cylinders such that all cylinders have the same MBT timing criterion. Using the relationships illustrated in FIGS. 40 and 42, the A/F ratios of the individual cylinders are balanced. FIG. 43 illustrates the closed loop control method of the present invention for balancing individual cylinder A/F ratios.

This control method consists of seven major logic blocks or steps: a) calculating a mean MBT timing coefficient 1320, b) calculating error of unbalancing 1330, c) error integration of the individual cylinder difference 1340, d) feedforward fuel trim coefficient for each individual cylinder 1350, e) Rescale trim coefficient for each individual cylinder 1360, f) adaptive updating feedforward fuel trim coefficient 1370, and g) individual cylinder final fueling coefficient calculation 1380. The control method of the present invention balances the A/F ratio between the individual cylinders caused by engine-to-engine variations, uneven intake airflow due to intake manifold geometry, and other related factors. This controller is disabled when the engine is either knock and misfire limited. In a preferred embodiment, it is run once every engine cycle so that the MBT timing information is updated for each cylinder.

Figure 44:
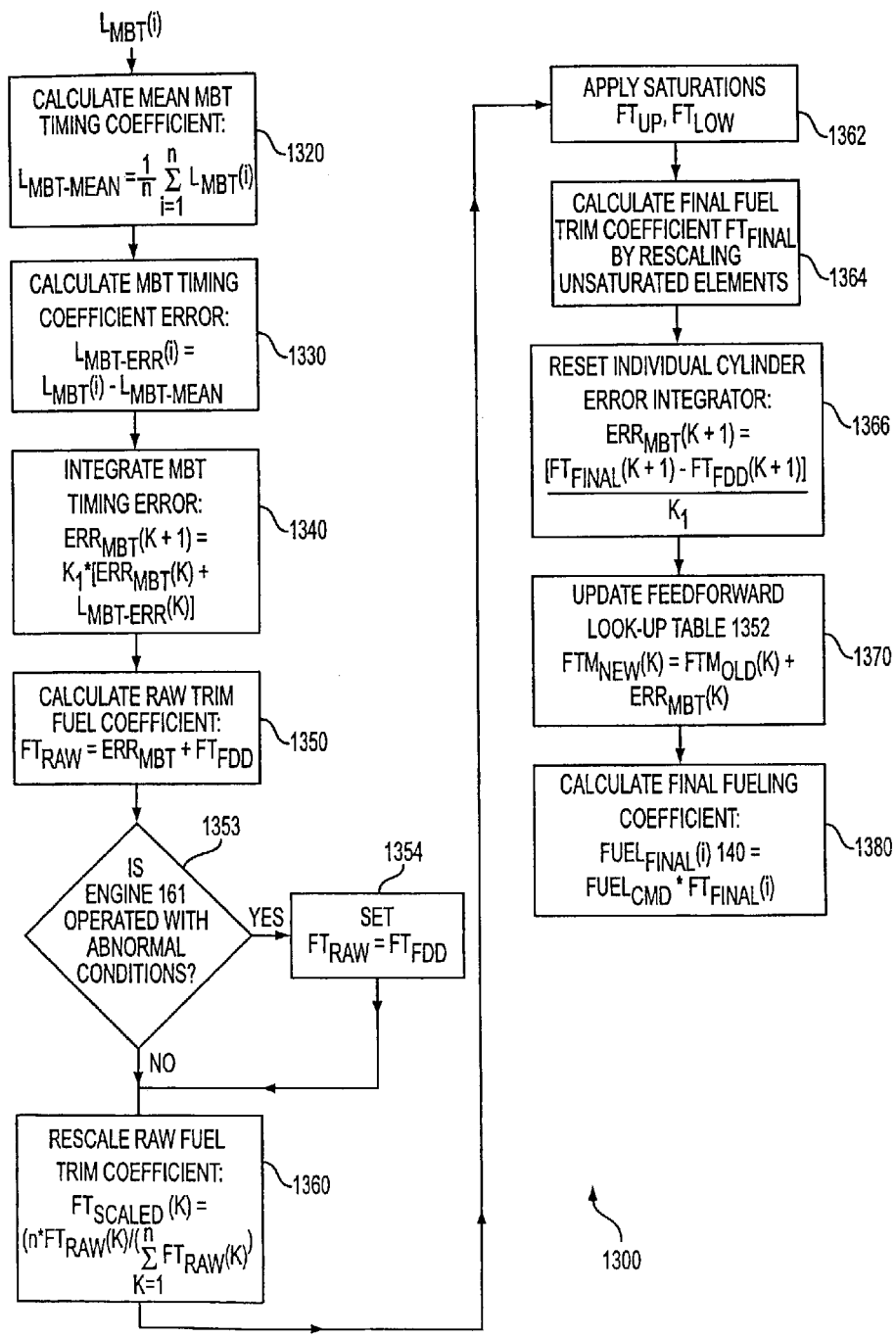
FIG. 44 is a flowchart of the closed loop individual cylinder A/F ratio balancing control method of the present invention.

The inputs to the present control method are the MBT timing criteria obtained using the method described in Section F: Robust Multi-Criteria MBT Timing Estimation Using Ionization. The output from the closed loop control 1300 in the present invention is used as a multiplier of an individual cylinder fuel command to correct the individual cylinder A/F ratios. The following is a description of each of the seven functional blocks or steps or logic blocks of the closed loop 1300 of the present method and apparatus (see FIG. 44).

First, a mean MBT timing coefficient is calculated 1320. The output of the MBT timing estimation method from either the in-cylinder pressure method or an estimate using an ionization signal 100 can be represented as a vector with a size equal to the number of cylinders measured in units of Degree After Top Dead Center (DATDC). Let $L_{MBT}(i)$ represent the MBT timing criterion obtained from the MBT timing estimation in Section F, where index i represents the cylinder number. The mean of the MBT timing criterion for all cylinders can be calculated using the following formula:

$$L_{MBT-MEAN} = 1/n \, \Sigma L_{MBT}(i), \quad \text{(Equation 1) 1320,}$$

where n is the number of cylinders and $L_{MBT}(i)$ is summed from 1 to n.

Next, an error of unbalancing is calculated 1330. The error in the MBT timing coefficient, i.e., the MBT timing coefficient error $L_{MBTERR}(i)$, caused by the unbalancing of the individual cylinders is calculated by subtracting the mean of the MBT timing coefficient $L_{MBTMEAN}$ from the MBT timing criterion $L_{MBT}(i)$ as illustrated in the following equation:

$$L_{MBTERR}(i) = L_{MBT}(i) - L_{MBT-MEAN},$$
$$I = 1, 2, \ldots, n \quad \text{(Equation 2) 1330.}$$

Third, an error integration of the individual cylinder difference 1340 is performed. The integration of the MBT timing error, i.e., the MBT timing coefficient integration error for an individual cylinder, $ERR_{MBT}(k+1)$, can be calculated using the following equation:

$$ERR_{MBT}(k+1) = K_1 * [ERR_{MBT}(k) + L_{MBTERR}(k)], \quad \text{(Equation 3) 1340,}$$

where k is a time step index representing the $k^{th}$ engine cycle, $L_{MBTERR}(k)$ is the error vector obtained from step b at the kth engine cycle, $K_1$ is the integration gain coefficient with a typical value of 0.001 and can be used as a calibration coefficient for the closed loop control method of the present invention.

Fourth, a feedforward fuel trim coefficient for each individual cylinder 1350 is calculated. The feedforward fuel trim coefficient vector $FT_{FDD}$ (each element represents a corresponding individual cylinder) is the output of a look-up table 1352. It is a function of engine speed and load. Due to the intake manifold geometry, the individual cylinder unbalancing changes as the airflow rate changes. The look-up table 1352 is used to compensate for this variation. The combined fuel trim coefficient is called the raw fuel trim coefficient $FT_{RAW}$ and is calculated by adding the integration of the MBT timing error, $ERR_{MBT}$, and the feedforward fuel trim coefficient, $FT_{FDD}$ 1350. See Equation 4 below:

$$FT_{RAW} = ERR_{MBT} + FT_{FDD}, \quad \text{(Equation 4) 1350.}$$

Note that when the engine 161 is operated with abnormal combustion conditions (such as knock, misfire/partial-burn, etc.), the MBT timing criterion will not be used for an A/F ratio balancing calculation due to unreliable MBT timing estimation 1353 and in this case the integrated value will not be updated. Consequently, the raw fuel trim coefficient $FT_{RAW}$ is set to the feedforward fuel trim coefficient $FT_{FDD}$ 1354.

Figure 45:
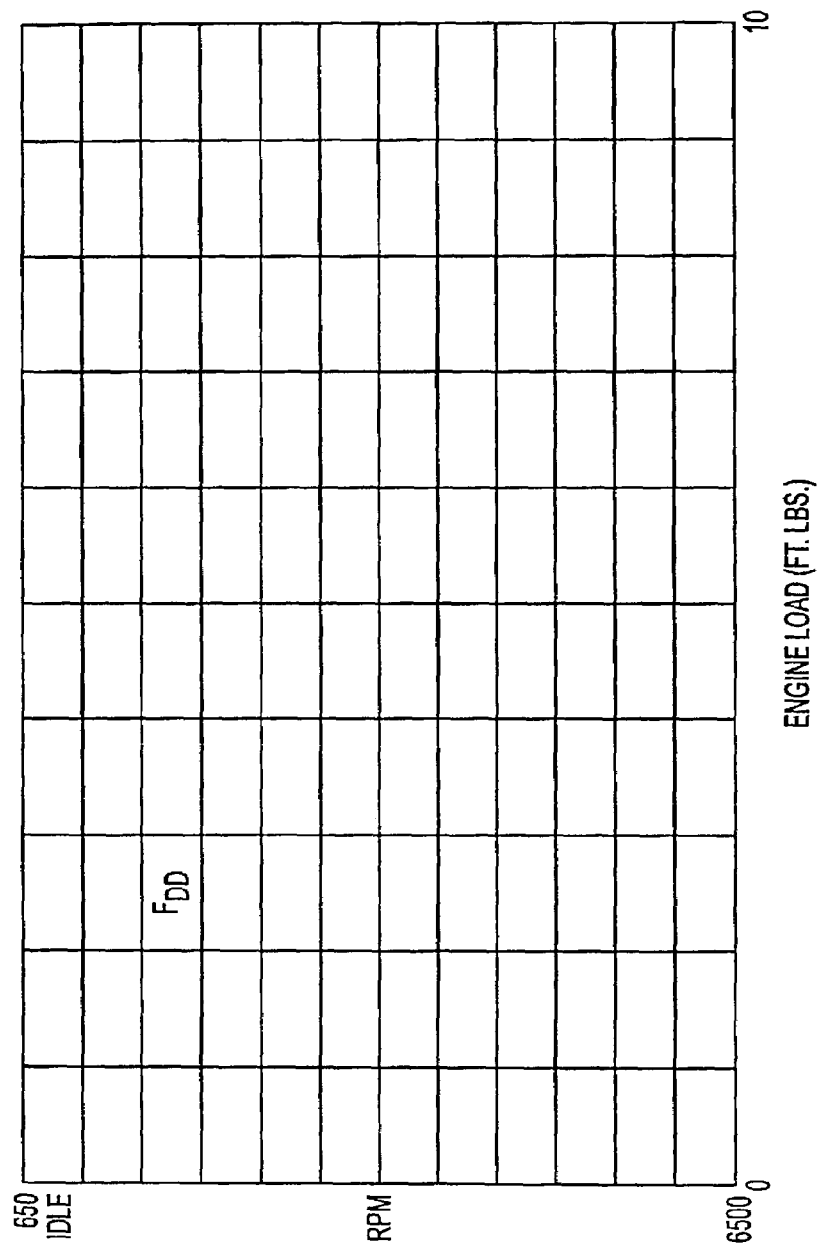
FIG. 45 illustrates the look-up table which comprises feedforward fuel trim coefficient vectors $FT_{FDD}$.

FIG. 45 is an example of the look-up table 1352 which is stored in memory 112. The memory can be RAM, ROM or one of many other forms of memory means. Engine speed is mapped along the vertical axis from 650 rpm (e.g., idle) to 6500 rpm (e.g., rated rpm) in 12 increments. The normalized engine load is mapped along the horizontal axis from 0 to 1, in 10 increments. Thus, the 12×10 data parameter matrix has values stored for the feedforward fuel trim coefficient vector $FT_{FDD}$ for each combination of engine speed and engine load. Normally, this table 1352 is obtained through the engine calibration process.

Fifth, the trim coefficient for each individual cylinder is resealed 1360. The raw fuel trim coefficient $FT_{RAW}$ does not have to meet the constraint that the summation of vector $FT_{RAW}$ equals the number of cylinders such that overall fuel flow rate is unchanged. The following resealing operation 1360 takes care of this in which the raw fuel trim coefficient $FT_{RAW}$ is resealed yielding the rescale trim coefficient $FT_{SCALED}$:

$$FT_{SCALED}(k)=(n*FT_{RAW}(k))/(\Sigma FT_{RAW}(k)), \quad \text{(Equation 5) 1360,}$$

where index k represents the kth cylinder, n is the number of cylinders and $FT_{RAW}(k)$ is summed from 1 to n. That is, the rescaled trim coefficient $FT_{SCALED}$ is calculated by multiplying the raw fuel trim coefficient $FT_{RAW}$ by the number of cylinders in the engine 161, and then dividing this total by the sum of all the raw fuel trim coefficients $FT_{RAW}$ for each cylinder in the engine 1360.

With the help of this step, the fuel flow for a given engine cycle will be the same as the commanded one. However, it is redistributed so as to balance the individual cylinders. To ensure a failsafe operation, saturations (i.e., upper and lower bounds) are applied to the fuel trims for individual cylinders 1362. Let $FT_{UP}$ and $FT_{LOW}$ represent the upper and lower bound vectors for a fuel trim vector. Both $FT_{UP}$ and $FT_{LOW}$ are calibration coefficients. Normally, the upper and lower saturation vectors $FT_{UP}$ and $FT_{LOW}$ are set in such a way that there is enough freedom to balance the A/F ratio for all cylinders with reasonable variation range. Typical values of $FT_{UP}$ and $FT_{LOW}$ are 0.9 and 1.1 which can compensate a 10 percent A/F ratio variation. If any element of $FT_{SCALED}$ is outside of the upper or the lower bound, it will be reset to its boundary value, and the associated unsaturated elements will be rescaled 1364, using the process similar to (Equation 5) so that the mean of the trim vector is equal to the number of cylinders in the engine 161. The saturated fuel trim vector is called the final trim vector $FT_{FINAL}$.

After the final fuel trim vector $FT_{FINAL}$ is calculated by resealing the unsaturated elements of $FT_{SCALED}$ 1364, the individual cylinder error integrator for the (k+1)$^{th}$ engine cycle $ERR_{MBT}(k+1)$ will be reset 1366 to reflect the scaling and saturation operation. It is calculated by subtracting the feedforward fuel trim coefficient $FT_{FDD}$ from the final fuel trim vector $FT_{FINAL}$ and then dividing this total by the integration gain coefficient $K_1$. See equation 6 below:

$$ERR_{MBT}(k+1)=[FT_{FINAL}(k+1)-FT_{FFD}(k+1)]/K_1, \quad \text{(Equation 6) 1366.}$$

This resetting of the individual cylinder error integrator $ERR_{MBT}(k+1)$ 1366 works to prevent overflow and typical integrator winding problems.

In the sixth step, the feedforward fuel trim coefficient is adaptively updated 1370. In a preferred embodiment, the adaptive portion of the closed loop control method modifies or updates the feedforward look-up table 1352 based upon the current engine operating conditions 1372 (engine speed and load). When the engine 161 is operated in a neighborhood of the lookup table mesh point, the adaptive algorithm updates the new mesh point value FTM by $$FTM_{NEW}(k)=FTM_{OLD}(k)+ERR_{MBT}(k),$$

where k is the engine cycle number and both $FTM_{NEW}(k)$ and $FTM_{OLD}(k)$ represents the updated and current mesh point value. The goal is that when the A/F ratio for all the cylinders are balanced, the feedforward output provides the final fuel trim coefficient.

In the seventh step, the individual cylinder final fueling coefficient is calculated 1380. The final fueling ($FUEL_{FINAL}$) command for each individual cylinder is calculated by multiplying the commanded fueling or fueling command ($FUEL_{CMD}$) and the final fuel trim coefficient $FT_{FINAL}$ of a corresponding cylinder as shown in the following equation:

$$FUEL_{FINAL}(i)140=FUEL_{CMD}*FT_{FINAL}(i), i= 1, 2, \ldots, n. \quad \text{(Equation 7) 1380.}$$

Figure 46:
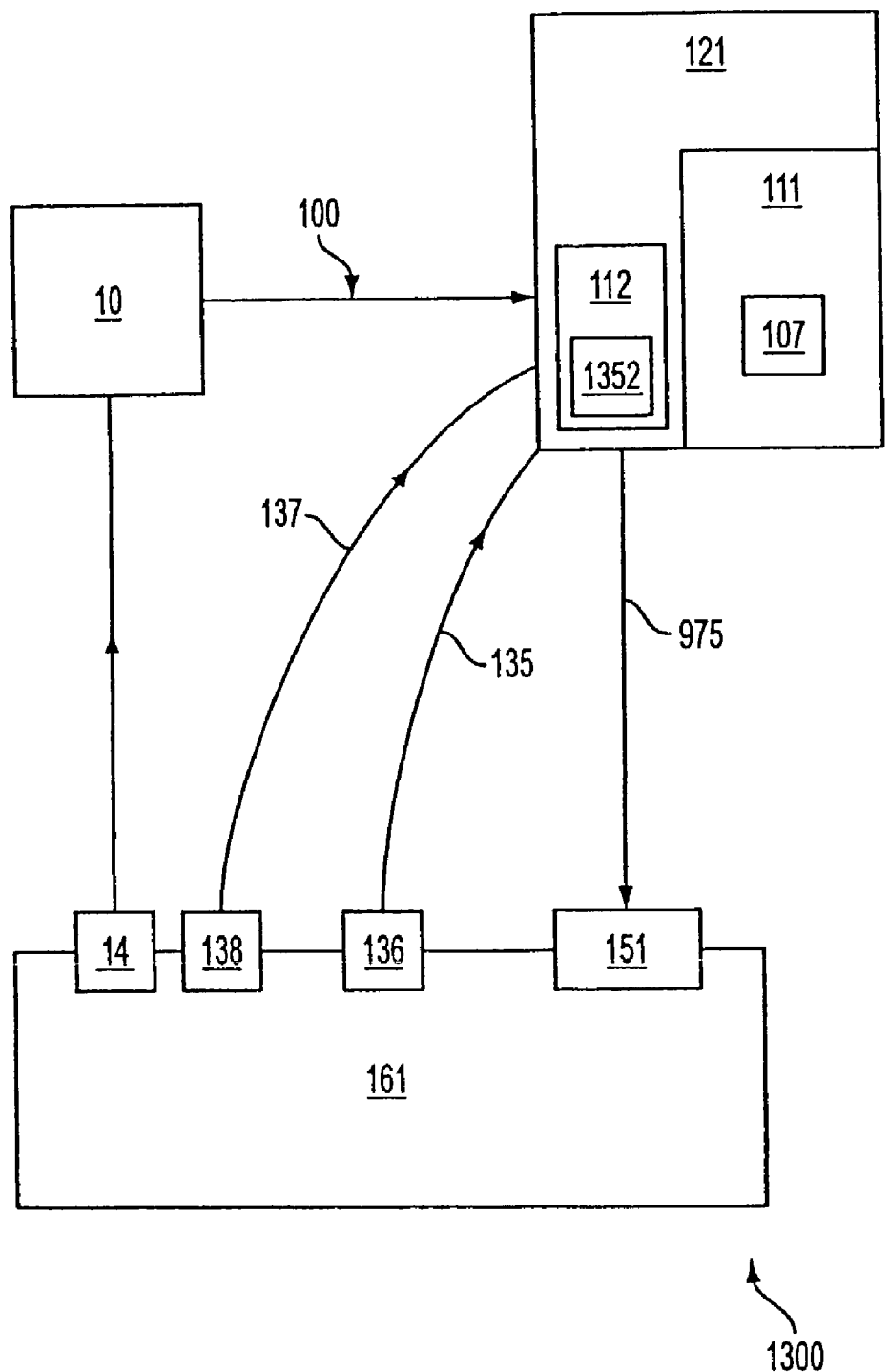
FIG. 46 is a logic block diagram of the air to fuel ratio control system of the present invention.

In a preferred embodiment, the steps (or instructions) in FIG. 43 are stored in software or firmware 107 located in memory 111 (see FIG. 46 which is a logic block diagram of the air to fuel ratio control system of the present invention). The steps are executed by a controller 121. The memory 111 can be located on the controller 121 or separate from the controller 121. The memory 111 can be RAM, ROM or one of many other forms of memory means. The controller 121 can be a processor, a microprocessor or one of many other forms of digital or analog processing means. In a preferred embodiment, the controller is engine control unit ECU 121.

The ECU 121 receives an ionization signal 100 from an ionization detection circuit 10. The ECU 121 executes the instructions 107 stored in memory 111 to determine a desired air to fuel ratio AFR for each cylinder. It then outputs the desired fuel command 975 to some form of fuel control mechanism such as a fuel injector 151 located on the engine 161.

Section I: Exhaust Gas Control Using a Spark Plug Ionization Signal

Exhaust gas re-circulation (EGR) is an effective way to reduce NOx emissions in an internal combustion engine 161. The external exhaust gas recirculation EGR widely used in the prior art is calibrated using engine mapping points. That is, the desired exhaust gas re-circulation EGR rates used in controlling an engine are mapped to various engine operating conditions such as load and speed. Note that the amount of EGR affects the engine emission and also its combustion stability. To maximize the NOx emission reduction without fuel economy penalty, it is desired to have high EGR rate, but on the other hand, too much EGR may destabilize the engine combustion process. Therefore, in some cases it is desired to have as much EGR as possible with stable combustion. Due to engine to engine variation, engine aging, and engine operational environmental variation, open-loop calibration of a desired EGR rate is very conservative. In the present invention, a closed loop controller is used to regulate the external exhaust gas re-circulation EGR to maximize fuel economy and minimize emissions. In another preferred embodiment, the internal exhaust gas re-circulation EGR is controlled by the closed loop 1600.

Exhaust gas re-circulation EGR is used to reduce flame temperature and slow down the combustion process. Because of this, it is not used when the engine is operated with a light load or at idle conditions. Exhaust gas recirculation EGR finds its greatest benefit when used in partial load conditions, where the pumping loss is reduced by a relatively wider throttle opening. The combustion process also benefits from a wider throttle opening.

At a wide open throttle, where the pumping loss is at its minimum and the torque output is the priority, the exhaust gas re-circulation EGR is not used anymore. As stated earlier, open loop control of exhaust gas re-circulation EGR uses extensive engine calibration efforts to set a desired exhaust gas re-circulation EGR rate at various partial load conditions. Due to the exhaust gas re-circulation EGR and the spark timing open loop control, the desired exhaust gas re-circulation EGR is usually too conservative to fully take advantage of the exhaust gas re-circulation EGR fuel economy benefit. In addition, the exhaust gas re-circulation EGR rate 1610 is typically controlled by the exhaust gas re-circulation EGR valve position 1620. As the engine 161 ages, the exhaust gas re-circulation EGR valve and its plumbing are clogged by the exhaust deposits and the true exhaust gas re-circulation EGR delivered to the cylinders could be changed dramatically.

This feature of the present invention uses the ionization signal 100 and closed loop control 1600 of the exhaust gas re-circulation EGR to provide the engine 161 with either the minimum spark timing for best torque (MBT) timing or knock limited timing to yield the maximum fuel economy benefits associated with exhaust gas re-circulation EGR.

The purpose of exhaust gas re-circulation EGR is to 1) reduce NOx emission and to 2) improve internal combustion engine 161 fuel economy with a given NOx emission level. The formation of NOx depends on two factors: First, there must be enough oxygen to oxidize the $N_2$, and the other is there must be a high enough temperature for the $NO_x$ formation reaction to accelerate. When exhaust gas re-circulation EGR is induced into the combustion chamber, the exhaust gas will act like an inert gas and absorb the heat from the combustion reaction. As a result, the globe gas temperature, the temperature at which combustion takes place, is reduced through the EGR dilution effect. The reduced temperature slows down the $NO_x$ formation. The suppressive effect of EGR on the formation of $NO_x$ is enhanced as the volume of the re-circulated exhaust gas relative to the volume of fresh air admitted into the engine is increased, i.e., the EGR rate is increased.

When exhaust gas re-circulation EGR is used in the engine 161, less fresh air enters the combustion chamber due to hot exhaust gas taking up more volume in the chamber. Thus, the air/fuel mixture becomes diluted because there is less room for oxygen in the cylinder (i.e., the dilution effect). In order to meet the same load requirement, the throttle opening has to be increased to compensate the increase of intake manifold pressure due to the exhaust gas re-circulation, and therefore to maintain the same air flow (or oxygen). The increased throttle opening not only reduces the pumping loss, but also accelerates the combustion process due to stronger turbulence resulting from the increment of the intake manifold pressure.

Although the addition of exhaust gas re-circulation EGR reduces the combustion speed because of the dilution effect in the cylinder, the higher turbulence balances it out to an extent. The result of the two effects is that the exhaust gas re-circulation EGR dilution slows down the combustion gradually as the EGR rate 1610 increases. At the point when too much exhaust gas re-circulation EGR is added to the combustion chamber, the combustion becomes unstable. Thus, the employment of high EGR rates tends to cause instability of the engine operation. Consequently, the EGR rate should be controlled to maintain a balance between suppression of $NO_x$ emission and engine combustion stability.

One of the measures of combustion stability is the COVariance (COV) of Indicated Mean Effective Pressure (IMEP) since it increases as the combustion goes unstable. In order to have the best fuel economy possible, the control strategy is to add as much exhaust gas re-circulation EGR to the combustion chamber as possible without deteriorating the combustion quality. In the prior art, the calculation of the IMEP COV uses an in-cylinder pressure signal. However, it is difficult for production engines to measure combustion stability due to lack of in-cylinder pressure sensors which are production ready, have a low price, and are reliable. This invention proposes to use the ionization signal 100 to generate a combustion stability criterion and use this criterion to maximize the exhaust gas re-circulation EGR rate 1610 and thereby maximize fuel economy at a given emission allowance.

As the exhaust gas re-circulation EGR rate 1610 increases, the combustion uses earlier spark timing to accommodate the longer combustion duration for the best fuel economy, or in other words, to run the engine at its Minimum timing for the Best Torque (MBT). When the spark timing is not knock-limited, the minimum time for the best torque MBT spark timing increases as the exhaust gas re-circulation EGR rate 1610 goes up. Meanwhile, the combustion instability gradually increases due to the requirement for a longer burn duration. Typically, when 0–90% of the burn duration takes more than 70 crank angle degrees, the combustion tends to become unstable and is usually no longer acceptable. At this point, fuel consumption starts to increase due to the deteriorated combustion process. Also, the hydrocarbon (HC) emission goes up rapidly due to unburned fuel if more exhaust gas re-circulation EGR is used. This instability limit is reached when the minimum time for best torque MBT timing is advanced beyond a certain crank degrees Before Top Dead Center (BTDC) with a typical value of 40 degrees. To prevent this from happening, the engine exhaust gas re-circulation EGR rate 1610 is calibrated so that the minimum time for best torque MBT timing is less than a calibratable value such as 40 degrees BTDC. A disadvantage of this approach is that the calibration is very conservative due to the fact that the actual exhaust gas re-circulation EGR rate 1610 varies due to engine aging, etc.

Figure 47:
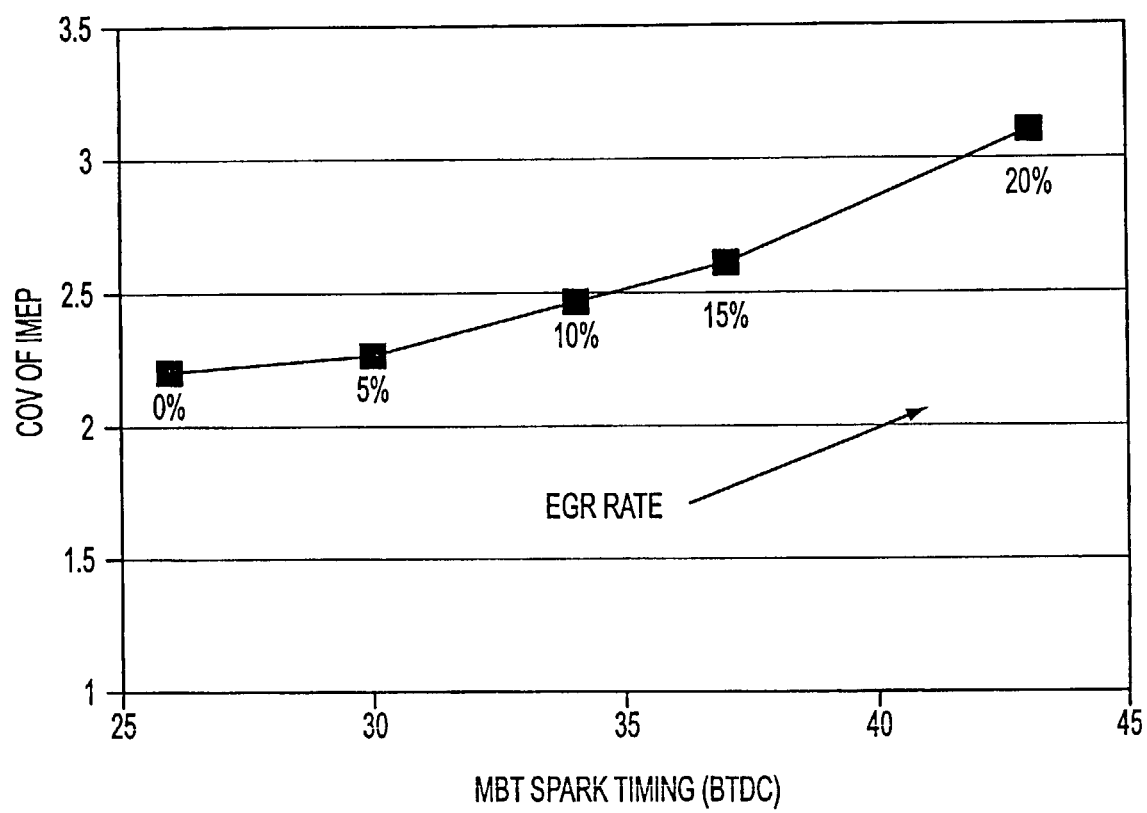
FIG. 47 is a plot of IMEP COP vs. MBT timing as a function of EGR rate.

The proposed closed loop maximum exhaust gas re-circulation EGR rate controller 1600 utilizes the relationship between the engine minimum time for best torque MBT timing and COV of IMEP (see FIG. 47). Generally, when the COV of IMEP is used as a combustion instability indicator, less than 3% is considered as a good combustion. As shown in FIG. 47, when more exhaust gas re-circulation EGR is added to the cylinders, the COV of IMEP increases as the minimum time for best torque MBT timing increases. When the COV of IMEP is greater than 3%, the MBT timing is about 43 degrees BTDC and the exhaust gas re-circulation EGR rate 1610 is about 20%.

In the present invention, the minimum best time for best torque MBT spark timing is used, instead of COV of IMEP, as a measure for the maximum dilution rate (exhaust gas re-circulation EGR rate 1610) control. FIG. 47 illustrates the correlation between COV of IMEP and the minimum time for best torque MBT spark timing for a 2.0 L, 4 cylinder engine running at 1500 RPM with 2.62 Bar BMEP.

When exhaust gas re-circulation EGR is added to the cylinder, the initial temperature of the unburned mixture increases because of the hot exhaust gas. The unburned mixture is more prone to auto-ignite when the initial temperature is higher and causes the engine to knock. The engine minimum best time for best torque MBT spark timing might not be knock limited without the addition of exhaust gas re-circulation EGR. However, as the exhaust gas re-circulation EGR rate increases, the engine spark timing may become knock limited. Furthermore, if more exhaust gas re-circulation EGR is added, the mixed gas becomes hotter and the knock becomes more severe. As a result, the spark timing is backed off from the MBT timing to avoid the knocking. This leads to bad fuel economy.

Figure 48:
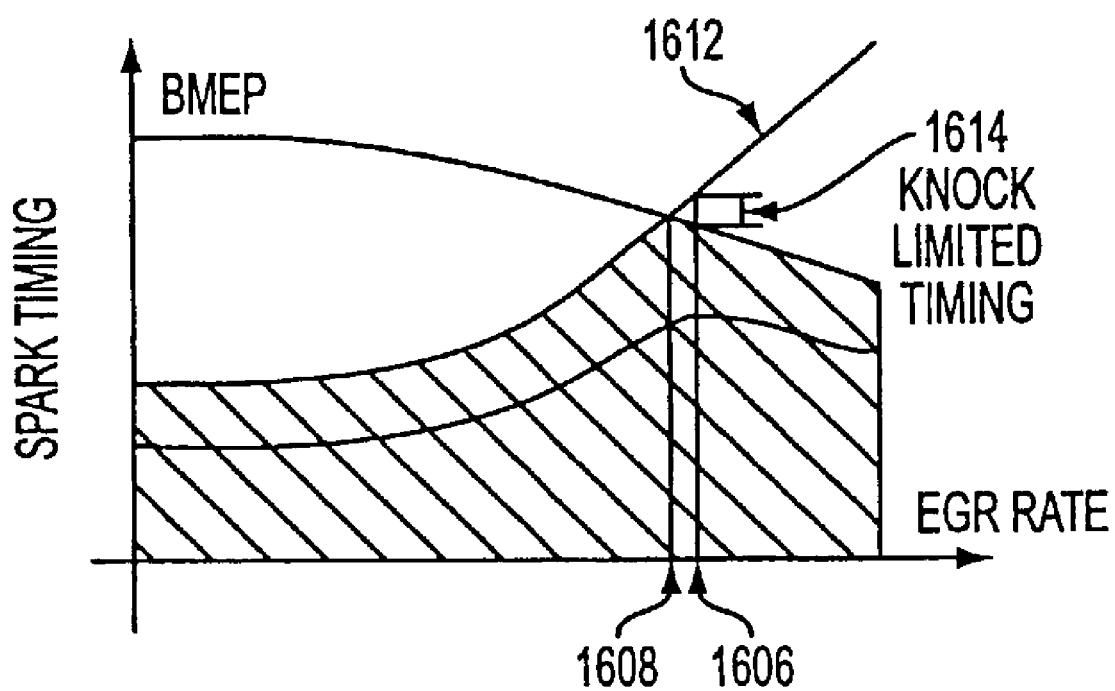
FIG. 48 is a plot of the knock limited EGR rate of the present invention.

On the other side, an increased exhaust gas re-circulation EGR rate reduces the engine pumping loss. Therefore, the preferred or optimal exhaust gas re-circulation rate EGR 1606 for best fuel economy is an exhaust gas re-circulation EGR rate which is a little higher than the knock limited exhaust gas re-circulation rate EGR 1608. See FIG. 48. Since a direct EGR rate measurement is not preferable due to its high cost, the present invention calculates a preferred knock limited spark timing by using MBT timing criteria generated from an ionization signal 100. When the engine is knock limited by exhaust gas re-circulation EGR, the engine is not run at its minimum best time for best torque MBT spark timing 1612. Instead, the engine is run at a retarded (or delayed) spark timing which is retard from the MBT spark timing. The amount of delay is referred to as the "MBT offset" 1614, and is quantified by the MBT timing criterion (see FIG. 48). The exhaust gas re-circulation rate EGR is reduced to the knock limited spark timing.

Figure 50:
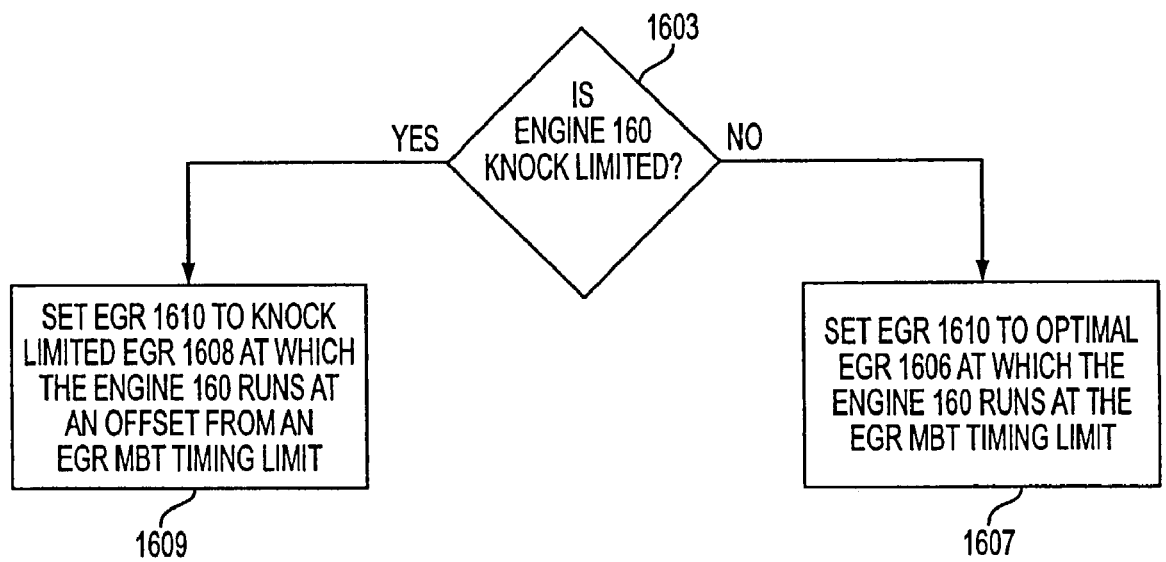
FIG. 50 is a flowchart of steps taken by the closed loop EGR rate controller of the present invention.

In summary, a determination is made as to whether the engine 161 is knock limited (1603) (See FIG. 50). When the exhaust gas re-circulation EGR rate is not knock limited, the engine 161 sets its exhaust gas re-circulation rate EGR 1610 to an optimal exhaust gas recirculation rate EGR 1606 such that the engine 161 runs at the exhaust gas re-circulation minimum best time for best torque spark timing limit (or EGR MBT timing limit) (1607). When the exhaust gas re-circulation EGR rate is knock limited, the engine 161 sets its exhaust gas re-circulation EGR rate to a knock limited EGR rate 1608 at which the engine 161 runs at a retarded MBT spark timing limit (1609). The engine 161 uses a calibratable MBT timing criterion to determine the retarded MBT spark timing limit. The difference between the retarded MBT spark timing limit and the EGR MBT timing limit is called the MBT offset 1614.

Figure 49:
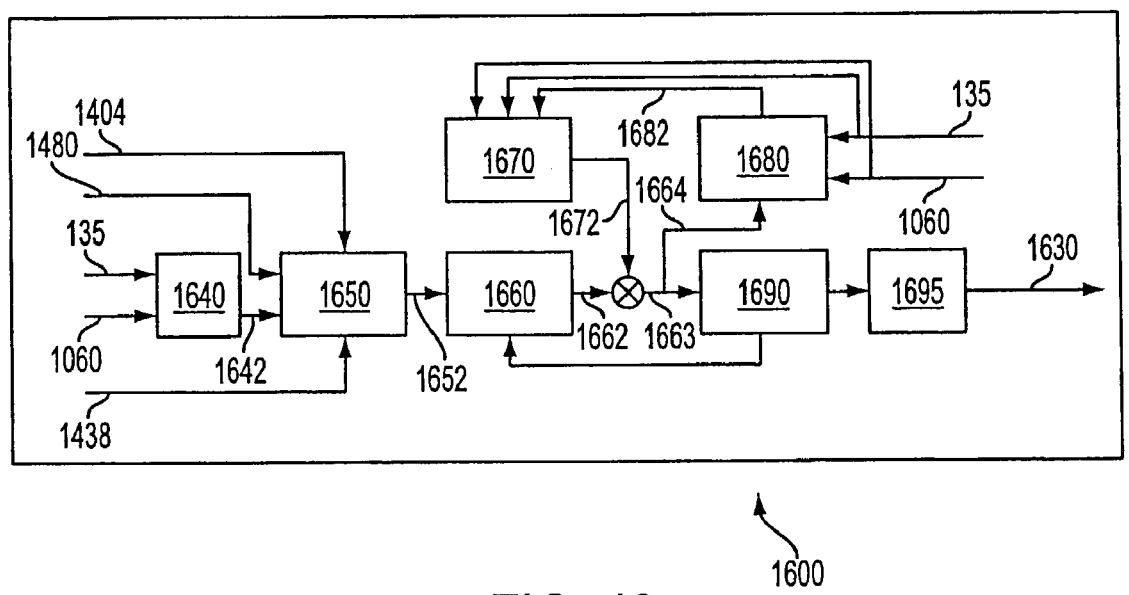
FIG. 49 is a logic block diagram of the closed loop EGR rate control of the present invention.

As part of the ionization feedback control system (see Section C), FIG. 49 shows a logic block diagram of the closed loop EGR rate control 1600 that maximizes the dilution rate. The EGR closed loop controller 1600 works with the closed loop MBT timing controller 1430, 1490, 1495 (see Section I). The controller 1600 has five inputs and seven logic blocks, or logic devices. The controller 1600 output is the EGR valve command 1630. A functional description of each of the five input signals, engine speed (RPM) 135, engine load 1060, knock limit flag 1404, MBT timing signal 1480, and MBT criterion error 1438 is listed below:

The current engine speed 135 measured in RPM (Revolutions Per Minute) is the filtered engine speed representing the steady state engine speed. The engine load information 1060 is calculated as a percentage of maximum load, fueling or the Indicated Mean Effective Pressure (IMEP). The knock limit flag 1404 is obtained from the closed loop MBT timing controller 1430, 1490, 1495 (See Section G, Closed Loop MBT Timing Control Using Ionization Feedback). The knock limit manager 1450 senses when the engine 161 is operated in knock limit mode when either the knock flag 1404 and the knock intensity 1402 are in the knock or the non-audible knock state. The MBT timing input signal 1480 is also obtained from the closed loop MBT timing controller 1430, 1490, 1495 (see Section G). When the absolute value of the MBT criterion 1435 error 1438 is less than calibrated and adjustable value, the current ignition timing is considered at the MBT timing. The MBT timing used in this controller 1600 is a filtered one. The MBT criterion error 1438 is the controller error of the closed loop MBT timing controller 1430, 1490, 1495. Individual cylinder MBT timing criterion 1435 is calculated from an ionization signal 100 or in-cylinder pressure signal generated using a parameter estimation method (see Sections F, J). This parameter discloses whether the current engine spark is before or behind the MBT spark timing 1612 for that individual cylinder. The criterion error 1438 is filtered to remove the combustion-to-combustion variation factor.

Figure 51A:
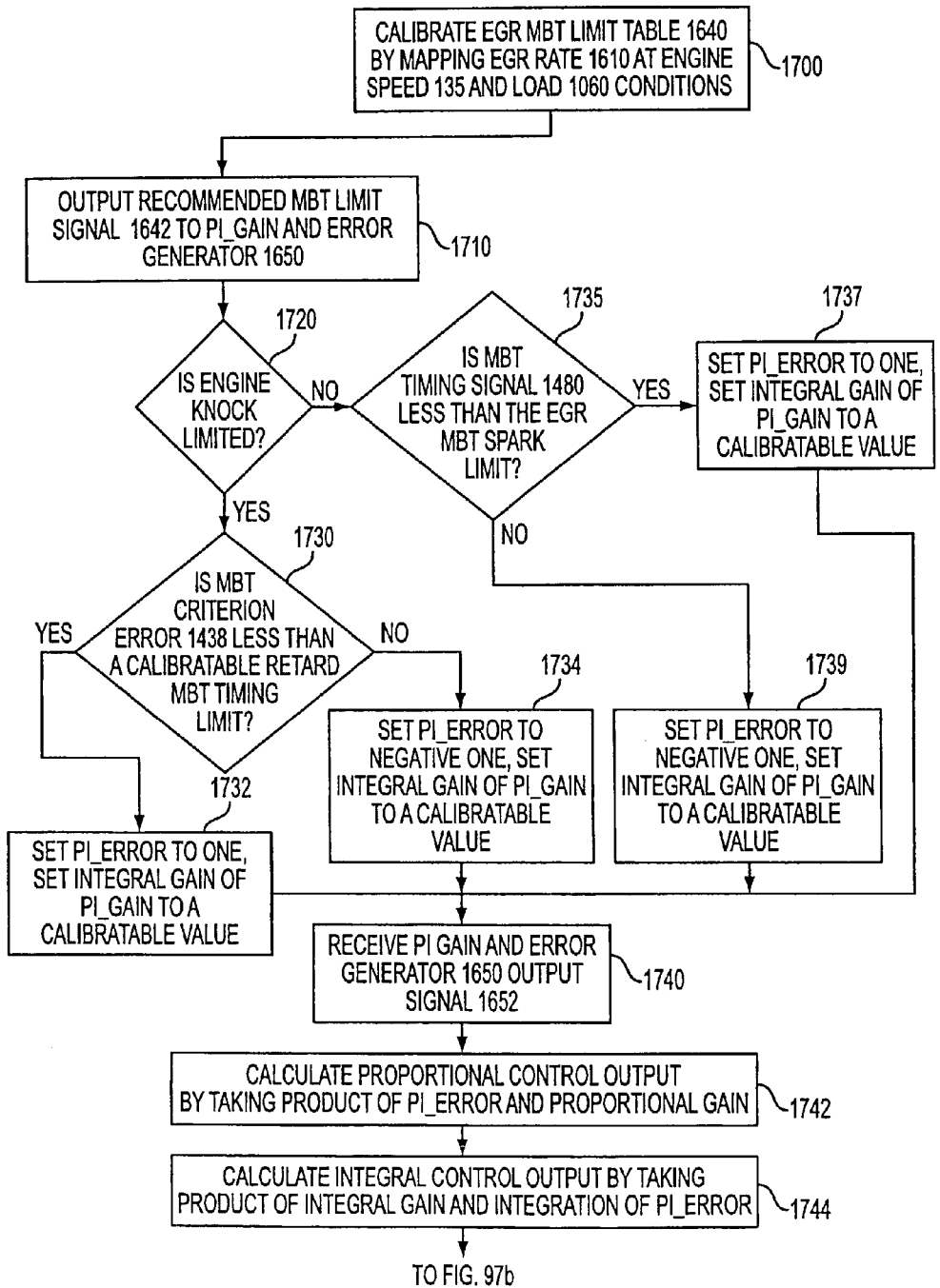
FIG. 51a is a flowchart of steps taken by the logic blocks of FIG. 49.

The functionality of each of the logic blocks (or logic devices), the EGR MBT limit table 1640, the proportional and integral (PI) gain and error generator 1650, the proportional and integral (PI) controller 1660, the feedforward EGR rate table 1670, the adaptive learning EGR rate adapter 1680, the saturation manager 1690, and the EGR valve metering controller 1695 is discussed below:

The EGR MBT limit table 1640 is a logic block that functions as a look-up table which uses engine speed 135 and engine load 1060 as its inputs. It can be stored in RAM memory, ROM memory, tape, a CD, or any of a number of digital or analog memory storage devices. Each individual point on the look-up table can be calibrated by mapping the EGR rate 1610 to a specific engine speed 135 and load 1060 condition (see step 1700 in FIG. 51*a*). It provides (or outputs) to the PI gain and error generator 1650 a recommended EGR MBT timing limit signal 1642 which is correlated to a combustion stability criterion such as COV of IMEP (1710). With a desired combustion stability criterion (such as COV of IMEP is less than 2.5%), a MBT timing limit can be determined.

In a preferred embodiment, the PI gain and error generator 1650 can be a processor, microprocessor or any form of processing means. This logic device can operate in two different engine states, knock limited or not knock limited. The knock limit flag input 1404 is used to determine which of the two states that the PI gain and error generator operates at (1720), a) the knock limited state, or b) the not knock limited state. The PI gain and error generator 1650 output signal 1652 comprises both of the PI controller 1660 gains (proportional and integral) PI_gain and the PI controller 1660 input error PI_error. The proportional gain is set to zero at all times.

In the knock limited state, the PI gain (PI_gain) and error (PI_error) are generated using the MBT criterion error 1438 input signal. The first step is to determine if the MBT criterion error 1438 is less than a calibratable retard MBT timing limit (1730) such as 3 crank degrees. If the criterion error 1438 is less than a calibratable retard MBT timing limit, then the spark timing is below the offset from MBT timing. Consequently, the exhaust re-circulation rate EGR can be increased until it reaches the knock limited EGR 1608 (see FIG. 48).

Thus, if the MBT criterion error 1438 is less than a calibratable retard MBT timing limit (that is, a higher EGR is needed), the PI error (PI_error) is set to one and the integral gain of PI_gain is set to a calibratable value (1732) such as 0.1 The result is that the PI control output 1662 increases to increase the EGR.

If the MBT criterion error 1438 is greater than or equal to a calibrated and adjustable retard MBT timing limit, then the spark timing is above the offset from MBT timing. The exhaust re-circulation rate EGR should be reduced until the spark timing is at the offset MBT timing, or EGR MBT timing. Consequently, the exhaust re-circulation rate EGR can be reduced until it reaches the knock limited EGR 1608 (see FIG. 48).

Thus, if the MBT criterion error 1438 is greater than a calibratable retard MBT timing limit (that is, a lower EGR is needed), the PI_error is set to negative one and the integral gain of PI_gain is set to a calibrated and adjustable value (1734). The result is that the PI control output 1662 decreases to reduce the EGR rate 1610.

In the not knock limited state, the PI gain and error output signal 1652 is generated using the MBT ignition timing signal 1480 from the MBT timing controller 1440, 1490, 1495. The first step is to determine if the MBT ignition timing signal 480 is less than the EGR MBT spark limit (1735). If the MBT timing is less than the EGR MBT spark limit, PI_error is set to one and the integral gain of PI_gain is set to a calibrated and adjustable value. As a result, the PI control output 1662 increases to increase the EGR rate 1610 until it reaches an optimal exhaust gas recirculation EGR rate 1606. If the MBT ignition timing signal 1480 is greater than or equal to the EGR MBT limit, PI_error is set to negative one and the integral gain of PI_gain is set to a calibrated and adjustable value (1739). As a result, the PI control output 1662 decreases the EGR rate 1610 until it reaches the optimal exhaust gas re-circulation EGR rate 1606.

In a preferred embodiment, the proportional and integral (PI) controller 1660 can be a controller, a processor, microprocessor or any form of controller or processing means. As stated above, the PI controller 1660 receives as an input the PI gain and error generator 1650 output signal 1652 which comprises both of the PI controller 1660 gains (proportional and integral) PI gain and the PI controller 1660 input error PI_error (1740). The PI controller 1660 output 1662 is the sum of the proportional and the integral control outputs. The proportional control output is calculated by taking the product of the PI_error and the proportional gain (1742). The integral control output is calculated by taking the product of the integral gain and the integration of the PI error (1744).

A novel feature of this controller is that the integrated value will be reset if the combined output (feedforward and PI outputs) is saturated. When this condition occurs, the PI integrated value is set to a value such that the combined output equals the saturated value (see below) to avoid overflow and rewinding.

Figure 51B:
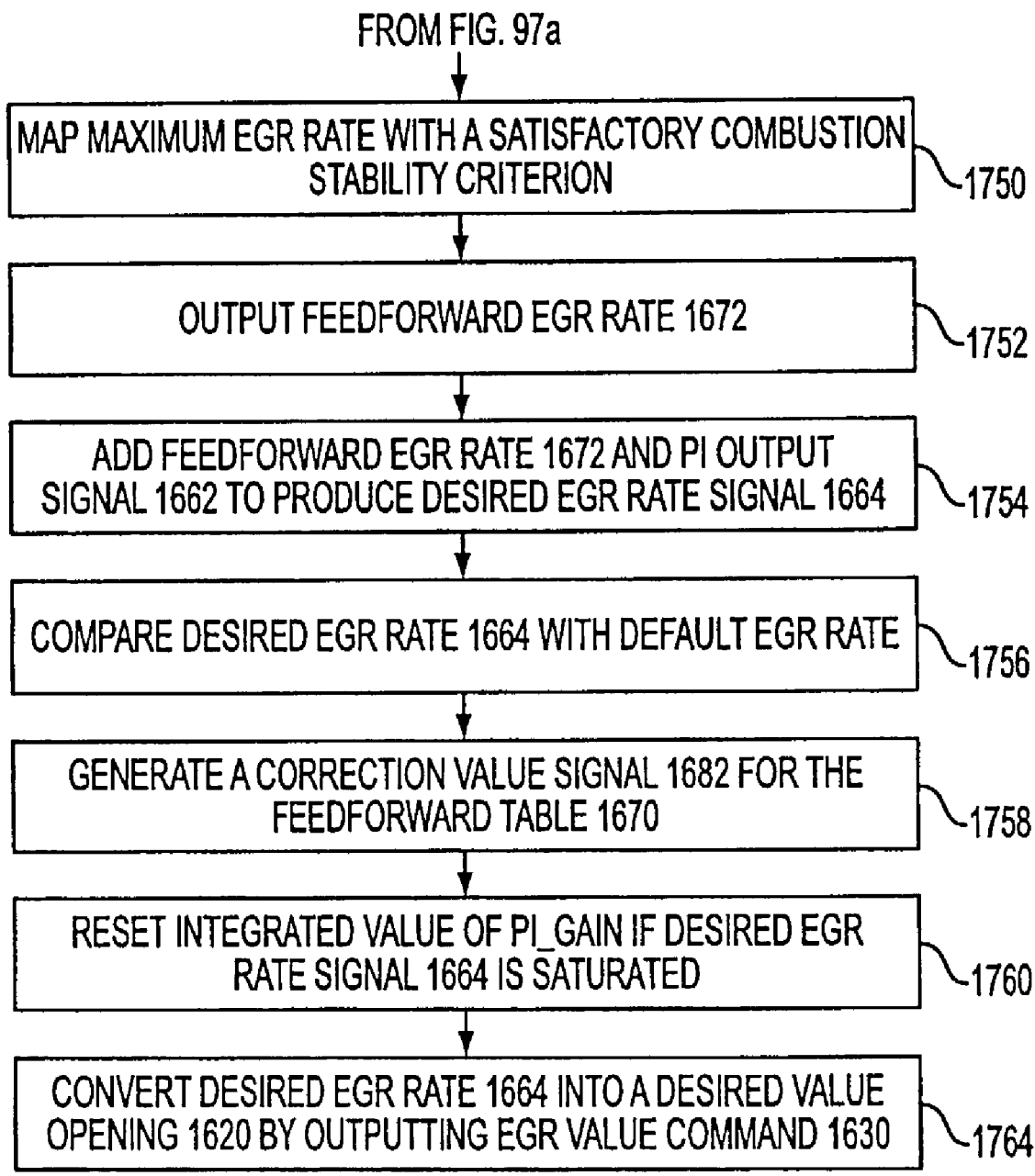
FIG. 51b is a flowchart of steps taken by the logic blocks of FIG. 49.

The feedforward EGR rate table 1670 is a function of engine speed 135 and load 1060. This table 1670 can be initially obtained by mapping the engine maximum EGR rate 1610 with a satisfactory combustion stability criterion (such as COV of IMEP) 1750 (see FIG. 51*b*). The accuracy of this mapping process can be corrected by the adaptive learning process controller 1680 (see below). It can be stored in RAM memory, ROM memory, tape, a CD, or any of a number of digital or analog memory storage devices. The table 1670 outputs a feedforward EGR rate 1672 (1752) which is added to the output 1662 of the PI controller 1660 by summer 1663 to produce a desired EGR rate signal 1664 (1754).

As mentioned above, the adaptive learning EGR rate adapter 1680 compares the final desired EGR rate 1664 with a default EGR rate generated from the current engine 161 operating conditions (i.e., given engine speed 135 and load 1060) which serve as inputs to the adaptive learning device 1680 (1756). (Thus, in one preferred embodiment, the adaptive learning apparatus 1680 comprises a processor and a comparator). It will generate a correction value signal 1682 for the feedforward table 1670 (1758). If the engine 161 runs at the current operational condition for a calibrated and adjustable period, the updated value 1682 at that operating condition is sent to the feedforward table 1670 to adaptively correct values in the table 1670. The adaptive learning apparatus 1680 together with the Feedforward EGR rate table 1670 constitute the feedback portion of the loop 1600.

The saturation manager 1690 is a logic device which imposes an upper and a lower bound for the maximum desired EGR rate 1610 that is allowed. The integral output of PI controller output 1662 will be reset if the combined output signal 1664 (feedforward 1672 and PI outputs 1662) is saturated (1760), i.e., the desired exhaust gas recirculation EGR rate exceeds either the upper or lower bounds. When this condition occurs, the PI integrated value is set to a value such that the combined output equals the saturated value 1692. The lower limit is normally zero, and the upper limit is dependant upon a number of factors such as EGR valve maximum opening, exhaust and intake manifold pressure difference, etc. The upper limit can also be a function of the engine's 161 operating conditions.

The EGR valve metering controller 1695 converts the desired EGR rate 1664 into a desired valve opening 1620 by outputting EGR valve command 1630 (1764). Due to the closed loop control, the accuracy required for this conversion is much less than with conventional open loop EGR rate control.

Section J: The Determination of MBT Timing Through the Net Pressure Acceleration of the Combustion Process The determination of MBT timing (the minimum spark timing for the best torque) at various engine-operating conditions requires extensive mapping efforts. The existing cylinder pressure sensor based control schemes developed for MBT timing control, such as peal pressure location, 50% mass fractions burned location, and pressure ratio management, are still based on pressure signal observation and still need certain calibration efforts.

This invention intends to use the maximum acceleration rate of the net pressure increase resulted from the combustion in the cylinder to control the spark timing. When the maximum acceleration point of the net pressure lines up with the top dead center (TDC), the MBT timing is achieved. The invention will not only simplify the spark timing control scheme, but also make the MBT timing search much reliable.

The MBT timing is also called the minimum spark timing for the best torque or the spark timing for the maximum braking torque. Unless the spark timing at a certain engine operating condition is limited by knock or is delayed intentionally for a specific condition, there always exists the best spark timing where the same amount of air/fuel mixture can yield the maximum work. For an ideal combustion cycle, a combustion process happens instaneously, when the ignition, flame kernel development, flame propagation all occur at the same time. The TDC is the location that the ideal combustion occurs. In reality, combustion cannot finish instantaneously. The MBT timing is the result of constant changing of combustion chamber volume due to piston moving and the non-idealistic combustion process.

Traditionally, the search of MBT timing is done through spark sweep. Unless requested by operating condition for delayed spark timing, almost every calibration point needs a spark sweep to see if the engine can be operated at the MBT timing condition. If not, certain degree of safety margin is needed for the condition to avoid pre-ignition or knock. The open loop spark mapping usually requires tremendous effort to achieve a satisfactory calibration.

In recent years, various close loop spark timing control schemes have been proposed based on cylinder pressure measurements or spark ionization sensing. Based on massive testing data observation, it was found that the peak pressure usually occurs around 15 degree ATDC at MBT timing; the 50% mass fraction burned mostly happens between 7 to 9 degree ATDC at MBT timing. The algorithm published in prior art SAE 2000-01-0932 controls PRM (pressure ratio management) around 0.55 to obtain the MBT timing. Since the criteria are based on observations and may change at different operating conditions, each algorithm still needs a certain extent of calibration effort. It is clear that the combustion process has to be matched with the engine cylinder volume change to attain the best torque. However, there is no sound theory to support why peak pressure has to occur around 15 degree ATDC, or why 50% burned has to happen around 8 degree ATDC, or why PRM should be around 0.55 for the MBT timing conditions.

Figure 52:
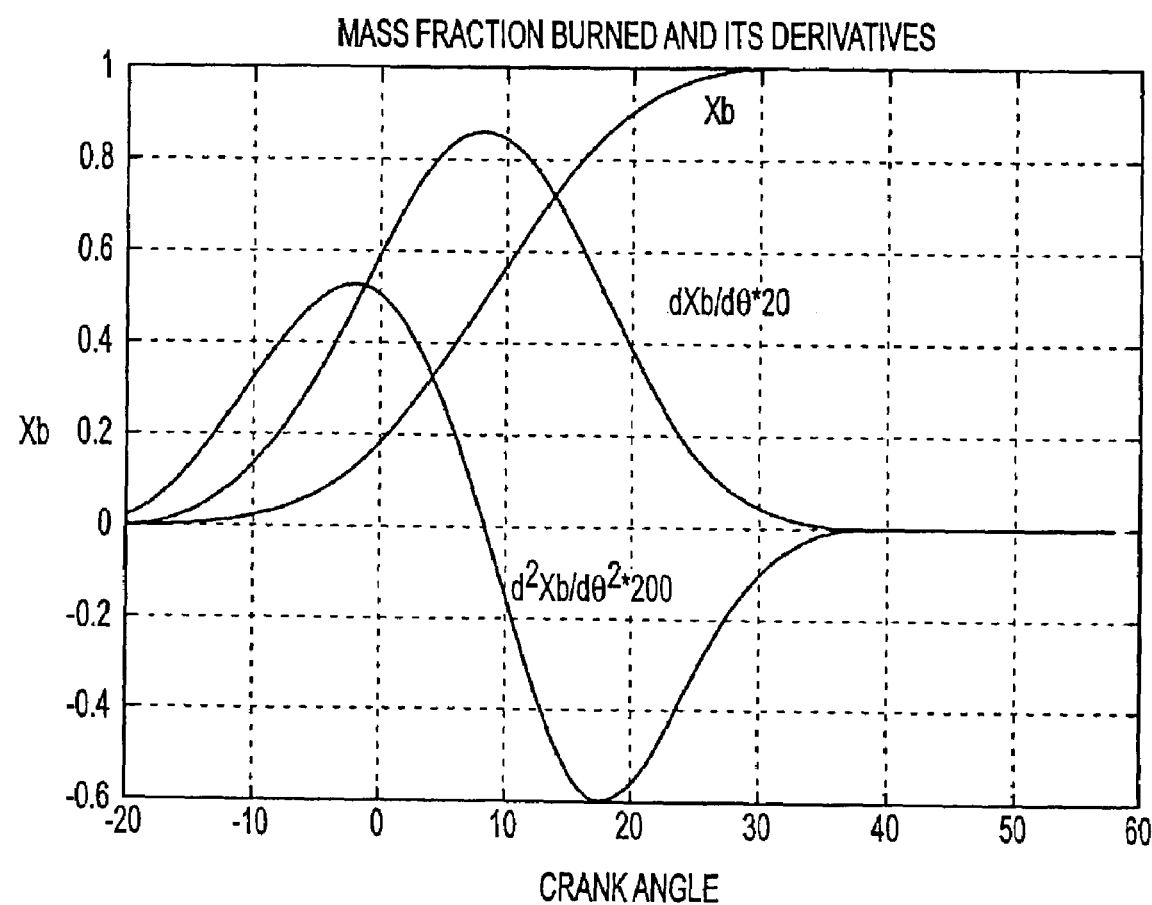
FIG. 52 is a graph of mass fraction burned and its first and second derivatives.

A combustion process is not strictly a chemical process. In fact, it is a chemical process as well as a physical process and is usually described by mass fraction burned versus crank angle. The mass fraction burned not only signifies how much chemical energy is released at each crank angle during the combustion, but also how fast the chemical energy is released. It has a characteristic S-shape and changes from zero to one from the beginning to the end of combustion. FIG. 52 shows the mass fraction burned and its first and second derivatives. The first derivation of MFB can be treated as the rate of heat release or the velocity of the combustion process; while the second derivative can be treated as the acceleration of the combustion process. After the spark discharge, the flame kernel starts to form. Once the flame kernel becomes stable, it develops very fast and the combustion process reaches its maximum acceleration point. Then the rapid burning period starts and reaches its maximum heat release velocity, and then the combustion process is slowed down and then attains its maximum deceleration point. Since the combustion cannot complete instantaneously and the chamber volume is constantly changing, where to align these critical points versus crank angle may have significant impact on how much useful work can be accomplished during the combustion process. If we ignite the mixture too soon, the pressure increase due to the heat release before the TDC would generate a negative work. If we don't ignite the mixture on time, the heat release process would not be efficient enough to utilize the small volume advantages right at or slightly after the TDC. Therefore, where to ignite the combustion mixture becomes critical such that best torque can be reached at certain spark timing.

The mass fraction burned is mostly determined by the well-known Rassweiler-Withrow method established in 1938 through pressure measurement. It uses the chamber volume at the ignition as a reference and calculates the net pressure increase at every crank angle for the whole combustion process, then normalizes the pressure by the maximum pressure increase toward the end of combustion. The procedure ignores the heat loss and mixture leakage during the combustion. Each percentage of pressure increase signifies the percentage of mass fraction of fuel burned at the corresponding crank angle.

Instead of using the mass fraction burned, we will use the net pressure change and its first and second derivatives to represent the distance, velocity and acceleration of the combustion process. The net pressure is derived as follows:

At every crank angle after the ignition, for the pressure $P(i+1)$ compared to previous crank angle $P(i)$, the difference is composed of two parts. One part of the pressure change due to volume change can be found through the difference between the $P(i)*(V(i)/V(I+1))^{1.3}-P(i)$, assuming the pressure undergoes isentropic compression or expansion. Then the pressure difference resulted from combustion between these two crank angle is $P(i+1)-P(i)*(V(i)/V(i+1))^{1.3}$. This difference is still evaluated at volume $V(i)$. If we want to know the net pressure without any volume change since the ignition, the difference will again be compare with the volume at the ignition point as if the combustion undergoes constant volume combustion. Then the net pressure change between two crank angles is:

$$dP(i)=(P(i+1)-P(i)*(V(i)/V(i+1))^{1.3})*V(i)/V_{ig}.$$

Figure 53:
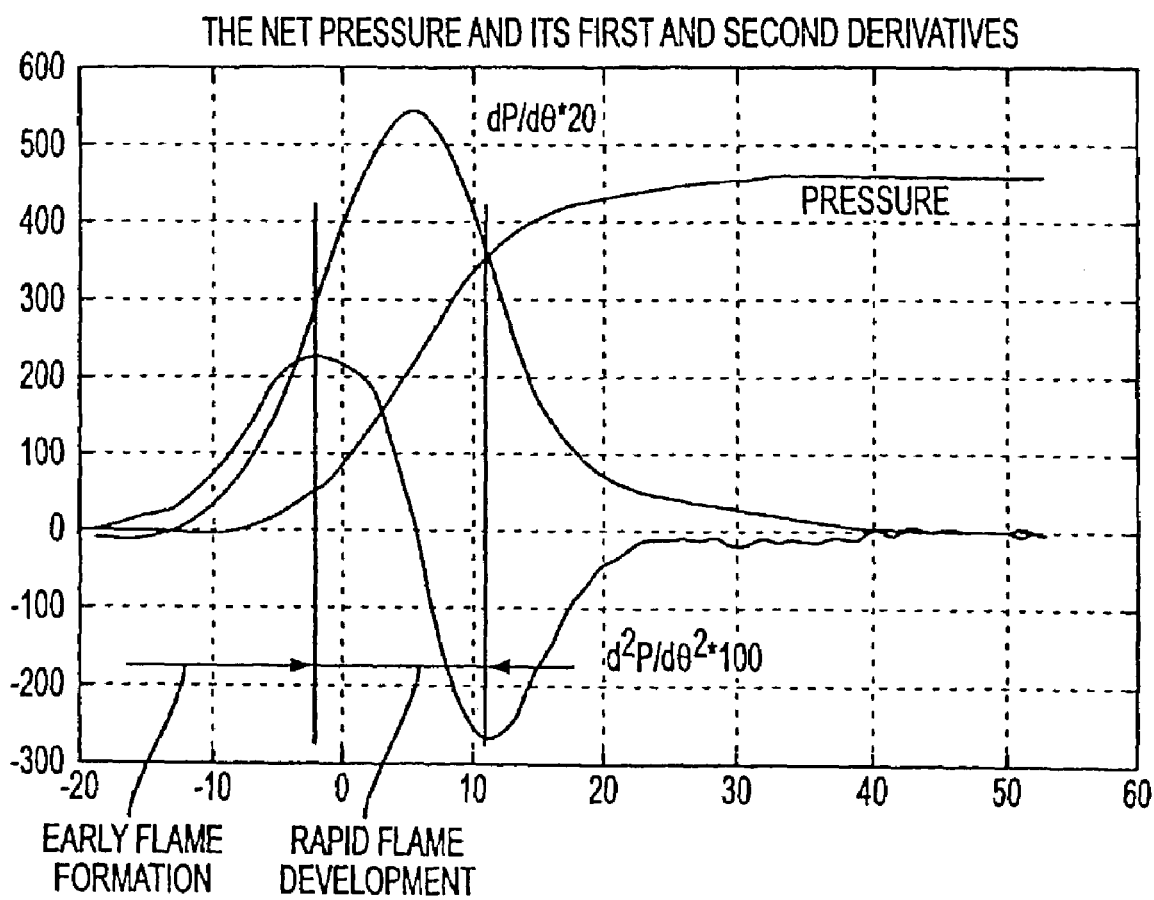
FIG. 53 is a graph of net pressure its derivatives versus crank angle.

Finally, the net pressure at each crank angle will be:

$$P_{net}(i)=P_{net}(i-1)+dP(i),$$

where P is pressure, V is volume and $V_{ig}$ is the chamber volume at the ignition point. After this, the net pressure is found for the whole combustion process. Its first and second derivatives can be treated as the velocity and acceleration of the net pressure, which can be also used to signify as the velocity and the acceleration of the combustion process (Shown in FIG. 53). Once the air/fuel ratio and EGR rate are determined, the peak velocity and the peak acceleration of the combustion process do not change with spark timing very much. The whole combustion process is like a distance runner who is entering a race. Where to attain his maximum acceleration and where to reach the peak velocity determine how good the final result is. As we know, the work generated before the top dead center (TDC) is wasted to fight with the moving piston and produce heat. However, it is a necessary step for the flame to establish itself for further flame development. The useful work is done after the TDC. From FIG. 52 and 53, we can see that the combustion process reaches its maximum acceleration point at a relatively early stage, which indicates that the early flame preparation is finished at this point. If we achieve this maximum acceleration point before TDC, some of the rapid burning period will be wasted before the TDC. If we attain the maximum acceleration point after the TDC, the rapid burning period right after the maximum acceleration point will occur at a bigger cylinder volume that results lower combustion efficiency. Therefore, it is reasonable to start the rapid burning period right at the top dead center, which allows that the most useful work to be generated most efficiently. In other words, when the spark timing is advanced to the point where the maximum acceleration point lining up with the top dead center, we can obtain the most useful work out of the combustion process and we can achieve the MBT timing.

Figure 54:
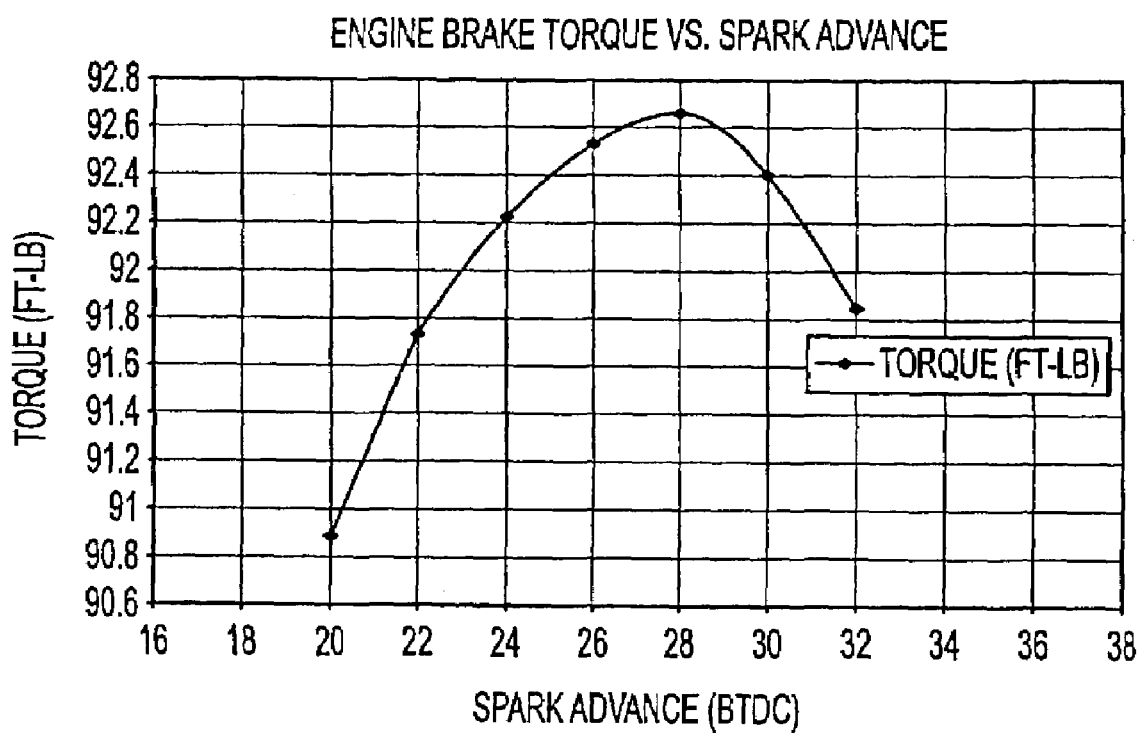
FIG. 54 is a graph of torque change with spark timing.
Figure 55:
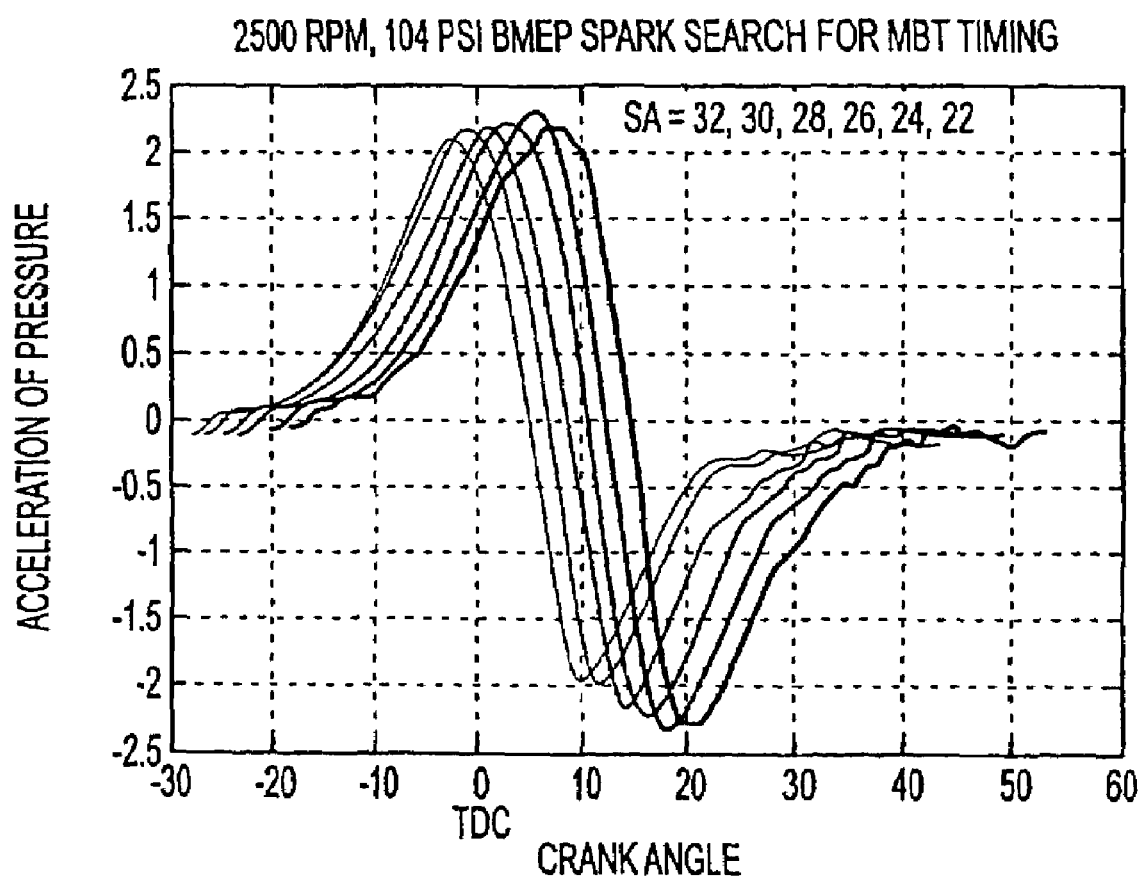
FIG. 55 is a graph of net pressure acceleration change with spark timing.

FIG. 54 shows the torque value at different spark timing for 2500 rpm, 7.86 bar (114 psi) BMEP and FIG. 55 shows the corresponding net pressure acceleration curves at different spark timing. It is clear from FIG. 54 that the MBT timing is at 28 degree BTDC. The peak acceleration points showing in FIG. 55 gradually advance as the spark timing is advanced. At 28 degree BTDC, the peak acceleration of pressure is located close to the TDC.

The tests conducted at various engine operating condition has also proved that the maximum acceleration point locating at TDC is where we achieve the MBT timing. This rule applies to the combustion process with one peak heat release curve, such as PFI (port fuel injection) engines, natural gas engines, and GDI (gasoline direct injection) engines with only one time fuel injection in the cylinder.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A method of controlling exhaust gas re-circulation, comprising using a measurement of minimum best time for best torque timing to control exhaust gas re-circulation, said measurement of minimum best time for best torque timing comprising a spark timing at which maximum torque occurs for a given set of engine operating conditions, wherein said step of using minimum best time for best torque timing criterion to control exhaust gas re-circulation further comprises the steps of:

running an engine at an exhaust gas re-circulation minimum best time for best torque spark timing when said engine is not knock limited; and running an engine at an offset from said exhaust gas re-circulation minimum best time for best torque spark timing when said engine is knock limited.

2. A method of controlling exhaust gas re-circulation comprising using a measurement of minimum best time for best torque timing to control exhaust gas re-circulation, said measurement of minimum best time for best torque timing comprising a spark timing at which maximum torque occurs for a given set of engine operating conditions wherein said step of using minimum best time for best torque timing criterion to control exhaust gas re-circulation further comprises the steps of:

running an engine at an exhaust gas re-circulation minimum best time for best torque spark timing when said engine is not knock limited; and running an engine at an offset from said exhaust gas re-circulation minimum best time for best torque spark timing when said engine is knock limit, wherein said step of running an engine at an offset from said exhaust gas re-circulation minimum best time for best torque spark timing when said engine is knock limited comprises setting the exhaust gas re-circulation rate to a knock limited exhaust gas re-circulation rate.

3. The method of controlling exhaust gas re-circulation according to claim 2 wherein said step of setting the exhaust gas re-circulation rate to a knock limited exhaust gas re-circulation rate, comprises:

increasing the exhaust gas re-circulation rate if said measurement of minimum best time for best torque dining is below a first limit; and decreasing the exhaust gas re-circulation rate if said measurement of minimum best time for best torque timing is greater than said first limit.

4. A method of controlling exhaust gas re-circulation comprising using a measurement of minimum best time for best torque timing to control exhaust gas re-circulation, said measurement of minimum best time for best torque timing comprising a spark timing at which maximum torque occurs for a given set of engine operating conditions, wherein said step of using minimum best time for best torque timing criterion to control exhaust gas re-circulation further comprises the steps of:

running an engine at an exhaust gas re-circulation minimum best time for best torque spark timing when said engine is not knock limited; and running an engine at an offset from said exhaust gas re-circulation minimum best time for best torque spark timing when said engine is knock limit, wherein said step of running an engine at an exhaust gas re-circulation minimum best time for best torque spark timing when said engine is not knock limited comprises setting the exhaust gas re-circulation rate to an optimal exhaust gas re-circulation rate.

5. The method of controlling exhaust gas re-circulation according to claim 4 wherein said step of setting the exhaust gas re-circulation rate to an optimal exhaust gas re-circulation rate further comprises the steps of:

increasing the exhaust gas re-circulation rate if a minimum best time for best torque timing is below a second limit; and decreasing the exhaust gas re-circulation rate if said minimum best time for best torque timing is greater than said second limit.

6. A method of controlling exhaust gas re-circulation comprising using a measurement of minimum best time for best torque timing to control exhaust gas re-circulation, said measurement of minimum best time for best torque timing comprising a spark timing at which maximum torque occurs for a given set of engine operating conditions, wherein said step of using minimum best time for best torque timing criterion to control exhaust gas re-circulation further comprises the steps of:

running an engine at an exhaust gas re-circulation minimum best time for best torque spark timing when said engine is not knock limited, wherein said step of running an engine at an exhaust gas re-circulation minimum best time for best torque spark timing when said engine is not knock limited comprises setting the exhaust gas re-circulation rate to an optimal exhaust gas re-circulation rate; and running an engine at an offset from said exhaust gas re-circulation minimum best time for best torque spark timing when said engine is knock limit, wherein said step of running an engine at an offset from said exhaust gas re-circulation minimum best time for best torque spark timing when said engine is knock limited comprises setting the exhaust gas re-circulation into to a knock limited exhaust gas re-circulation rate.

7. The method of controlling exhaust gas re-circulation according to claim 6 wherein said step of setting the exhaust gas re-circulation rate to a knock limited exhaust gas re-circulation rate, comprises:

increasing the exhaust gas re-circulation rate if said measurement of minimum best time for best torque timing is below a first limit; and decreasing the exhaust gas re-circulation rate if said measurement of minimum best time for best torque timing is greater than said first limit; and wherein said step of setting the exhaust gas re-circulation rate to an optimal exhaust gas re-circulation rate further comprises the steps of:

increasing the exhaust gas re-circulation rate if a minimum best time for best torque timing is below a second limit; and decreasing the exhaust gas re-circulation rate if said minimum best time for best torque timing is greater than said second limit.

8. The method of controlling exhaust gas re-circulation according to claim 7 further comprising the step of mapping a maximum exhaust re-circulation rate with a satisfactory combustion stability criterion.

9. The method of controlling exhaust gas re-circulation according to claim 7 further comprising the step of comparing the exhaust re-circulation rate with a default exhaust re-circulation rate generated from current engine operating conditions.

10. The method of controlling exhaust gas re-circulation according to claim 7 further comprising the step of:
resetting the exhaust gas re-circulation rate if the exhaust gas re-circulation rate is saturated; and
converting the exhaust gas re-circulation rate into a valve opening.

11. The method of controlling exhaust gas re-circulation according to claim 7 further comprising the steps of:
mapping a maximum exhaust re-circulation rate with a satisfactory combustion stability criterion;
comparing the exhaust re-circulation rate with a default exhaust re-circulation rate generated from current engine operating conditions;
resetting the exhaust gas re-circulation rate if the exhaust gas re-circulation rate is saturated; and
converting the exhaust gas re-circulation rate into a valve opening.

12. An exhaust gas re-circulation controller comprising:
a closed loop, whereby exhaust gas re-circulation is controlled by said closed loop, wherein said closed loop comprises:
a first table comprising a map of exhaust gas re-circulation rates at specific operating conditions;
a gain and error generator having an input operably connected to an output of said first table;
a proportional and integral controller having an input operably connected to an output of said gain and error generator;
a second table comprising a map of maximum exhaust gas re-circulation rates and stability criterion; and
a summer having a first input operably connected to an output of said proportional and integral controller, a second input operably connected to an output of said second table, and an output operably connected to an input of said second table.

13. The exhaust gas re-circulation controller according in claim 12 wherein said closed loop further comprises:
a saturation manager, having an output operably connected to an input of said proportional and integral controller.

14. The exhaust gas re-circulation controller according to claim 12 wherein said closed loop further comprises:
a rate adaptor operably connected between said output of said summer and said input of said second table.

15. The exhaust gas re-circulation controller according to claim 12 wherein said closed loop further comprises:
an exhaust gas re-circulation valve metering controller having an input operably connected to said saturation manager.

16. The exhaust gas re-circulation controller according in claim 12 wherein said closed loop further comprises:
a saturation manager, having an output operably connected to an input of said proportional and integral controller;
a rate adaptor operably connected between said output of said summer and said input of said second table; and
an exhaust gas re-circulation valve metering controller having an input operably connected to said saturation manager.

17. The exhaust gas re-circulation controller according to claim 12 wherein said first table is a minimum best unit for best torque limit table and said second table is an exhaust gas re-circulation rate table.

18. The exhaust gas re-circulation controller according to claim 16 wherein said first table is a minimum best time for best torque limit table and said second table is an exhaust gas re-circulation rate table.

* * * * *

UNITED STATES PATENT AND TRADEMARK OFFICE
CERTIFICATE OF CORRECTION

PATENT NO.    : 6,980,903 B2
DATED         : December 27, 2005
INVENTOR(S)   : Chao F. Daniels et al.

It is certified that error appears in the above-identified patent and that said Letters Patent is hereby corrected as shown below:

Column 1,
Line 44, "inonization" should be -- ionization --.
Lines 61, 63 and 66, "re-ion circulation" should be -- re-circulation --.

Column 12,
Line 56, "133" should be -- 1300 --.

Column 18,
Line 24, after "runs" delete "at".

Column 29,
Line 62, "PT" should be -- PI --.

Column 35,
Lines 11 and 16, "resealed" should be -- rescaled --.
Lines 14 and 48, "resealing" should be -- rescaling --.

Column 40,
Line 6, after "than" add -- a --.

Column 42,
Line 42, "peal" should be -- peak --.
Line 61, "instaneously" should be -- instantaneously --.

Column 45,
Line 58, "dining" should be -- timing --.

Signed and Sealed this

Fourth Day of April, 2006

JON W. DUDAS
*Director of the United States Patent and Trademark Office*